United States Patent
Inoue et al.

(10) Patent No.: US 9,819,704 B2
(45) Date of Patent: *Nov. 14, 2017

(54) TRANSMISSION SYSTEM, TRANSMISSION MANAGEMENT APPARATUS, AND RECORDING MEDIUM

(71) Applicant: RICOH COMPANY, LTD., Tokyo (JP)

(72) Inventors: Takeru Inoue, Kanagawa (JP); Taro Okuyama, Tokyo (JP); Atsuhiro Fujii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 14/613,546

(22) Filed: Feb. 4, 2015

(65) Prior Publication Data

US 2015/0222670 A1 Aug. 6, 2015

(30) Foreign Application Priority Data

Feb. 4, 2014 (JP) .................................. 2014-019372
Nov. 12, 2014 (JP) .................................. 2014-229637

(51) Int. Cl.
*H04L 29/06* (2006.01)
*H04N 7/14* (2006.01)
(Continued)

(52) U.S. Cl.
CPC ...... *H04L 65/1069* (2013.01); *H04L 65/4038* (2013.01); *H04N 21/21805* (2013.01); *H04N 21/233* (2013.01); *H04N 21/4788* (2013.01)

(58) Field of Classification Search
None
See application file for complete search history.

(56) References Cited

U.S. PATENT DOCUMENTS 6,738,822 B2 * 5/2004 Fukasawa .......... H04N 1/00127
709/204
6,907,465 B1 * 6/2005 Tsai .................... G06Q 30/0601
709/206

(Continued)

FOREIGN PATENT DOCUMENTS

JP 2003-134239 5/2003
JP 2014-200063 10/2014

*Primary Examiner* — Bunjob Jaroenchonwanit
(74) *Attorney, Agent, or Firm* — Oblon, McClelland, Maier & Neustadt, L.L.P.

(57) ABSTRACT

Disclosed is a transmission system to manage sessions established between a plurality of terminals for performing voice communications. The transmission system includes an acquisition part configured to receive a user's request from a user of a first terminal when a session start request is transmitted from a first terminal to a second terminal, a first sender configured to send the received user's request together with the session start request, a second sender configured to send to the second terminal the session start request from the first terminal by attaching the user's request to the session start request when the second terminal is in a communication capable status, and a presenting part configured to present the user's request to the second terminal at an arrival of an incoming call from the first terminal to the second terminal.

12 Claims, 49 Drawing Sheets

(51) Int. Cl.
  *H04N 21/218*  (2011.01)
  *H04N 21/233*  (2011.01)
  *H04N 21/4788*  (2011.01)

(56) References Cited

U.S. PATENT DOCUMENTS

| | | | | |
|---|---|---|---|---|
| 7,512,652 | B1* | 3/2009 | Appelman | G06Q 10/107 |
| | | | | 709/204 |
| 8,326,794 | B1* | 12/2012 | Wood | G06F 11/3485 |
| | | | | 707/600 |
| 9,369,501 | B2* | 6/2016 | Inoue | H04L 65/1069 |
| 2008/0279118 | A1* | 11/2008 | Hyun | H04L 12/1818 |
| | | | | 370/260 |
| 2011/0134806 | A1* | 6/2011 | Kagawa | H04M 3/436 |
| | | | | 370/259 |
| 2011/0150201 | A1* | 6/2011 | Haich | H04M 3/56 |
| | | | | 379/202.01 |
| 2011/0185039 | A1* | 7/2011 | Ueno | H04L 63/029 |
| | | | | 709/217 |
| 2012/0002003 | A1* | 1/2012 | Okita | H04L 12/1827 |
| | | | | 348/14.11 |
| 2012/0314019 | A1* | 12/2012 | Asai | H04N 7/15 |
| | | | | 348/14.12 |
| 2014/0049597 | A1* | 2/2014 | Inoue | H04N 7/15 |
| | | | | 348/14.08 |
| 2014/0120973 | A1* | 5/2014 | Agulnik | H04W 4/10 |
| | | | | 455/509 |
| 2014/0267565 | A1 | 9/2014 | Nakafuji et al. | |

* cited by examiner

FIG.6

| IP ADDRESS OF RELAY DESTINATION TERMINAL | IMAGE QUALITY OF RELAYING IMAGE DATA (QUALITY OF IMAGE) |
|---|---|
| 1.3.2.4 | HIGH IMAGE QUALITY |
| 1.3.1.3 | LOW IMAGE QUALITY |
| 1.3.2.3 | INTERMEDIATE IMAGE QUALITY |
| ... | ... |

FIG.8

| RELAY APPARATUS ID | OPERATION STATUS | RECEIVED DATE AND TIME | IP ADDRESS OF RELAY APPARATUS | MAXIMUM DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.2.2.2 | 10 |
| 111e | ONLINE | | 1.1.1.3 | |

FIG.9

| TERMINAL ID | PASSWORD |
|---|---|
| 01aa | aaaa |
| 01ab | abab |
| 01ba | baba |
| ... | ... |

FIG.10

| TERMINAL ID | TERMINAL NAME | OPERATION STATUS | COMMUNICATION STATUS | RECEIVED DATE AND TIME | IP ADDRESS OF TERMINAL |
|---|---|---|---|---|---|
| 01aa | AA TERMINAL, TOKYO OFFICE, JAPAN | ONLINE (STANDBY) | None | 2009.11.10.13:40 | 1.2.1.3 |
| 01ab | AB TERMINAL, TOKYO OFFICE, JAPAN | OFFLINE | | 2009.11.09.12:00 | 1.2.1.4 |
| ... | ... | ... | | ... | ... |
| 01ba | BA TERMINAL, OSAKA OFFICE, JAPAN | ONLINE (BUSY) | Private Calling | 2009.11.10.13:45 | 1.2.2.3 |
| 01bb | BB TERMINAL, OSAKA OFFICE, JAPAN | ONLINE (BUSY) | Private Busy | 2009.11.10.13:50 | 1.2.2.4 |
| ... | ... | ... | | ... | ... |
| 01ca | CA TERMINAL, NY OFFICE, USA | OFFLINE | | 2009.11.10.12:45 | 1.3.1.3 |
| 01cb | CB TERMINAL, NY OFFICE, USA | OFFLINE | | 2009.11.10.13:55 | 1.3.1.4 |
| ... | ... | ... | | ... | ... |
| 01da | DA TERMINAL, WASHINGTON OFFICE, USA | ONLINE (BUSY) | Private Busy | 2009.11.08.12:45 | 1.3.2.3 |
| 01db | DB TERMINAL, WASHINGTON OFFICE, USA | ONLINE (STANDBY) | None | 2009.11.10.12:45 | 1.3.2.4 |
| ... | ... | ... | | ... | ... |

FIG.11

| START REQUEST TERMINAL ID | DESTINATION TERMINAL ID |
|---|---|
| 01aa | 01ab,01ba,01db,01dc |
| 01ab | 01aa,01ca,01cb |
| 01ba | 01aa,01ab,01ca,01cb,01da,01db |
| 01cb | 01aa,01bb,01db |
| 01db | 01aa,01cb,01da |
| ... | ... |

FIG.12

| SESSION ID | RELAY APPARATUS ID | START REQUEST TERMINAL ID | DESTINATION TERMINAL ID | DELAY TIME (ms) | DELAY INFORMATION RECEIVED DATE AND TIME |
|---|---|---|---|---|---|
| se1 | 111e | 01aa | 01db | 200 | 2009.11.10.14.00 |
| se2 | 111b | 01ba | 01be | 50 | 2009.11.10.14.10 |
| se3 | 111c | 01cd | 01cf | 400 | 2009.11.10.14.20 |
| ... | ... | ... | ... | ... | ... |

FIG.13

| DELAY TIME (ms) | IMAGE DATA QUALITY (QUALITY OF IMAGE) |
|---|---|
| 0~100 | HIGH IMAGE QUALITY |
| 100~300 | INTERMEDIATE IMAGE QUALITY |
| 300~500 | LOW IMAGE QUALITY |
| 500~ | (INTERRUPTED) |

FIG.14

| TERMINAL ID | RELAY APPARATUS ID |
|---|---|
| 01aa | 111a |
| 01ab | 111a |
| ... | ... |
| 01ba | 111b |
| 01bb | 111b |
| ... | ... |
| 01ca | 111c |
| 01cb | 111c |
| ... | ... |
| 01da | 111d |
| 01db | 111d |
| ... | ... |

FIG.15

| CHANGE REQUEST INFORMATION | PRE-CHANGE STATUS INFORMATION | CHANGE INFORMATION |
|---|---|---|
| Call | None | Accepted |
| Join | Accepted | Busy |
| | Private Accepted | Private Busy |
| Leave | Busy | None |
| | Private Busy | None |

FIG.16

| CHANGE REQUEST INFORMATION | TERMINAL INFORMATION | PRE-CHANGE STATUS INFORMATION | CHANGE INFORMATION |
|---|---|---|---|
| Invite | START REQUEST TERMINAL | None | Calling |
| | DESTINATION TERMINAL | None | Ringing |
| Private Invite | START REQUEST TERMINAL | None | Private Calling |
| | DESTINATION TERMINAL | None | Private Ringing |
| Accept | START REQUEST TERMINAL | Calling | Accepted |
| | | Private Calling | Private Accepted |
| | | Accepted | Accepted |
| | | Private Accepted | Private Accepted |
| | DESTINATION TERMINAL | Ringing | Accepted |
| | | Private Ringing | Private Accepted |

FIG.32

| GROUP ID | GROUP NAME | TERMINAL ID | SORTING INFORMATION | OPERATION STATUS |
|---|---|---|---|---|
| 1oxx | XX CALL CENTER | 10da | ENGLISH | ONLINE (STANDBY) |
| 1oxx | XX CALL CENTER | 10db | JAPANESE | ONLINE (STANDBY) |
| 1oxx | XX CALL CENTER | 10dc | FRENCH | ONLINE (BUSY) |
| ... | ... | ... | ... | ... |

FIG.33

| GROUP ID | OPERATION STATUS |
|---|---|
| 01xx | ONLINE (STANDBY) |

FIG.41

| GROUP ID | GROUP NAME | PASSWORD | TERMINAL ID |
|---|---|---|---|
| 10xx | XX CALL CENTER | ggg | 10aa |
| | | | 10ab |
| | | | 10ac |
| | | | ... |
| ... | ... | ... | ... |

FIG.42

| GROUP ID | QUESTION ID | QUESTION CONTENT |
|---|---|---|
| 10xx | 1 | QUESTION ABOUT PRODUCT A |
| | 2 | QUESTION ABOUT PRODUCT B |
| | 3 | QUESTION ABOUT PRODUCT C |
| | 4 | NO ALTERNATIVE |
| 11xx | 1 | ABOUT A LICENSE |
| | ... | ... |
| ... | ... | ... |

FIG.43

| TERMINAL ID | QUESTION ID |
|---|---|
| 10aa | 1,2,3,4 |
| 10ab | 1,2,3,4 |
| 10ac | 2,3,4 |
| ... | ... |

FIG.45

QUESTION CONTENT

HOW MAY I HELP YOU?
PLEASE SELECT ONE OF ALTERNATIVES YOU WISH TO ASK.

- QUESTION ABOUT A
- QUESTION ABOUT B
- QUESTION ABOUT C
- NO ALTERNATIVE

FIG.49

| TERMINAL ID | QUESTION ID | QUESTION CONTENT |
|---|---|---|
| ☐ SELECT A BATCH OF ALL TERMINALS IN A GROUP | | |
| ☐ 10aa | 1 | QUESTION ABOUT PRODUCT A |
| | 2 | QUESTION ABOUT PRODUCT B |
| | 3 | QUESTION ABOUT PRODUCT C |
| | 4 | NO ALTERNATIVE |
| ☐ 10ab | 1 | QUESTION ABOUT PRODUCT A |
| | 2 | QUESTION ABOUT PRODUCT B |
| | 3 | QUESTION ABOUT PRODUCT C |
| | 4 | NO ALTERNATIVE |
| ☐ 10ac | 2 | QUESTION ABOUT PRODUCT B |
| | 3 | QUESTION ABOUT PRODUCT C |
| | 4 | NO ALTERNATIVE |
| ... | ... | ... |

EDIT

FIG.51

[RETURN TO TERMINAL SELECTION SCREEN]    [ADD NEW QUESTION]

| QUESTION ID | QUESTION CONTENT | EDIT | DISPLAY SETTING |
|---|---|---|---|
| 1 | QUESTION ABOUT PRODUCT A | [EDIT] [DELETE] | [SET] [UNCHANGE] |
| 2 | QUESTION ABOUT PRODUCT B | [EDIT] [DELETE] | [SET] [UNCHANGE] |
| 3 | QUESTION ABOUT PRODUCT C | [EDIT] [DELETE] | [SET] [UNCHANGE] |
| 4 | NO ALTERNATIVE | [EDIT] [DELETE] | [SET] [UNCHANGE] |
| ... | ... | [EDIT] [DELETE] | [SET] [UNCHANGE] |

[REFLECT CHANGE]

| QUESTION ID | QUESTION CONTENT |
|---|---|
| 1 | QUESTION ABOUT PRODUCT A |
| 2 | QUESTION ABOUT PRODUCT B |
| 3 | QUESTION ABOUT PRODUCT C |
| 4 | NO ALTERNATIVE |

FIG.53

| RETURN TO TERMINAL SELECTION SCREEN | | | | ADD NEW QUESTION |
|---|---|---|---|---|
| QUESTION ID | QUESTION CONTENT | EDIT | | DISPLAY SETTING |
| 1 | QUESTION ABOUT PRODUCT A | EDIT | DELETE | SET | UNCHANGE |
| 2 | QUESTION ABOUT PRODUCT B | EDIT | DELETE | SET | UNCHANGE |
| 3 | QUESTION ABOUT PRODUCT C | EDIT | DELETE | SET | UNCHANGE |
| 4 | NO ALTERNATIVE | EDIT | DELETE | SET | UNCHANGE |
| 5 | QUESTION ABOUT PRODUCT D | EDIT | DELETE | SET | UNCHANGE |

| | | REFLECT CHANGE |
|---|---|---|
| QUESTION ID | QUESTION CONTENT | |
| 1 | QUESTION ABOUT PRODUCT A | |
| ××× | ... | |
| 5 | QUESTION ABOUT PRODUCT D | |
| 4 | NO ALTERNATIVE | |

FIG.54A

| GROUP ID | QUESTION ID | QUESTION CONTENT |
|---|---|---|
| 10xx | 1 | QUESTION ABOUT PRODUCT A |
| | 2 | QUESTION ABOUT PRODUCT B |
| | 3 | QUESTION ABOUT PRODUCT C |
| | 4 | NO ALTERNATIVE |
| ... | ... | ... |

FIG.54B

| GROUP ID | QUESTION ID | QUESTION CONTENT |
|---|---|---|
| 10xx | 1 | QUESTION ABOUT PRODUCT A |
| | 2 | QUESTION ABOUT PRODUCT B |
| | 3 | QUESTION ABOUT PRODUCT C |
| | 4 | NO ALTERNATIVE |
| | 5 | QUESTION ABOUT PRODUCT D |
| ... | ... | ... |

FIG.55A

| TERMINAL ID | QUESTION ID |
|---|---|
| 10aa | 1,2,3,4 |
| 10ab | 1,2,3,4 |
| 10ac | 2,3,4 |
| ... | ... |

FIG.55B

| TERMINAL ID | QUESTION ID |
|---|---|
| 10aa | 1,2,3,5,4 |
| 10ab | 1,2,3,4 |
| 10ac | 2,3,4 |
| ... | ... |

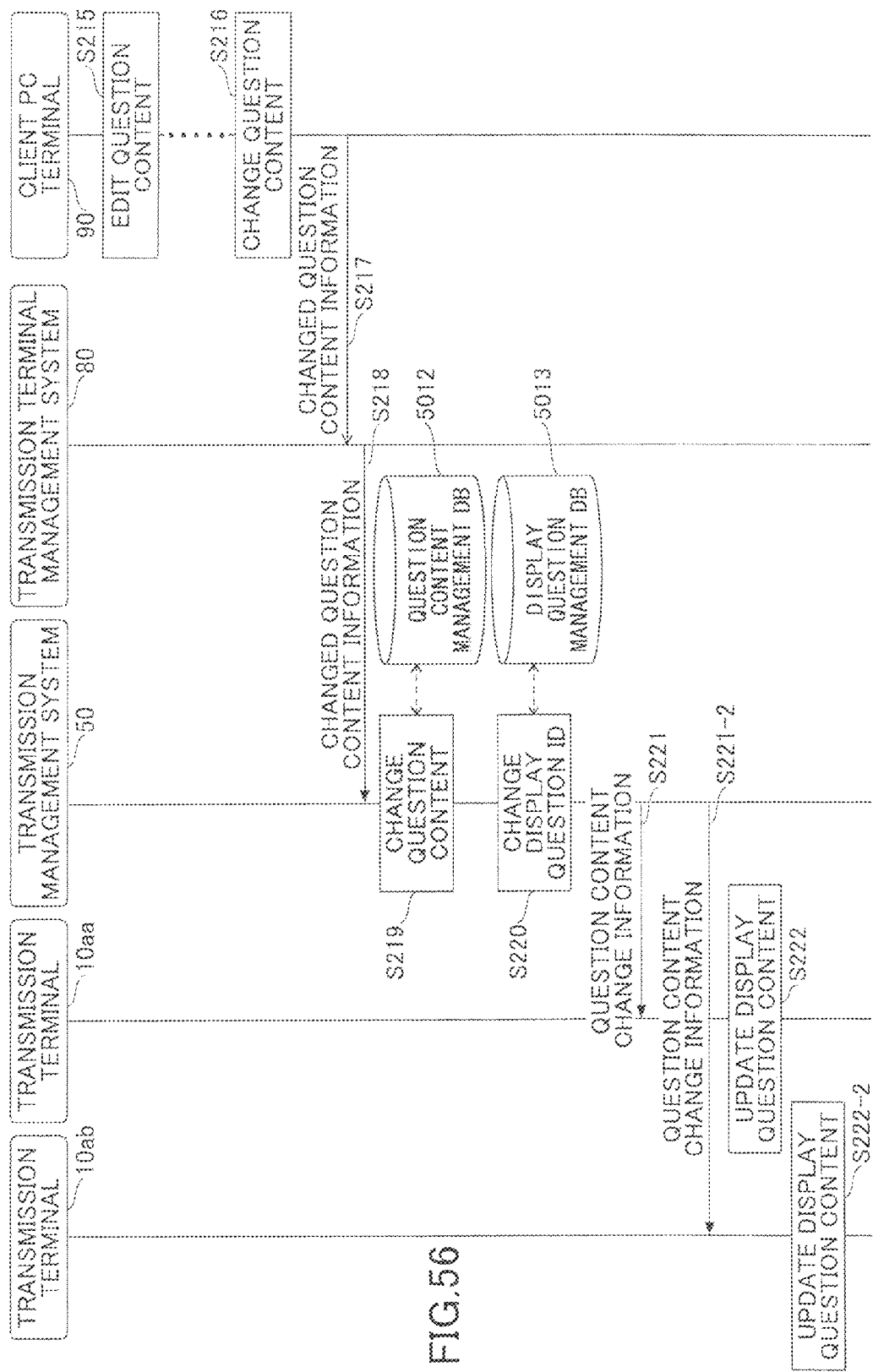

TRANSMISSION SYSTEM, TRANSMISSION MANAGEMENT APPARATUS, AND RECORDING MEDIUM

BACKGROUND OF THE INVENTION

1. Field of the Invention

The disclosures discussed herein relate to a transmission control technology.

2. Description of the Related Art

The use of a video conference technology utilizing video conference terminals or Web applications has increased along with an increase in capacities of Internet lines. Such video conference technology is frequently utilized as a business tool, which enables users to communicate with their communication partners while observing the communication partners facial expressions. Such a video conference technology does not have a limited usage, and may be used in a variety of scenes.

As described above, the use of the video conference technology will continued to be popular. In the video conferences, most of the communication partners such as a call center or helpdesk callers are identifiable based on their calling purposes. However, when the communication partners are not specifically identifiable based on the purposes of the video conference usage, there may be some disadvantageous effects in the services provided in the video conference compared to the services provided in the real space.

For example, when a receptionist faces a customer at a hotel's reception or the like in the real space, the receptionist is able to acknowledge the customer's appearance before the customer reaches the reception to make an inquiry. Thus, the receptionist may be able to anticipate, to some extent, the customer's demands from his or her gestures, countenance and the like to immediately meet the customer's demands.

However, in cyberspace of a video conference, information about a customer, and the connected communication partner of the video conference may be available to an operator in charge in the call center or the help desk merely after the video conference has started in response to an incoming call from the customer that is received by a terminal of the operator. Hence, a long time may be required for basic communications such as specifying the customer's official language, types of problems, and the like in the beginning of a discourse until the operator is ready to respond to the content of the customer's fundamental inquiry.

Meanwhile, Patent Document 1, for example, discloses a technology capable of rapidly responding to problems or questions in the help desk. That is, the technology includes a database configured to uniquely manage information associated with customers, contract information for each of the customers, questions from the customers and/or contents of a customer service, and to provide a customer service in response to a call or an electronic mail from a customer in accordance with the content of a service contract with each of the customers, based on the information stored in the database. However, this technology does not handle unspecified customers whose information is not registered in advance.

RELATED ART DOCUMENT

Patent Document

Patent Document 1: Japanese Laid-open Patent Publication No. 2003-134239

SUMMARY OF THE INVENTION

Accordingly, it is a general object in one embodiment of the present invention to provide a technology to acquire information about a caller before responding to an incoming call in a video conference or the like from the caller that substantially obviates one or more problems caused by the limitations and disadvantages of the related art.

In one aspect of the embodiment, there is provided a transmission system to manage sessions for performing voice communications, the sessions being established between a plurality of terminals, the transmission system includes an acquisition part configured to receive a user's request from a user of a first terminal when a session start request is transmitted from a first terminal to a second terminal; a first sender configured to send the received user's request together with the session start request; a second sender configured to send to the second terminal the session start request from the first terminal by attaching the user's request to the session start request when the second terminal is in a communication capable status; and a presenting part configured to present the user's request to the second terminal at an arrival of an incoming call from the first terminal to the second terminal.

Other objects, features and advantages of the present invention will become more apparent from the following detailed description when read in conjunction with the accompanying drawings.

BRIEF DESCRIPTION OF THE DRAWINGS

FIG. 6 is a diagram illustrating an example of a change quality management table;

FIG. 8 is a diagram illustrating an example of a relay apparatus management table;

FIG. 9 is a diagram illustrating an example of a terminal authentication management table;

FIG. 10 is a diagram illustrating an example of a terminal management table;

FIG. 11 is a diagram illustrating an example of a destination list management table;

FIG. 12 is a diagram illustrating an example of a session management table;

FIG. 13 is a diagram illustrating an example of a quality management table;

FIG. 14 is a diagram illustrating an example of a relay apparatus selection management table;

FIG. 15 is a diagram illustrating an example of a status change management table;

FIG. 16 is another diagram illustrating the example of the status change management table;

FIG. 32 is a diagram illustrating an example of a group ID management table;

FIG. 33 is a diagram illustrating an example of a group status management table;

FIG. 41 is a diagram illustrating an example of a group ID management table;

FIG. 42 is a diagram illustrating an example of a question content management table;

FIG. 43 is a diagram illustrating an example of a display question management table;

FIG. 45 is a diagram illustrating an example of a screen displaying questions after the destination is selected;

FIG. 49 is a first diagram illustrating an example of a question content management table;

FIG. 51 is a third diagram illustrating the example of the question content management table;

FIG. 53 is a fifth diagram illustrating the example of the question content management table;

FIGS. 54A and 54B area diagrams illustrating examples before and after the change of the question content management table;

FIGS. 55A and 55B area diagrams illustrating examples before and after the change of the display question management table; and FIG. 56 is a sequence diagram illustrating another example of a process of editing the question content.

DETAILED DESCRIPTION OF THE PREFERRED EMBODIMENTS

In the following, a description is given of embodiments with reference to accompanying drawings.

Figure 1:
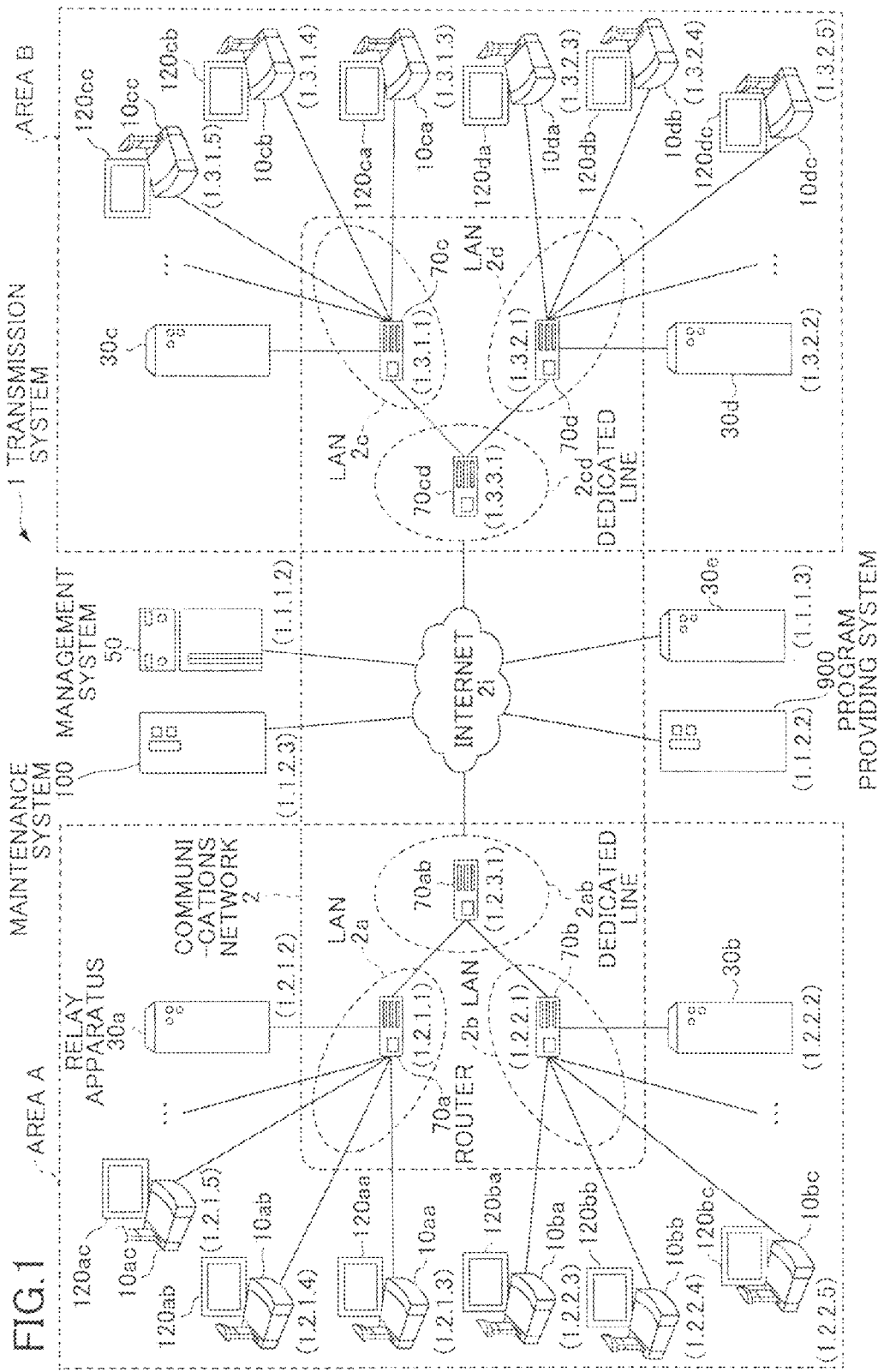
FIG. 1 a schematic diagram illustrating a transmission system.

Basic Configuration of Transmission System Overall Configuration of Transmission System FIG. 1 is a schematic diagram illustrating a transmission system 1 of an embodiment. Examples of the transmission system 1 include a data providing system configured to transmit content data in one direction from one transmission terminal to another transmission terminal via a transmission management system, or a communications system configured to mutually communicate information, emotions, and the like between two or more transmission terminals via a transmission management system. The communications system is configured to mutually communicate information, emotions, and the like between two or more communications terminals (corresponding to the "transmission terminals") via a (corresponding to the "transmission management system"). Examples of such a communications system include a video conference system, a video telephony system, and an audio teleconference system, a voice telephony system, a personal computer screen sharing system, and the like.

An illustration is given of the transmission system 1, a transmission management system (a management apparatus) 50, and a transmission terminal 10 are illustrated based on anticipation of a video conference system as an example of the communications system, a video conference management system as an example of a communications management system, and video conference terminal as an example of a communications terminal.

The transmission system 1 is configured to include two or more transmission terminals (10aa, 10ab, ...), respective displays (120aa, 120ab, ...) of the transmission terminals (10aa, 10ab, ...), two or more relay apparatuses (30a, 30b, 30c, 30d, and 30e), a transmission management system 50, a program providing system 900, and a maintenance system 100. Note that in the following, the "transmission terminals" may also be referred simply to as the "terminals", and the "transmission management system" may be referred simply to as the "management system".

Note that in the illustration of the transmission system 1 of the embodiments, a "transmission terminal 10" represents any one of the transmission terminals (10aa, 10ab, . . . ), a "display 110" represents any one of the displays (120aa, 120ab, . . . ), and a "relay apparatus 30" represents any one of the relay apparatuses (30a, 30b, 30c, 30d, and 30e).

The transmission terminal 10 is configured to transmit to and receive from other apparatuses various types of information. For example, the transmission terminal 10 establishes a session with another terminal 10, and communicates content data such as sound-voice data and image data with the other terminal 10 via the established session. Hence, a video conference is implemented between two or more terminals 10 in the transmission system 1.

Note that the "content data" hereinafter represent "image data and sound-voice data". Note that the data transmitted between the terminals 10 are not limited to the illustrated embodiments. For example, the content data may be text data, or may be data including sound-voice data, image data, and text data. Further, The image data may be dynamic image data or static image data. The image data may include both the dynamic image data and the static image data.

In addition, in the transmission system 1 of the embodiments, to start a video conference, a user desired to start the video conference operates a predetermined terminal 10 so that the operated terminal 10 sends start request information to a management system 50.

Note that the start request information indicates information that requests starting a session for use in the video conference. The start request information includes information to specify a terminal 10 serving as a session partner. The terminal 10 that transmits the start request information is hereinafter referred to as a start request terminal 10. Likewise, the counterpart terminal 10 specified as a session partner is hereinafter referred to as a destination terminal 10.

Note that the destination terminal (the session partner) 10 may be one terminal 10 or two or more terminals 10. Specifically, in the transmission system 1, it may be possible to implement a video conference utilizing a session established not only between the two terminals 10 but also utilizing sessions between the three or more terminals 10.

Further, in the transmission system 1 of the embodiments, other users may attend the video conference that has started after the session has already been established. The user desired to attend the video conference operates the predetermined terminal 10 so that the operated terminal 10 transmits attendance request information to the management system 50. This attendance request information specifies a session that has already been established (hereinafter referred to as the "already established session") for use in the video conference that the user desires to attend. The terminal 10 that transmits the attendance request information is hereinafter referred to as an attendance request terminal 10.

The management system 50 is configured to unitarily manage the terminals 10 and the relay apparatuses 30. The management system 50 is configured to establish sessions between the terminals 10 to implement a video conference via calls (voice communications) between the terminals 10.

When the management system 50 receives session start request information from the predetermined terminal 10, the management system 50 establishes a session between the terminal 10 (start request terminal) that transmits the start request information and the destination terminal 10 to start the video conference. When the management system 50 receives from the predetermined terminal 10 attendance request information for attending the session that has already been established (hereinafter called the "already established session"), the management system 50 determines whether to allow the attendance request terminal to attend the already established session.

Further, routers (70a, 70b, 70c, 70d, 70ab, and 70cd) illustrated in FIG. 1 are configured to select the optimal routes for content data. Note that in the transmission system 1, a "router 70" represents any one of the routers (70a, 70b, 70c, 70d, 70ab, and 70cd). The relay apparatus 30 is configured to relay the content data between the terminals 10.

The program providing system 900 is configured to include a not-illustrated hard disk (HD) storing terminal-specific programs for causing the terminal 10 to implement various types of functions, and transmit the terminal-specific programs to the terminal 10. The HD of the program providing system 900 further stores relay apparatus-specific programs for causing the relay apparatus 30 to implement various types of functions, so that the program providing system 900 transmits the relay apparatus-specific programs to the relay apparatus 30. In addition, the HD of the program providing system 900 may further store transmission management-specific programs for causing the management system 50 to implement various types of functions, so that the program providing system 900 transmits the transmission management-specific programs to the management system 50.

The maintenance system 100 is a computer configured to maintain, manage, or support at least one of the terminal 10, the relay apparatus 30, the management system 50, and the program providing system 900. For example, when the maintenance system 100 is located domestically, and the terminal 10, the relay apparatus 30, the management system 50, and the program providing system 900 are located abroad, the maintenance system 100 remotely performs maintenance, management, support, and the like on at least one of the terminal 10, the relay apparatus 30, the management system 50, and the program providing system 900 via the communications network 2. Further, the maintenance system 100 may perform maintenance such as the management of the model number, the manufacturer's serial number, the customer, the maintenance and inspection, the management of the failure history, and the like on at least one of the terminal 10, the relay apparatus 30, the management system 50, and the program providing system 900 without being intervened by the communications network 2.

Moreover, the terminals (10aa, 10ab, 10ac, 10a . . . ), the relay apparatus 30a, and the router 70a are connected to one another via a LAN 2a such that the terminals (10aa, 10ab, 10ac, 10a . . . ), the relay apparatus 30a, and the router 70a may be communicated with one another. The terminals (10ba, 10bb, 10bc, 10b . . . ), the relay apparatus 30b, and the router 70b are connected to one another via a LAN 2b such that the terminals (10ba, 10bb, 10bc, 10b . . . ), the relay apparatus 30b, and the router 70b may be communicated with one another. Moreover, the LAN 2a and the LAN 2b are connected via a dedicated line 2ab including a router 70ab such that the LAN 2a and the LAN 2b may be communicated with each other. The LAN 2a and the LAN 2b are constructed within a predetermined area A. For example, the predetermined area A may be Japan, the LAN 2a may be constructed within a Tokyo Office, and the LAN 2b may be constructed within an Osaka Office.

Meanwhile, the terminals (10ca, 10cb, 10cc, 10c . . . ), the relay apparatus 30c, and the router 70c are connected to one another via a LAN 2c such that the terminals (10ca, 10cb, 10cc, 10c . . . ), the relay apparatus 30c, and the router 70c may be communicated with one another. The terminals (10da, 10dd, 10dc, 10d . . . ), the relay apparatus 30d, and the router 70d are connected to one another via a LAN 2d such that the terminals (10da, 10dd, 10dc, 10d . . . ), the relay apparatus 30d, and the router 70d may be communicated with one another. Moreover, the LAN 2c and the LAN 2d are connected via a dedicated line 2cd including a router 70cd such that the LAN 2c and the LAN 2d may be communicated with each other. The LAN 2c and the LAN 2d are constructed within a predetermined area B. For example, the predetermined area B may be the United States, the LAN 2c may be constructed within a NY Office, and the LAN 2d may be constructed within a Washington, D.C. Office. The area A and the area B are connected via the Internet 2i from the routers 70ab and 70cd such that the area A and the area B may be communicated with each other.

In addition, the management system 50 and the program providing system 900 are connected to the terminal 10 and the relay apparatus 30 via the Internet 2 such that the management system 50 and the program providing system 900 may be communicated with the terminal 10 and the relay apparatus 30. The management system 50 and the program providing system 900 may be installed within the area A or the area B, or may be installed within an area other than these areas.

The relay apparatus 30e is connected to the terminal 10 via the Internet 2i such that the relay apparatus 30e and the terminal 10 may be communicated with each other. The relay apparatus 30e is in constant operation. Hence, in order for the relay apparatus 30e to minimally receive adverse traffic effect of the local area A or B, the relay apparatus 30e is installed within the area other than the areas A and B. Thus, the relay apparatus 30e is used for relaying content data when the terminal 10 is communicated with a terminal installed in another local area. Further, the relay apparatus 30e may also be used as an emergency relay apparatus when communications are performed between the terminals within the same local area and the relay apparatus installed within this area is failing or inactive.

Note that in the transmission system 1 of the embodiments, LAN 2a, LAN 2b, the dedicated line 2ab, the Internet 2i, the dedicated line 2cd, the LAN c, and the LAN 2d form the communications network 2 of the transmission system 1. The communications network 2 may include parts that perform wired and wireless communications.

In FIG. 1, a combination of four numbers provided beneath each of the terminal 10, the relay apparatus 30, the management system 50, the router 70, the program providing system 900, and the maintenance system 100 simply represents an IP address of a general IPv4. For example, the IP address of the terminal 10aa is "1.2.1.3". Note that the IP address may be IPv6 instead of IPv4; however, the IPv4 is employed for simplifying the illustration in the following embodiments.

Hardware Configuration of Transmission System 1

Figure 2:
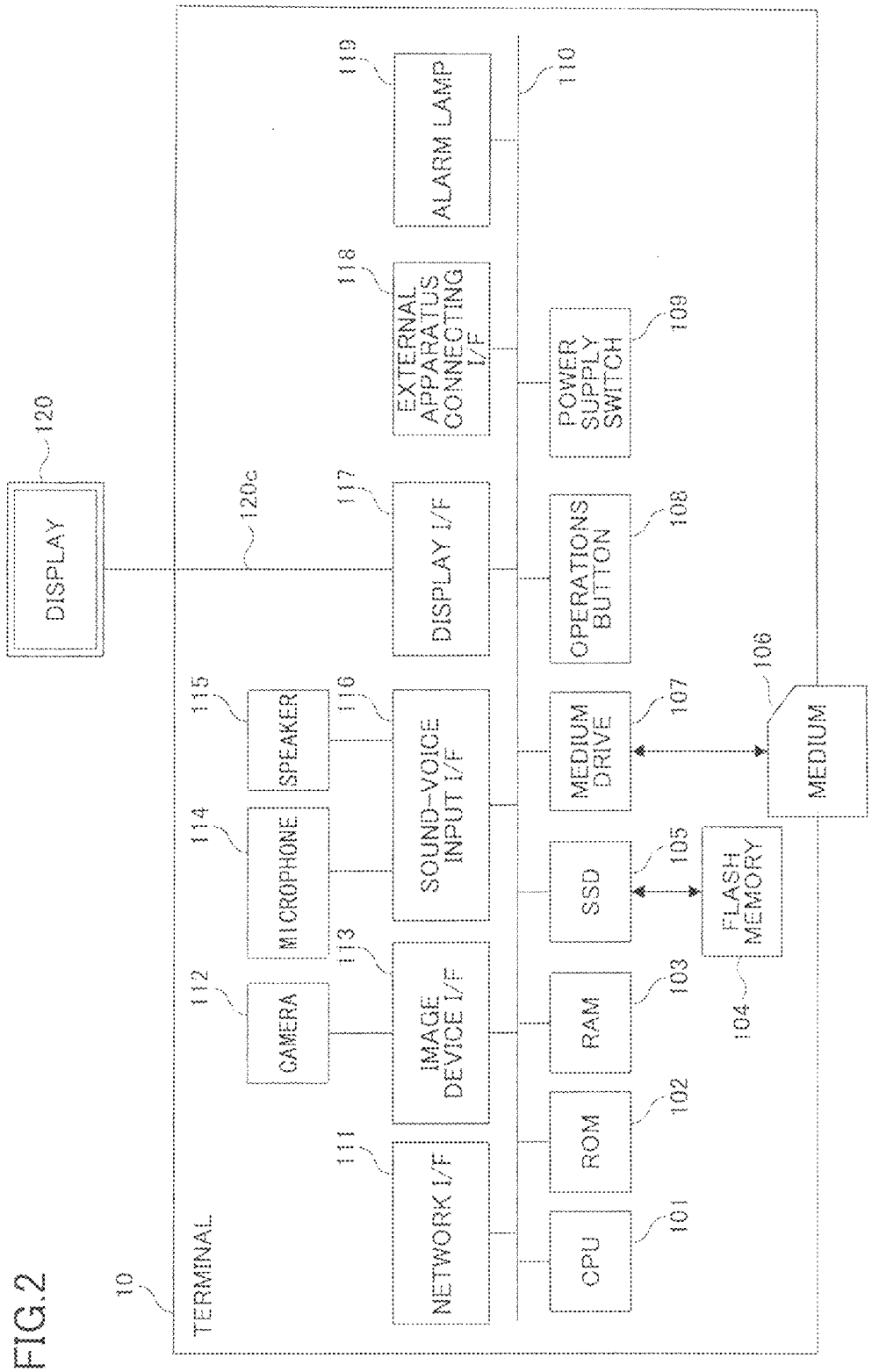
FIG. 2 is a hardware configuration diagram of a transmission terminal.

FIG. 2 is a hardware configuration diagram of the terminal 10 in the transmission system 1. As illustrated in FIG. 2, the terminal 10 includes a central processing unit (CPU) 101 configured to control overall operations of the terminal 10, a read-only memory (ROM) 102 configured to store terminal-specific programs, a random access memory (RAM) 103 configured to serve as a work area of the CPU 101, a flash memory 104 configured to store various types of data such as image data or sound-voice data, a solid-state drive (SSD) 105 configured to control reading or writing of various types of data with respect to the flash memory 104 in accordance with the control of the CPU 101, a medium drive 107 configured to control reading or writing of various types of data with respect to a medium 106 such as flush memory or the like, an operations button 108 configured to be operated (by a user) for electing a destination of the terminal 10 or the like, a power supply switch 109 configured to switch ON or OFF of the power of the terminal 10, and a network interface (I/F) 111 for performing data transmission using the later-described communications network 2.

The terminal 10 further includes a built-in camera 112 configured to image a subject to acquire image data in accordance with the control of the CPU 101, an imaging device I/F 113 configured to control the drive of the camera 112, a built-in microphone 114 configured to input sound and voice, a built-in speaker 115 configured to output sound and voice, a sound-voice input I/F 116 configured to process input and output of sound and voice signals between the microphone 114 and the speaker 115 in accordance with the control of the CPU 101, a display I/F 117 configured to transmit image data to an externally attached display 120 in accordance with the control of the CPU 101, an external apparatus connecting I/F 118 for connecting various types of external apparatuses, an alarm lamp 119 configured to report abnormality of various functions of the terminal 10, and a bus line 110 such as an address bus or a data bus for electrically connecting the above-described components illustrated in FIG. 2.

The display 120 is a display part formed of liquid crystal or organic EL, and configured to display an image of the subject or operational icons. Further, the display 120 is connected to the display I/F 117 via a cable 120c. The cable 120c may be an analog RGB (VGA) signal-specific cable, a component video-specific cable, a high-definition multimedia interface (HDMI) (registered trademark) or a digital video interactive (DVI) signal-specific cable.

The camera 112 includes lenses or a solid-state image sensor configured to convert an image (video) of a subject into electronic data by converting light into electric charges. Examples of the solid-state image sensor include a complementary metal oxide semiconductor (CMOS) or a charge coupled device (CCD).

An external apparatus such as an external camera, an external microphone, and an external speaker may electrically be connected to the external apparatus connecting I/F 118 via a universal serial bus (USB) cable or the like inserted in a connection port 1132 of a housing 1100 described later in FIG. 4. When the external camera is connected to the external apparatus connecting I/F 118, the external camera is driven in preference to the built-in camera 112 in accordance with the control of the CPU 101. Similarly, When the external microphone or the external speaker is connected to the external apparatus connecting I/F 118, the external microphone or the external speaker is driven in preference to the built-in microphone 114 or the built-in speaker 115 in accordance with the control of the CPU 101.

Note that the recording medium 106 is configured to be removable from the terminal 10. Further, when the recording medium 106 is a nonvolatile memory configured to read or write data in accordance with the control of the CPU 101, the recording medium 106 is not limited to the flash memory 104. The recording medium 106 may be electrically erasable and programmable ROM (EEPROM).

The above-described terminal-specific programs may be distributed in a form of a computer-readable recording medium (i.e., the recording medium 106, etc.) storing the programs in files of an installable format or executable format. Alternatively, the terminal-specific programs may be stored in the ROM 102 instead of the flash memory 104.

Figure 3:
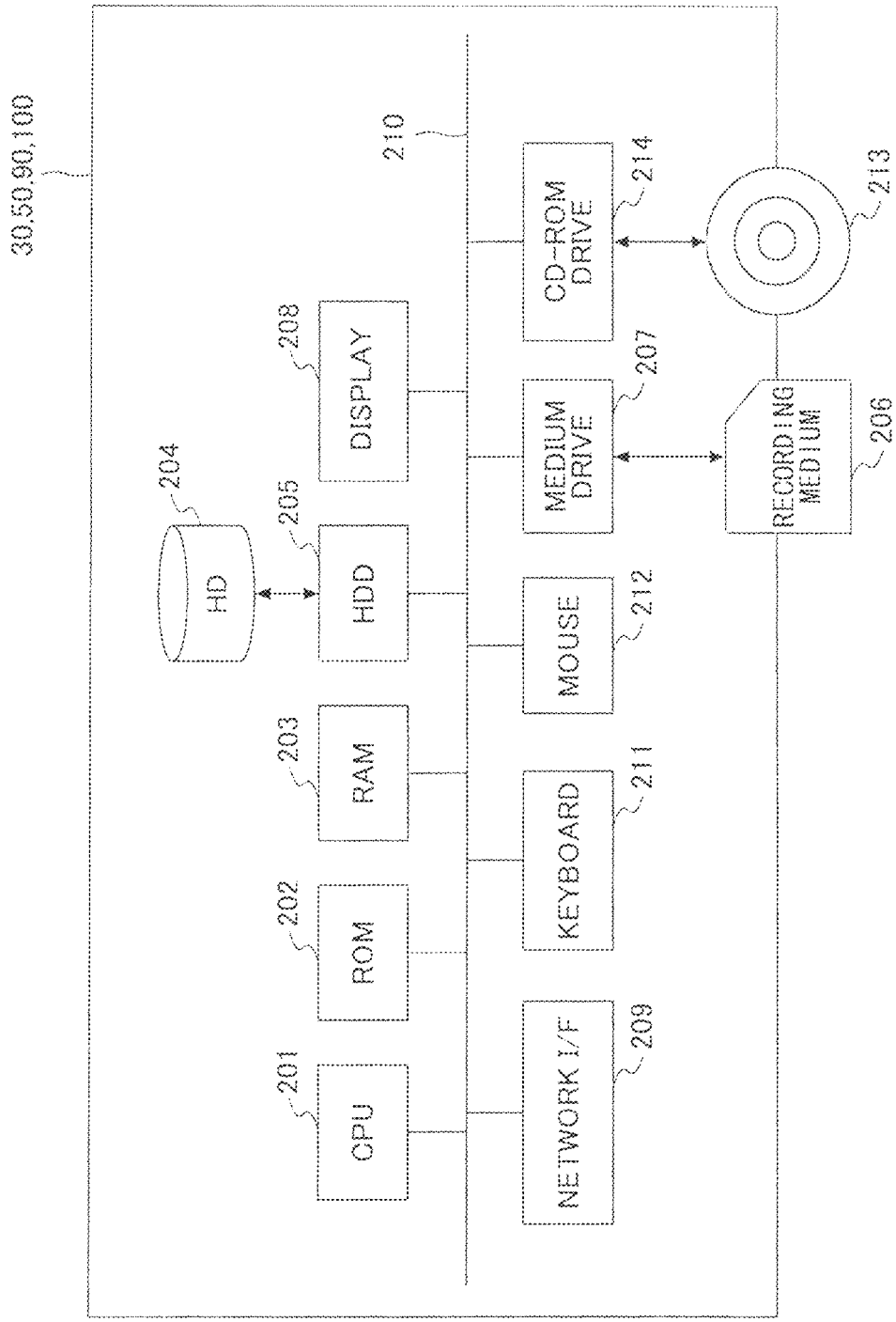
FIG. 3 is a hardware configuration diagram of a transmission management system, a relay apparatus, a program providing system, or a maintenance system.

FIG. 3 is a hardware configuration diagram of the management system 50 in the transmission system 1. The management system 50 includes a central processing unit (CPU) 201 configured to control overall operations of the management system 50, a read-only memory (ROM) 202 configured to store transmission management-specific programs, a random access memory (RAM) 203 configured to serve as a work area of the CPU 201, a hard disk (HD) 204 configured to store various types of data in accordance of the control of the CPU 201, a hard disk drive (HDD) 205 configured to control reading or writing of various types of data with respect to the HD 204 in accordance of the control of the CPU 201, a medium drive 207 configured to control reading or writing (storing) of data with respect to a medium 206 such as flush memory or the like, a display 208 configured to display various types of information such as a cursor, menus, windows, characters, or images, a network I/F 209 configured to perform data transmission using a later-described communications network 2, a keyboard 211 provided with plural keys for inputting characters numeric values, various types of instructions, and the like, a mouse 212 configured to select and execute various types of instructions, select a process target, and move a cursor, a CD-ROM drive 214 configured to control reading or writing of data with respect to a compact disk read-only memory (CD-ROM) as an example of a removable recording medium, and a bus line 210 such as an address bus or a data bus for electrically connecting the above-described components illustrated in FIG. 3.

Note that the above-described transmission management-specific programs may be distributed in a form of the above-described computer-readable recording medium 206, CD-ROM 213 and the like storing the programs in files of an installable format or executable format.

The relay apparatus 30 has a hardware configuration similar to that of the management system 50, and hence, a duplicated illustration of the relay apparatus 30 is omitted from the specification. Note that in the relay apparatus 30, the ROM 202 is configured to store relay apparatus-specific programs for controlling the relay apparatus 30. In this case, the relay apparatus-specific programs may be distributed in a form of the above-described computer-readable recording medium 206, CD-ROM 213 and the like storing the programs in files of an installable format or executable format.

Further, the program providing system 900 also has a hardware configuration similar to that of the management system 50, and hence, a duplicated illustration of the program providing system 900 is omitted from the specification. Note that in the program providing system 900, the ROM 202 is configured to store program providing-specific programs for controlling the program providing system 900. In this case, the program providing-specific programs may also be distributed in a form of the above-described computer-readable recording medium 206, CD-ROM 213 and the like storing the programs in files of an installable format or executable format.

The maintenance system 100 has a hardware configuration similar to that of the management system 50, and hence, a duplicated illustration of the maintenance system 100 is omitted from the specification. Note that in the maintenance system 100, the ROM 202 is configured to store maintenance-specific programs for controlling the maintenance system 100. In this case, the maintenance-specific programs may also be distributed in a form of the above-described computer-readable recording medium 206, CD-ROM 213 and the like storing the programs in files of an installable format or executable format.

Note that other examples of the removable computer-readable recording medium include a compact disc recordable (CD-R), a digital versatile disk (DVD), a Blu-ray Disc, and the like.

Figure 4:
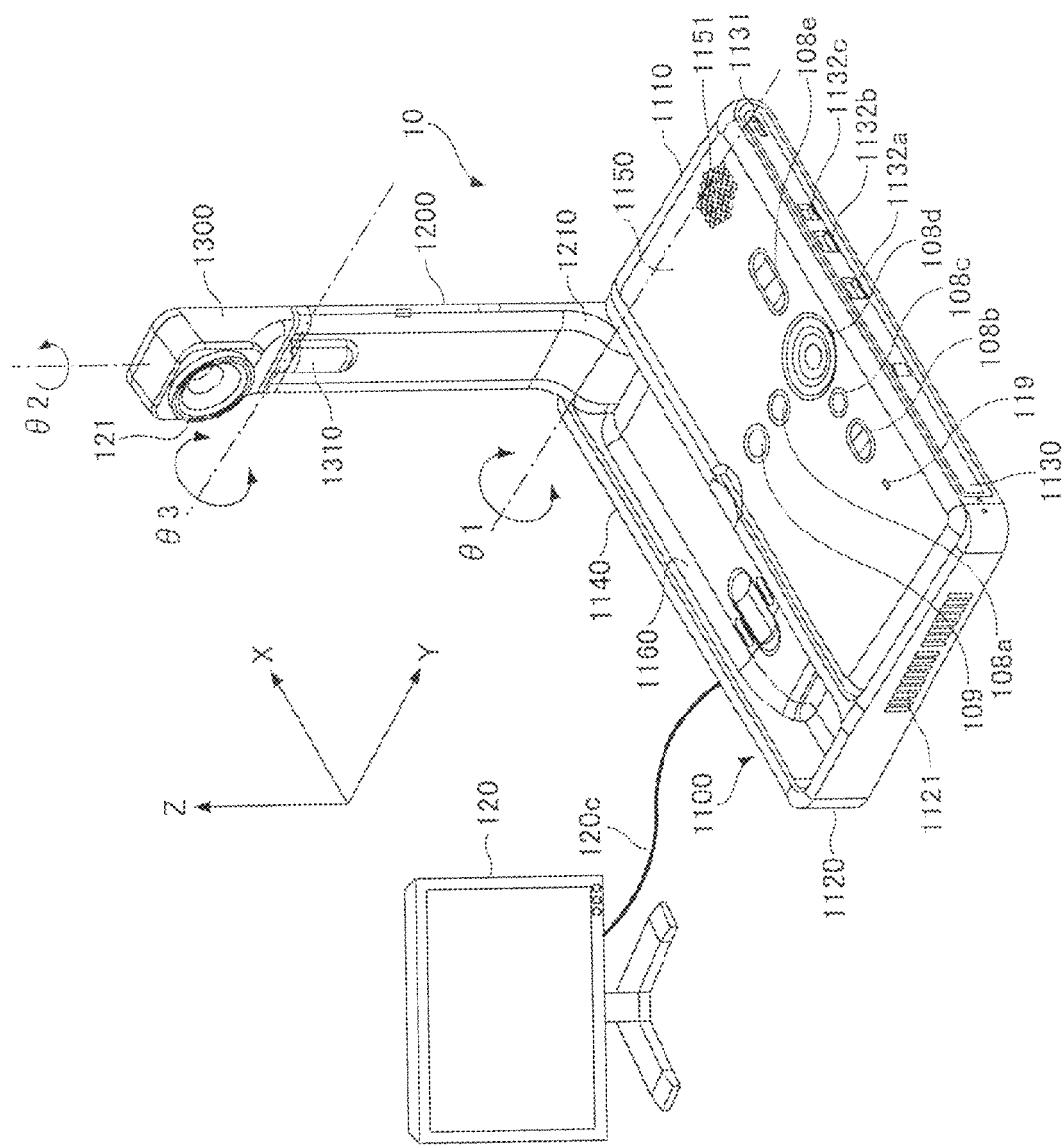
FIG. 4 is an external diagram of the transmission terminal.

FIG. 4 is an external diagram of the terminal 10. In the following illustration with reference to FIG. 4, an X-axis direction represents a longitudinal direction of the terminal 10, a Y-axis direction represents a direction orthogonal to the X-axis direction in the plane, a Z-axis direction represents a direction (a vertical direction) orthogonal to the X-axis direction and the Y-axis direction.

As illustrated in FIG. 4, the terminal 10 includes a housing 1100, an arm 1200, and a camera housing 1300. A front wall 1110 of the housing 1100 includes a not-illustrated suction surface having plural suction holes, and a rear wall 1120 of the housing 1100 includes an exhaust surface 1121 having plural exhaust holes. In this configuration, air behind the terminal 10 is suctioned via the not-illustrated suction surface, and the suctioned air is exhausted via the exhaust surface 1121 behind the terminal 10. A right wall 1130 of the housing 1100 includes a sound-acquiring hole 1131 so that sound, noise, and the like may be acquired from a later-described built-in microphone 114 via the sound-acquiring hole 1131.

An operations panel 1150 is formed on the right wall 1130 side of the housing 1100. The operations panel 1150 includes later-described operations buttons (108a to 108e), a later-described power supply switch 109, and a later-described alarm lamp 119, as well as a sound output surface 1151 formed of sound-voice output holes to output sound from a later-described speaks 115. Further, a container 1160 that is a recess part to contain the arm 1200 and the camera housing 1300 is formed on a left wall 1140 side of the housing 1100. The right wall 1130 of the housing 1100 includes plural connecting ports (1132a to 1132c) for electrically connecting a cable with respect to a later-described external apparatus connecting I/F 118. The left wall 1140 of the housing 1100 includes a not-illustrated connecting port for electrically connecting a display (120) cable 120c with respect to the later-described external apparatus connecting I/F 118.

Note that in the following, an "operations button 108" indicates any one of the operations buttons (108a to 108e), and an "connecting port 1132" indicates any one of the connecting ports (1132a to 1132c).

Next, the arm 1200 is attached to the housing 1100 via a torque hinge 1210 such that the arm 1200 is configured to turn in a vertical direction (upward and downward directions) within a 135 degree range of a tilt angle θ with respect to the housing 1100. FIG. 4 illustrates an example of the tilt angle θ1 of 90 degrees.

The camera hosing 1300 includes a later-described built-in camera 112 configured to image users, documents, rooms, and the like. The camera housing 1300 also includes a torque hinge 1310. The camera housing 1300 is attached to the arm 1200 via the torque hinge 1310. The camera housing 1300 is attached to the arm 1200 via the torque hinge 1310 such that the camera housing 1300 is configured to turn in upward and downward directions and leftward and rightward directions within a ±180 degree range of a pan angle θ2 and within a ±45 degree range of a tilt angle θ3 with respect to the arm 1200 when the arm 1200 illustrated in FIG. 4 is 0 degree.

Note that another example of the terminal 10 may include a general-purpose computer. When the computer serving as the terminal 10 does not include a microphone or a camera, an external microphone or camera may be connected to the computer. Hence, the general-purpose computer may be used as the terminal 10 of the embodiments. Further, when the general-purpose computer is used as the terminal 10, application programs (hereinafter called "applications") for causing the computer to execute processes of the terminal 10 may be installed in the computer.

Note that external appearances of the relay apparatus 30, the management system 50, the program providing system 900, and the maintenance system 100 may be similar to those of general server computers, and a duplicated illustration of the external appearances of the relay apparatus 30, the management system 50, the program providing system 900, and the maintenance system 100 are omitted from the specification.

Functional Configuration of Transmission System

Figure 5:
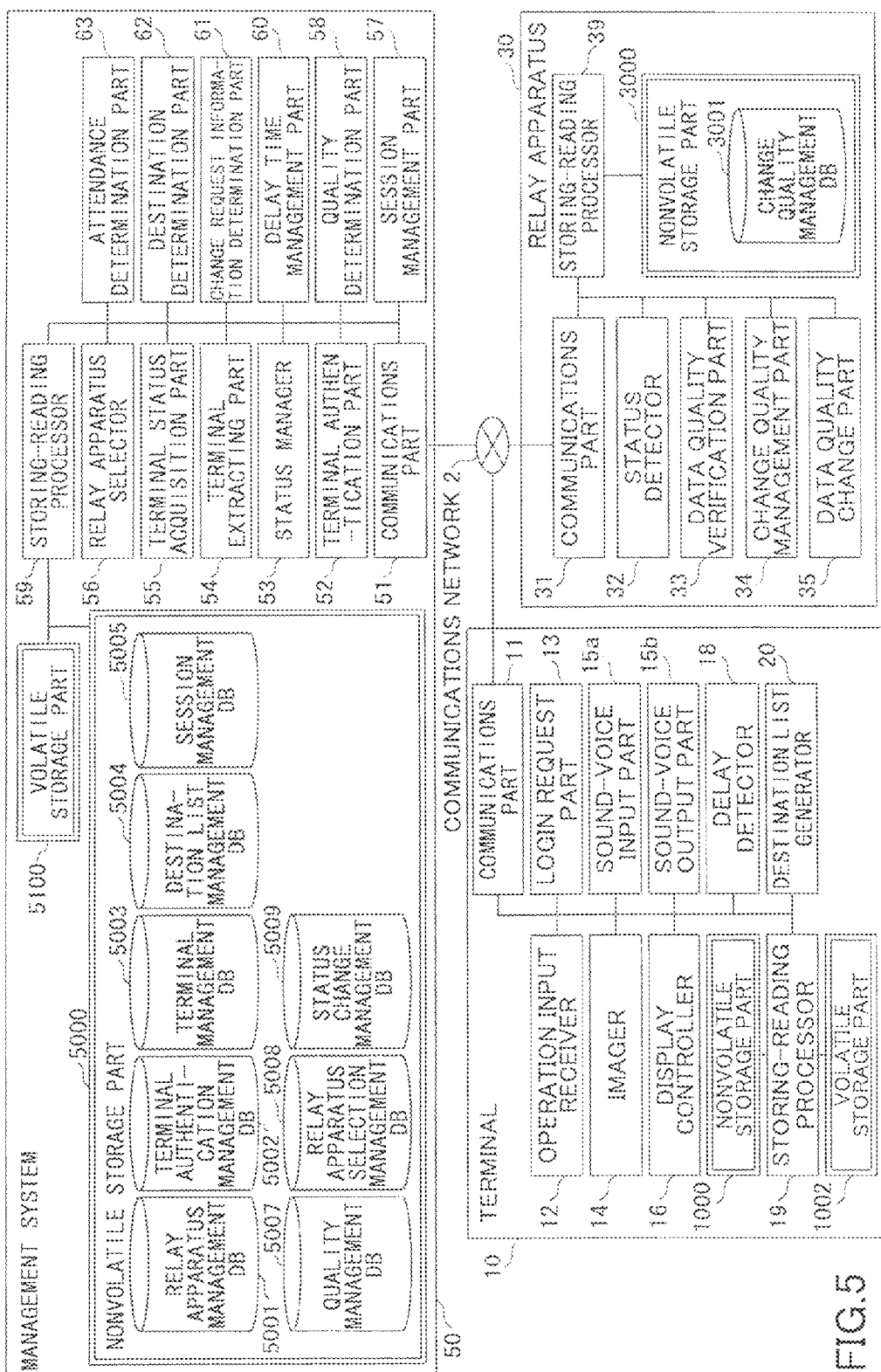
FIG. 5 is a functional block diagram illustrating the terminal, the apparatus, and the system constituting the transmission system.

Next, a description is given of a functional configuration of the transmission system 1. FIG. 5 is a functional block diagram illustrating the terminal 10, the relay apparatus 30, and the management system 50 constituting the transmission system 1. As illustrated in FIG. 5, the terminal 10, the relay apparatus 30, and the management system 50 are connected via the communications network 2 to perform data communications with one another. Note that the program providing system 900 and the maintenance system 100 are not directly related to the communications of the video conference, and an illustration of the program providing system 900 and the maintenance system 100 is therefore omitted from FIG. 5.

Functional Configuration of Terminal

The terminal 10 includes a communications part 11, an operation input receiver 12, a login request part 13, an imager 14, a sound-voice input part 15a, a sound-voice output part 15b, a display controller 16, a delay detector 18, a storing-reading processor 19, and a destination list generator 20. Each of the above components is a function and a process implemented by operations of the CPU 102 performed in accordance with programs stored in the ROM 101 illustrated in FIG. 2. Further, the terminal 10 includes a volatile storage part 1002 formed of the RAM 103 illustrated in FIG. 2, and a nonvolatile storage part 1000 formed of a flash memory 104 illustrated in FIG. 2.

Functional Components of Terminal

Next, an illustration is given of details of components of the terminal. The communications part 11 of the terminal 10 is implemented by the network I/F 111 illustrated in FIG. 2, and configured to perform transmission and reception of various types of data (or information) with other terminals, apparatuses, or systems via the communications network 2.

The communications part 11 starts receiving status information of the terminals 10 as destination terminal candidates from the management system 50 before the terminal 10 establishes a session with another terminal 10 to start the video conference by voice communications.

Note that the destination terminal candidates refer to the terminals 10 that may be specified by the initiating terminal 10 (the terminal that initiates the video conference) as session partners, partners with which the initiating terminal 10 holds the videoconference. That is, the initiating terminal 10 fails to establish sessions with those terminals that are not set as the destination terminal candidates, and thus is not able to hold a video conference with those terminals. Note that the destination terminal candidates are candidates as partner terminals with which the initiating terminal 10 holds a video conference with, namely, partner terminal candidates.

Note that the status information indicates an operation status (an ONLINE status or an OFFLINE status) of each terminal 10, and further indicates a detailed status in the ONLINE status indicating whether the line is in a busy status or a waiting status (hereinafter called a "communication status") in the ONLINE status. The status information further indicates various statuses other than the operation status and the communication status of each terminal 10, such as statuses in which a cable is disconnected from the terminal 10, sound-voice is capable of being output but images are incapable of being output, audio-voice output is set as being disabled (MUTE), and the like. In the following, an illustration is given of an example of the status information including the operation status and the communication status.

When the initiating terminal 10 operates as a start request terminal, the communications part 11 transmits start request information to the management system 50. Note that the start request information serves as information that request the start of a session used in a video conference. Specifically, the start request information includes information representing an indication to request the start of the session, a terminal ID of the start request terminal serving as a transmission source of the start request information, a terminal ID identifying a destination terminal serving as a session partner, and restriction information indicating attendance restriction, namely, the presence or absence of the attendance restriction on terminal other than the destination terminal to attend the session. Note that the terminal ID is information for identifying the terminal 10.

The start request information specifically includes "Invite" or "Private Invite". Here, the "Invite" includes information representing an indication to request the start of the session, and restriction information indicating the absence of attendance restriction. On the other hand, "Private Invite" includes information representing an indication to request the start of the session, and restriction information indicating the presence of the attendance restriction.

In the following, a detailed description is given of the restriction information. In the transmission system 1 of the embodiments, other terminals 10 may attend the session that has already been established. However, there may be some conferences such as highly confidential conferences which other terminals 10 are preferably not allowed to attend. In the transmission system 1, the attendance of the terminals 1 to the session that has been established may be restricted based on the presence or absence of the attendance restriction indicated in the restriction information.

When the initiating terminal 10 operates as an attendance request terminal, the communications part 11 transmits attendance request information to the management system 50. Note that the attendance request information is information to request attending the established session for use in the already started video conference. Specifically, the attendance request information includes information "Call" indicating the attendance request information, a terminal ID of the attendance request terminal serving as a transmission source of the attendance request information, and a terminal ID of an attending terminal that is currently attending the established session which the attendance request terminal desires to attend. Specifically, the attending terminal may be a start request terminal or a destination terminal indicated in the start request information transmitted the established session is initiated. Note that the communications part 11 serves as a start request information acquisition part configured to acquire the start request information, and also serves as an attendance request information acquisition part configured to acquire the attendance request information.

The operation input receiver 12 is implemented by an operations button 108 and a power supply switch 109 illustrated in FIG. 2, and is configured to receive various types of input from a user. For example, when the user switches the power supply switch 109 illustrated in FIG. 2 ON, the operation input receiver 12 illustrate in FIG. 5 receives a power ON instruction and switches the power ON.

The login request part 13 is implemented by the CPU 101 illustrated in FIG. 2, and is configured to transmit login request information representing an indication to request logging in, and a current IP address of the terminal 10 from the communications part 11 the management system 50 via the communications network 2, which is triggered by the reception of the power ON instruction. Further, when the user switches the power supply switch 109 from the ON-status to an OFF-status, the operation input receiver 12 completely switches the power OFF after the communications part 11 transmits the status information representing an indication to switch the power OFF. Hence, the management system 50 may be able to detect change of the power status of the terminal 10 from the power ON status to the power OFF status.

The imager 14 is implemented by a camera 112 and an imaging device I/F 113, and is configured to image a subject to output image data of the subject. The sound-voice input part 15a is implemented by the sound-voice input I/F 116 illustrated in FIG. 2, and is configured to input sound-voice data associated with sound-voice signals when sound and voice of the user are converted by the microphone 14 into the sound-voice signals. The sound-voice output part 15b is implemented by the CPU 101 and the sound-voice input I/F 116 illustrated in FIG. 2, and is configured to output the sound-voice signals associated with the sound-voice data to the speaker 115 so that the speaker 115 outputs sound and voice.

The display controller 16 is implemented by the display I/F 117, and is configured to control transmission of image data with respect to an externally attached display 120. Before the terminal 10 serving as a request source starts communications of the video conference with a desired destination terminal 10, the display controller 16 causes the display 120 to display a destination list including destination names that reflect status information received after the communications part 11 starts receiving the image data.

The delay detector 18 is implemented by the CPU 101 illustrated in FIG. 2, and is configured to detect delay time (ms) of image data or sound-voice data transmitted from another terminal 10 via the relay apparatus 30.

The storing-reading processor 19 is implemented by the CPU 101 illustrated in FIG. 2 and the SSD 105 illustrated as an example in FIG. 2, and is configured to store various types of data in the nonvolatile storage part 1000 or read various types of data from the nonvolatile storage part 1000. The nonvolatile storage part 1000 stores terminal IDs (identification) for identifying the terminals 10, associated passwords, and the like. The storing-reading processor 19 is further configured to store various types of data in the volatile storage part 1002 or read various types of data from the volatile storage part 1002. The volatile storage part 1002 stores content data received when the terminal 10 performs communications with the destination terminal, and overwrites the stored content data every time the volatile storage part 1002 receives the content data. The display 120 displays an image based on the image data before being overwritten, and the speaker 115 outputs sound and voice based on the sound-voice data before being overwritten.

The destination list generator 20 is configured to generate and update an address list indicating statuses of the destination candidates illustrated in FIG. 23 with icons, based on the later-described destination list information and the status information of the terminals 10 serving as the later-described destination candidates.

Functional Configuration of Relay Apparatus

Next, an illustration is given of functions and processes performed by the relay apparatus 30. The relay apparatus 30 includes a communications part 31, a status detector 32, a data quality verification part 33, a change quality manager 34, a data quality change part 35, and a storing-reading processor 39. Each of the above components is a function and a process implemented by operations of the CPU 201 performed in accordance with programs stored in the ROM 202 illustrated in FIG. 3. Further, the relay apparatus 30 is composed of the HD 204 illustrated in FIG. 3, and includes the nonvolatile storage part 3000 capable of maintaining various types of data and information even though the power of the relay apparatus 30 is switched OFF.

Change Quality Management Table

The nonvolatile storage part 3000 includes a change quality management database (DB) 3001 composed of a change quality management table illustrated in FIG. 6. The change quality management table is configured to manage IP addresses of the terminals 10 serving as relay destinations of the image data in association with an image quality of the image data relayed by the relay apparatus 30.

Figure 7A:
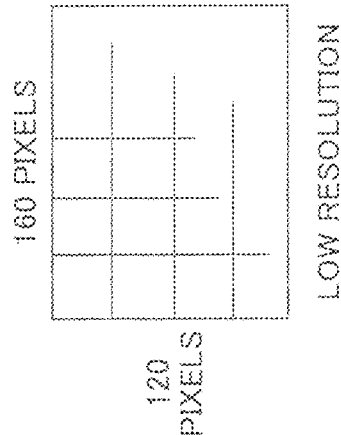
FIGS. 7A, 7B, and 7C are conceptual diagrams illustrating image data qualities.
Figure 7B:
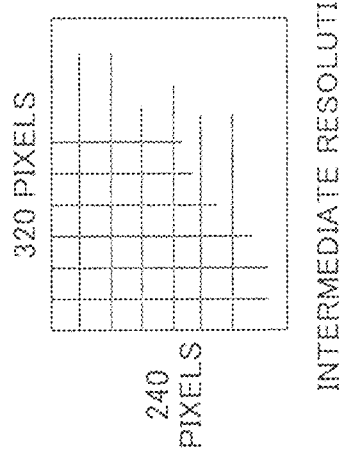
Figure 7C:
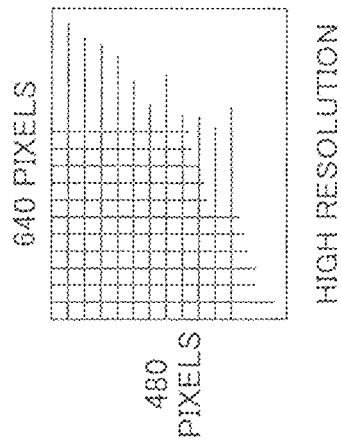

In the following, an illustration is given, with reference to FIGS. 7A, 7B, and 7C, of resolution of an image of the image data handled by the transmission system 1 of the embodiments. FIGS. 7A, 7B, and 7C are conceptual diagrams illustrating image data qualities. FIG. 7A illustrates an image of low resolution having horizontal 160 pixels and vertical 120 pixels serving as a base image, FIG. 7B illustrated an image of intermediate resolution having horizontal 320 pixels and vertical 240 pixels, and FIG. 7C illustrates an image of high resolution having horizontal 640 pixels and vertical 480 pixels. When the image data are transmitted via a narrow band route, low quality image data composed of low resolution image data serving as the base image are relayed. When the image data are transmitted via a relatively broad band route, intermediate quality image data composed of intermediate resolution image data and low resolution image data serving as the base image are relayed. Further, when the image data are transmitted via a exceedingly broad band route, high quality image data composed of high resolution image data and intermediate resolution image data are relayed. For example, in the change quality management table illustrated in FIG. 6, when the relay apparatus 30 relays image data with respect to a destination terminal having an IP address "1.3.2.4", the quality (image quality) of the relaying image data is "high image quality".

Functional Components of Relay Apparatus

Next, an illustration is given of functional configurations of the relay apparatus 30. Note that in the following, an illustration is also given of a relationship with main components illustrated in FIG. 3 for implementing the functions of the relay apparatus 30.

The communications part 31 of the relay apparatus 30 5 is implemented by the network I/F 209 illustrated in FIG. 3, and configured to perform transmission and reception of various types of data (or information) with other terminals, apparatuses, or systems via the communications network 2. The status detector 32 is implemented by a CPU 201 illustrated in FIG. 3, and is configured to detect an operation status of the relay apparatus 30 having the status detector 32. The operation status includes an "ONLINE" status, an "OFFLINE" status, and a "failure" status.

The data change verification part 33 is implemented by the CPU 201 illustrated in FIG. 3, and is configured to search the change quality management table (see FIG. 6) by the IP address of the destination terminal as a search key and extract the image quality of the corresponding image data so as to verify the image quality of the relaying image data. The change quality manager 34 is implemented by the CPU 201 illustrated in FIG. 3, and is configured to change content of the change quality management table of the change quality management DB 3001, based on the later-described quality information transmitted from the management system 50. For example, it may be necessary to degrade the image quality of the image data that have been relayed by the relay apparatus 30 from the high image quality to the intermediate image quality when delay in receiving the image data caused in the destination terminal (the terminal 10db). This delay may be caused by starting the video conference and the like between the star request terminal (the terminal 10bb) currently conducting another video conference and the destination terminal (the terminal 10ca) via the communications network 2 while the video conference is conducted by transmitting and receiving the high image quality image data between the start request terminal (the terminal 10aa) having the terminal ID "01aa" and the destination terminal having the terminal ID "01db". In such a case, the content of the change quality management table of the change quality management DB 3001 is changed so as to degrade the image quality of the image data relayed by the relay apparatus 30 from the high image quality to the intermediate image quality, based on quality information indicating the intermediate image quality.

The data quality change part 35 is implemented by the CPU 201 illustrated in FIG. 3, and is configured to change the image quality of the image data transmitted from the terminal 10 serving as a transmission source based on the content of the change quality management table of the change quality management DB 3001. The storing-reading processor 39 is implemented by the HDD 205 illustrated in FIG. 3, and is configured to store various types of data in the nonvolatile storage part 3000, and read various types of data from the nonvolatile storage part 3000.

Functional Configuration of Management System

Next, an illustration is given of functions and processes performed by the management system 50. The management system 50 includes a communications part 51, a terminal authentication part 52 status manager 53, a terminal extracting part 54, a terminal status acquisition part 55, a relay apparatus selector 56, a session manager 57, a quality determination part 58, a storing-reading processor 59, a delay time manager 60, a change request information determination part 61, a destination determination part 62, and a attendance determination part 63. Each of the above components is a function and a process implemented by operations of the CPU 201 performed in accordance with programs stored in the ROM 202 illustrated in FIG. 3. Further, the management system 50 is composed of the HD 204 illustrated in FIG. 3, and includes the nonvolatile storage part 5000 capable of maintaining various types of data and information even though the power of the management system 50 is switched OFF. The nonvolatile storage part 5000 is configured to store various types of information.

Further, the nonvolatile storage part 5000 includes a volatile storage part 5100 composed of the RAM 203 illustrated in FIG. 3.

Relay Apparatus Management Table

The nonvolatile storage part 5000 includes a relay apparatus management database (DB) 5001 composed of a relay apparatus management table illustrated in FIG. 8. The relay apparatus management table is configured to manage operation statuses of the relay apparatuses 30, received dates and times at which the management system 50 has received the status information indicating the operation statuses, IP addresses of the relay apparatuses 30, and the maximum data transmission rates (Mbps) of the relay apparatuses 30 in association with respective relay apparatus IDs identifying the relay apparatuses 30. For example, in the relay apparatus management table illustrated in FIG. 8, the relay apparatus 30a having the relay apparatus ID "111a" is in an operation status indicating "ONLINE", date and time of the status information received by the management system 50 indicating "13:00 November 10, 2009 (2009.11.10.13:00)", the IP address of the repay apparatus 30a indicating "1.2.1.2", and the maximum data transmission rate indicating "100 Mbps".

Terminal Authentication Management Table

Further, the nonvolatile storage part 5000 includes a terminal authentication management DB 5002 composed of a terminal authentication management table illustrated in FIG. 9. The terminal authentication management table is configured to manage the terminal IDs of all the terminals 10 managed by the management system 50 in association with respective passwords. Note that the terminal IDs are information for identifying the respective terminals 10, and the passwords are information used for authenticating the respective terminals 10. For example, in the terminal authentication management table illustrated in FIG. 9, the terminal ID of the terminal 10aa is "01aa", and the corresponding passwords are "aaaa".

Note that the terminal IDs and the relay apparatus IDs in the transmission system 1 of the embodiments are provided with identification information composed of languages, characters, symbols, various types of marks, and the like that uniquely identify the terminals 10 and the relay apparatuses 30. Further, the terminal ID and the relay apparatus ID may be identification information composed of a combination of at least two of the above languages, characters, symbols, and marks.

Terminal Management Table

Further, the nonvolatile storage part 5000 includes a terminal management DB 5003 composed of a terminal management table illustrated in FIG. 10. The terminal management table is configured to manage the terminal names, the operation statuses of the terminals 10, the communication statuses with other terminals, received dates and times at which the management system 50 has received the later-described login request information, and the IP addresses of the terminals 10 in association with the respective terminal IDs of the terminals 10.

Note that the operation status includes an ONLINE status in which the power is switched on and the terminal is in a standby mode or in a busy mode, and an OFFLINE status in which the power is not switched on, and hence the terminal is not in the standby mode.

Further, the communication status includes "Calling", "Ringing", "Accepted", "Busy", and "None". The "Calling" indicates a state of calling another terminal 10. That is, the terminal 10 transmits session start request information for use in the video conference to another terminal 10, and waits for a response. The "Ringing" indicates a state of being called from another terminal 10. That is, the terminal 10 receives the start request information from another terminal 10, but has not transmitted a response to the received start request information. The "Accepted" indicates a state of having transmitted a response with permission to the start request information from another terminal 10 but the session has not been established, or having received a response to the transmitted start request with permission from another terminal 10 but the session has not been established. The "Busy" indicates a state of having the session established with another terminal 10, and transmitting content data in the TV conference. The "None" indicates a stand by state of not communicating with other terminals.

Note the above communication statuses correspond to the sessions without the attendance restriction, which are established in response to the start request information including restriction information indicating no attendance restriction. Further, the management system 50 of the embodiments manages the communication statuses corresponding to the sessions with attendance restriction separately from the communication statuses corresponding to the sessions without the attendance restriction. The communication statuses corresponding to the sessions with attendance restriction are established in response to the start request information including restriction information indicating attendance restriction. That is, the communication statuses without attendance restriction includes "Calling", "Ringing", "Accepted", and "Busy", and the communication statuses with attendance restriction includes "Private Calling", "Private Ringing", "Private Accepted", and "Private Busy". The management system 50 of the embodiments manages the communication statuses separately based on the presence or absence of the attendance restriction as described above. Thus, the presence or absence of the attendance restriction may be specified based on the communication status in the management system 50 of the embodiments.

Note that in the present embodiments, it is anticipated that the session is established with restriction information being attendance restriction. Hence, only the "Private Calling", "Private Ringing", "Private Accepted", and "Private Busy" are used as the communication statuses other than "None" in the present embodiments.

For example, in the terminal management table illustrated in FIG. 10, the terminal 10*aa* having the terminal ID "01*aa*" has the terminal name being "AA Terminal, Tokyo Office, Japan", the operation status being "Online", the communication status being "None" indicating not communicating with another terminal and the standby mode, the date and time at which the management system 50 has received the login request information being "2009.11.10.13:40" (i.e., 13:40 November 10, 2009), and the IP address of the terminal 10*aa* being "1.2.1.3".

Further, in the terminal management table illustrated in FIG. 10, to focus on the communication status, the terminal having the terminal ID "01*ba*" has the communication status "Private Calling", the terminal having the terminal ID "01*bb*" has the communication status "Private Busy", and the terminal having the terminal ID "01*da*" has the communication status "Private Busy".

Destination List Management Table

Further, the nonvolatile storage part 5000 includes a destination list management DB 5004 composed of a destination list management table illustrated in FIG. 11. The destination list management table is configured to manage start request terminal IDs of the terminals 10 serving as request sources of the session start request information for use in the video conference including voice communications managed by the management system 50 in association with the terminal IDs of the terminals 10 identifying destination terminal candidates serving as destination candidates to which content data are transmitted from the request source terminals 10. For example, in the destination list management table illustrated in FIG. 11, the destination terminal candidates capable of transmitting a video conference start request from the terminal (the terminal 10*aa*) having the terminal ID "01*aa*" are the terminal 10*ab* having the terminal ID "01*ab*", the terminal 10*db* having the terminal ID "01*db*", and the terminal 10*dc* having the terminal ID "01*dc*". The destination terminal candidates may be updated by transmitting an addition request or a deletion request from the start request terminal to the management system 50.

Session Management Table

Further, the nonvolatile storage part 5000 includes a session management DB 5005 composed of a session management table illustrated in FIG. 12. The session management table is configured to manage the relay apparatus IDs for use in relaying content data in the respective sessions, the terminal IDs of start request terminals serving as transmission sources of the session start request information, the terminal IDs of the destination terminals specified as communication partners in the session start information, delay times (ms) in receiving the image data in the destination terminals, and received dates and times at which the management system 50 receives delay information including delay times transmitted from the destination terminals in association with the session IDs for identifying respective sessions for transmitting content data between the terminals. For example, in the session management table illustrated in FIG. 12, the relay apparatus 30*e* (the relay apparatus ID "111*e*") selected in the session executed by using the session ID "se1" relays content data between the start request terminal (10*aa*) having the terminal ID "01*aa*" and the destination terminal (the terminal 10*db*) having the terminal ID "01*db*". Hence, the session management table indicates that the delay time in receiving the image data at "2009.11.10.14:00" (i.e., 14:00 November 10, 2009) is 200 (ms) in the destination terminal (the terminal 10*db*). Note that when the video conference is held between the above two terminals 10, the session management table may manage received dates and times at which the relay information has been received based on the delay information transmitted not from the destination terminal but the delay information transmitted from the start request terminal. However, when the video conference is held between three or more terminals 10, the session management table may manage the received dates and times based on the delay information transmitted from the terminal 10 that has received the content data.

Quality Management Table

Further, the nonvolatile storage part 5000 includes a quality management DB 5007 composed of a quality management table illustrated in FIG. 13. The quality management table is configured to manage the image quality (the quality of an image) of the image data relayed by the relay apparatus 30 based on the delay times (ms) of the image data in the start request terminals or the destination terminals.

Relay Apparatus Selection Management Table

Further, the nonvolatile storage part 5000 includes a relay apparatus selection management 5008 composed of a relay apparatus selection management table illustrated in FIG. 14. The relay apparatus selection management table is configured to manage the terminal IDs of all the terminals managed by the management system 50 in association with the relay apparatus IDs of the relay apparatuses 30 used in relaying the content data.

Status Change Quality Management Table

Further, the nonvolatile storage part 5000 includes a status change management DB 5009 composed of status change management tables illustrated in FIGS. 15 and 16. The status change management table in FIG. 15 is configured to manage the change request information indicating requests for changing the communication statuses in association with pre-change status information indicating pre-change communication statuses to be changed by the later described status manager 53, and change information indicating post-change communication statuses changed by the status manager 53. Further, the status change management table in FIG. 16 is configured to manage the change request information in association with the terminal information for identifying the start require terminals and the destination terminals, the pre-change status information, and the change information.

In the status change management table in FIG. 16, when the management system 50 receives the change request information "Private Invite", the management system 50 changes the pre-change communication status "None" of the start request terminal to "Private Calling", and the pre-change communication status " " of the destination terminal to "Private Ringing". Note that the change request information includes "Invite", "Private Invite", and "Accept" illustrated in FIG. 16, and "Join", "Call", and "Leave" illustrated in FIG. 15.

Note that in the present embodiments, each session is established based on the assumption of the restriction information with the attendance restriction, only "Private Accepted", "Private Busy", "Private Calling", "Private Ringing", "Private Accepted", and "Private Busy" are used for the pre-change status information and the change information in FIGS. 15 and 16. Further, the change request information "Invite" in FIG. 16 is not used with similar reasons.

The "Invite" is information included in the start request information, which serves as change request information associated with transmission of the start request information. The "Accept" is change request information associated with reception of a response to the start request information, which indicates the indication to allow initiation of communications, that is, the establishment of a session. The "Join" is change request information associated with completion of session establishment corresponding to the start request information, which indicates the indication to request initiation of relaying the content data. The "Call" is information included in the attendance request, and serves as change request information associated with the transmission of the attendance request, which indicates the indication to request attendance at the established session. The "Leave" is change request information, which indicates the indication to terminate the session.

Functional Components of Management System

Next, an illustration is given of functional components of the management system 50. Note that in the following, an illustration is also given of a relationship with main components illustrated in FIG. 3 for implementing the functions of the management system 50.

The communications part 51 is implemented by the network I/F 209 illustrated in FIG. 3, and configured to perform transmission and reception of various types of data (or information) with other terminals, apparatuses, or systems via the communications network 3. The terminal authentication part 52 searches the terminal authentication management table (see FIG. 9) of the nonvolatile storage part 5000 by the terminal ID and its password included in the login request information received via the communications part 51 as a search key, and authenticates the terminal based on the determination of whether the identical terminal ID and its password are managed in the authentication management table.

Further, when the attendance determination part 63 determines that the established session has the attendance restriction so as not to allow the attendance, the communications part 51 serves as the communications parts to transmit an attendance failure report to the terminal that has transmitted the attendance request.

The status manager 53 is configured to manage the operation statuses and the communication statuses in the terminal management table illustrated in FIG. 10. The status manager 53 is configured to manage the operation statuses of the login requested terminals 10 (the login request terminals) in the terminal management table (see FIG. 10) to store the terminal IDs of the login request terminals in association with the operation statuses of the login request terminals, received dates and times at which the management system 50 has received the login request information, and the IP addresses of the login request terminals. When the user of the terminal 10 switches the power supply switch 109 of the terminal 10 from an OFF status to ON status, the status manager 53 sets the operation status indicating "OFFLINE" in the terminal management table (see FIG. 10) to "ONLINE". When the user of the terminal 10 switches the power supply switch 109 of the terminal 10 from an OFF status to ON status, the status manager 53 sets the operation status indicating "OFFLINE" in the terminal management table (see FIG. 10) to "ONLINE" based on the information representing an indication to switch the power OFF transmitted from the terminal 10.

When the communications part 51 receives the change request information transmitted by the start request terminal or the destination terminal in the video conference start request information, the status manager 53 appropriately changes at least one of the communication status and the operation status of at least one of the start request terminal and the destination terminal in the terminal management table (see FIG. 10).

Figure 17:
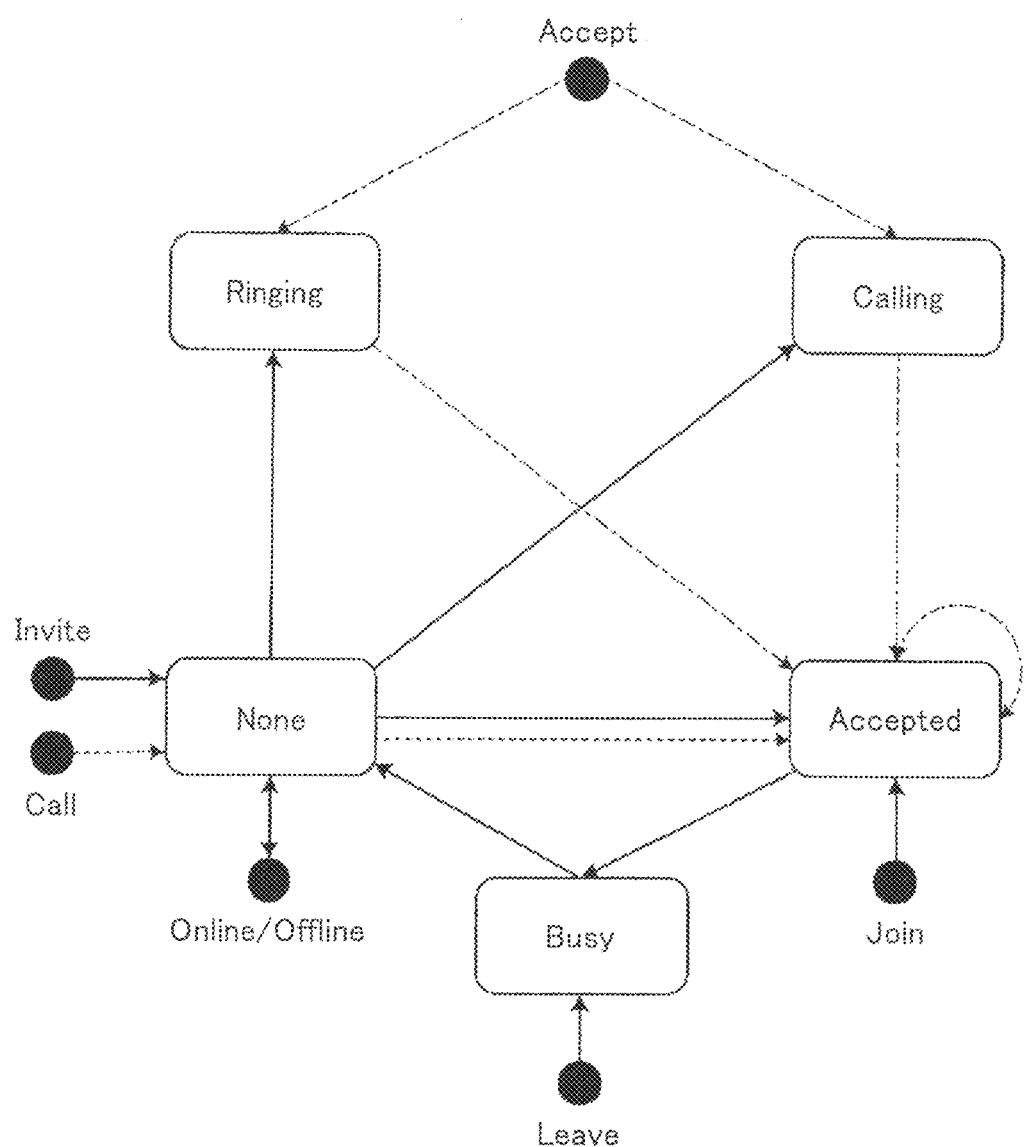
FIG. 17 is a status transition diagram of a communication status.
Figure 18:
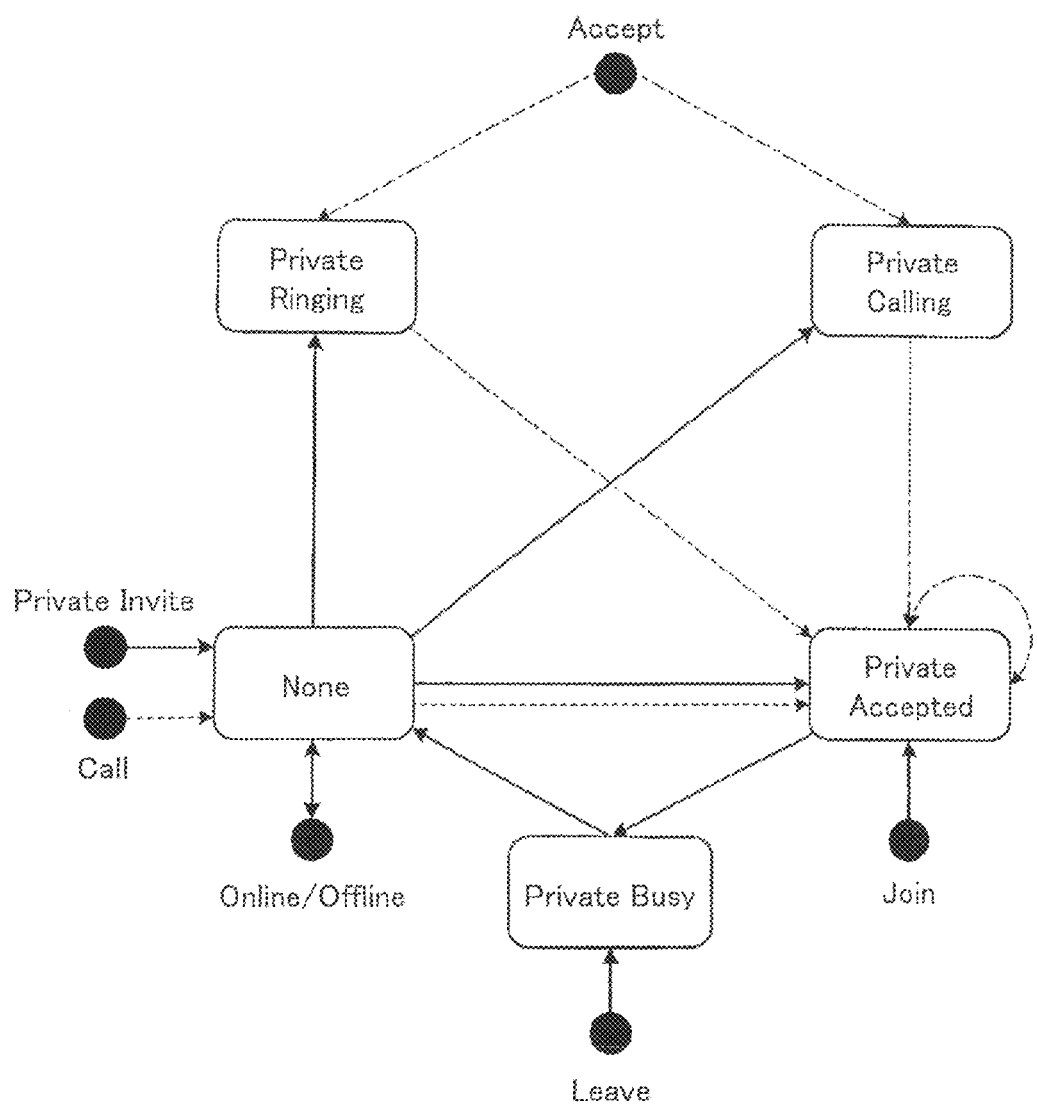
FIG. 18 is another status transition diagram of the communication status.

FIGS. 17 and 18 are status transition diagrams illustrating the communication status managed by the status manager 53. The status manager 53 changes the communication status of the terminal 10 in accordance with rules (see FIGS. 17 and 18) for changing the communication status implemented by referring to the status change management tables illustrated in FIGS. 15 and 16.

For example, when the status manager 53 receives the change request information "Accept", and the communication status of the terminal 10 is "Private Ringing" or "Private Calling", the status manager 53 changes the communication status to the communication status "Private Accepted" as illustrated in FIG. 18. Further, when the communication status of the terminal 10 is "Private Accepted", the status manager 53 allows the communication status of the terminal 10 to remain the communication status "Private Accepted".

In the transmission system 1 of the present embodiments, an example in which the status manager 53 employs the status change management tables (FIGS. 15 and 16) to achieve the status change; however, the embodiments are not limited to this example. In this case, the rules may be defined in the management system programs such that the status manager 53 may be able to change the communication status in accordance with the communication status transition rules indicated by the status transition diagrams illustrated in FIGS. 17 and 18.

The terminal extracting part 54 is configured to search the destination list management table (see FIG. 11) by the terminal ID of a target terminal subjected to processing such as the login request terminal 10 as a search key to read the terminal IDs of the destination terminal candidates capable of communicating with the target terminal, that is, the terminal IDs of the destination terminal candidates with which the target terminal 10 may establish a session, thereby extracting the terminal IDs. Specifically, the terminal extracting part 54 reads the terminal IDs of the destination terminal candidates in association with the terminal IDs of the start request terminals that match the terminal ID of the target terminal in the destination list management table (see FIG. 11).

Further, the terminal extracting part 54 searches the destination list management table by the terminal ID of the target terminal as a search key to extract the terminal IDs of other terminals that have registered the terminal ID of the target terminal as a destination terminal candidate. Specifically, the terminal extracting part 54 reads the terminal IDs of the start request terminals in association with the terminal IDs of the destination terminal candidates that match the terminal ID of the target terminal in the destination list management table (FIG. 11).

The terminal status acquisition part 55 searches the terminal management table (see FIG. 10) by the terminal ID as a search key to read the operation status and the communication status of each terminal ID. As a result, the terminal status acquisition part 55 may be able to acquire the operation status of the destination terminal candidate capable of communicating with the login request terminal. Further, the terminal status acquisition part 55 also searches the terminal management table to acquire the operation status of the login request terminal.

Figure 19:
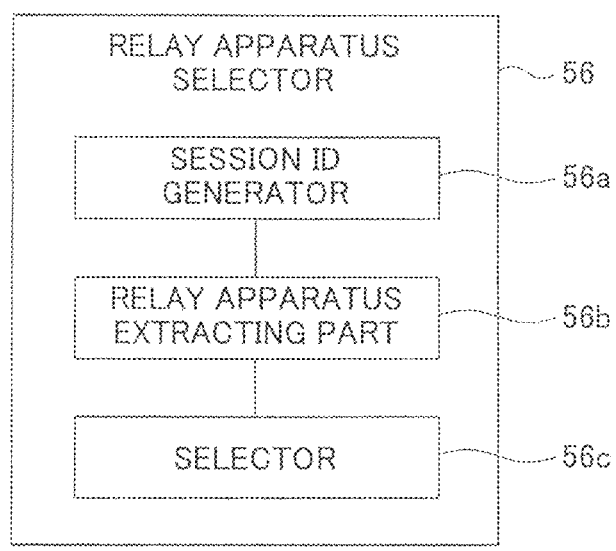
FIG. 19 is a detailed functional block diagram illustrating a relay apparatus selector.

The relay apparatus selector 56 is configured to select one of the relay apparatuses 30. Hence, the relay apparatus selector 56 implements a session ID generator 56a, a relay apparatus extracting part 56b, and a selector 56c illustrated in FIG. 19 by the CPU 201 illustrated in FIG. 3. Note that FIG. 19 is a functional block diagram illustrating details of the relay apparatus selector 56 illustrated in FIG. 5.

In the relay apparatus selector 56, the session ID generator 56a is configured to generate a session ID for identifying a session that transmit content data between the terminals. The relay apparatus extracting part 56b is configured to search the relay apparatus selection table (see FIG. 14) based on the terminal ID of the start request terminal and the terminal ID of the destination terminal included in the start request information transmitted from the start request terminal to extract the relay apparatus IDs corresponding to the terminal ID of the start request terminal and the terminal ID of the destination terminal. The selector 56c is configured to select the relay apparatus IDs of the relay apparatuses 30 having the operation status being "ONLINE" from the relay apparatuses 30 managed in the relay apparatus management table (FIG. 8).

The session manager 57 is configured to manage the session management table (see FIG. 12) of the nonvolatile storage part 5000 to store the session IDs generated by the session ID generator 56a in association with the terminal IDs of the request source terminals, and the terminal IDs of the destination terminals. Further, the session manager 57 is configured to manage the session management table to store the relay apparatus ID of one of the relay apparatuses 30 finally selected for each session ID.

Moreover, the session manager 57 is configured to search the session management table (see FIG. 12) by the terminal IDs of the attendance terminals that have already attended the session subjected to attendance included in the attendance request information as a search key to extract the session ID subjected to the attendance request. Specifically, the session manager 57 is configured to search the session management table (see FIG. 12) for the terminal ID of the start request terminal or the terminal ID of the destination terminal that matches the terminal ID of the attending terminal. The session manager 57 then extracts the session ID that has been associated with the terminal ID matching the terminal ID of the attending terminal.

The quality determination part 58 is configured to search the quality management table (see FIG. 13) by the delay time as a search key to extract the image quality of the corresponding image data, thereby determining the image quality of the image data to be relayed by the relay apparatus 30. The storing-reading processor 59 is implemented by the HDD 205 illustrated in FIG. 3, and is configured to store various types of data in the nonvolatile storage part 5000, and read various types of data from the nonvolatile storage part 5000. The storing-reading processor 59 is further configured to store various types of data in the volatile storage part 5100 or read various types of data from the volatile storage part 5100.

The delay time management part 60 is configured to search the terminal management table (see FIG. 10) by the IP address of the above destination terminal as a search key to extract the terminal ID corresponding to the IP address of the destination terminal, and further to record a delay time indicated in the delay information in a field part of the delay time in the record that includes the extracted terminal ID in the session management table (see FIG. 12).

The change request information determination part 61 is configured to refer to the change request information and determine whether the change request information is specific change request information. Note that the specific change request information includes "Invite", "Private Invite", and "Accept". That is, the specific change request information indicates change request information recorded in the status change management table illustrated in FIG. 16.

The destination determination part 62 is configured to refer to the destination list management table (see FIG. 11) and determine whether the destination terminal ID of the terminal that attends content data session sed extracted by the terminal extracting part 54 includes the destination terminal ID of the attendance request terminal 10.

When the communications part 51 receives the attendance request from a predetermined terminal that desires to attend the already established session, the attendance determination part 63 refers to the restriction information corresponding to the established session to determine whether the predetermined terminal is allowed to attend the established session.

Specifically, when the restriction information specifies the attendance restriction in response to the acquisition of the attendance request information, the attendance determination part 63 does not allow the attendance request terminal to attend the already established session.

Outline Operation of Transmission System

Figure 20:
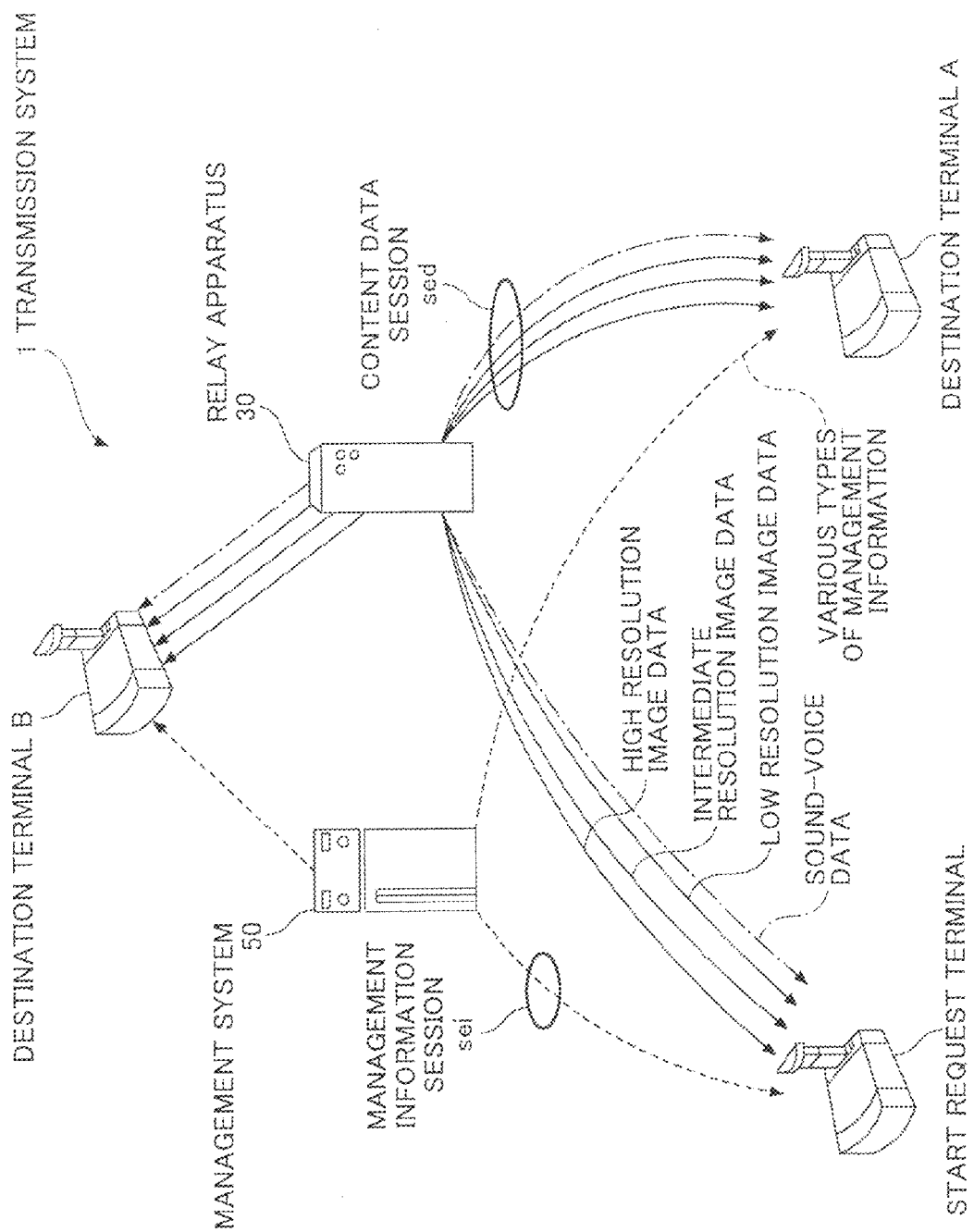
FIG. 20 is a conceptual diagram illustrating transmitting and receiving statuses of content data and various types of management information in the transmission system.

An illustration is given, with reference to FIG. 20, of a concept illustrating transmission and reception statuses of the content data and various types of management information in the transmission system 1. As illustrated in FIG. 20, in the transmission system 1, a management information session sei is established between the start request terminal, the destination terminal A, and the destination terminal B for transmitting and receiving various types of management information via the management system 50. Further, four sessions are established between the start request terminal, the destination terminal A, and the destination terminal B for transmitting and receiving four types of data of high resolution image data, intermediate resolution image data, low resolution image data, and sound-voice data, respectively. In FIG. 20, the four sessions are represented as a content data session sed as a whole. That is, the content data session sed is configured to be used in the video conference.

First Embodiment

Figure 21:
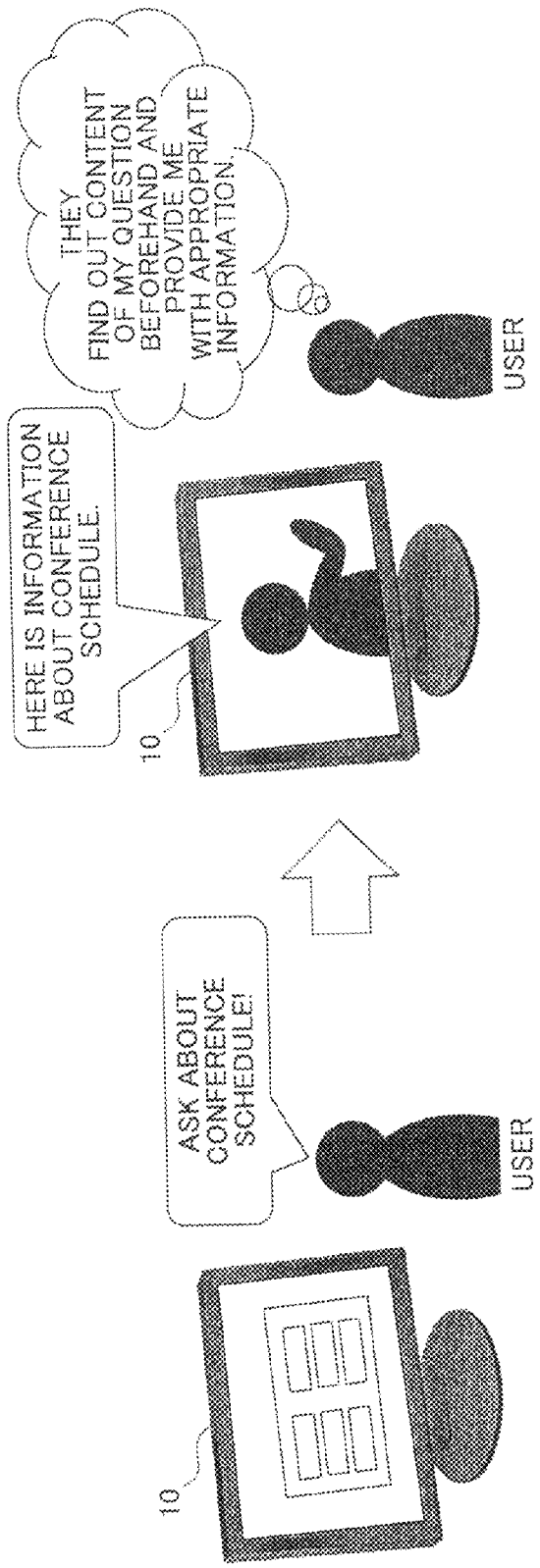
FIG. 21 is a diagram illustrating an example of a service image of a first embodiment.

FIG. 21 is a diagram illustrating an example of a service image of a first embodiment.

FIG. 21 illustrates a progress in which when a user (customer) attempts to make an inquiry about, a conference schedule via the terminal 10, and selects one of the destinations, the user is automatically requested (prompted) to enter a response to at least one of the questions (i.e., questions to ask the purpose of the inquiry made by the user) before the start of the video conference. The response input by the user is transmitted to a receiver, such that the receiver (incoming call receiver) may be able to receive the response to the question and an incoming call at the same time. Hence, a receiver (operator) has grasp the purpose of the inquiry from the user at the start of the video conference, so that the receiver may be able to efficiently handle the main points of the user's inquiry and to the point. Note that the receiver may currently require several to several tens of seconds from responding to the incoming call from the user to the start of the video conference, and hence, the receiver (operator) may efficiently use this standby time to prepare materials necessary for responding to the user's inquiry.

Figure 22:
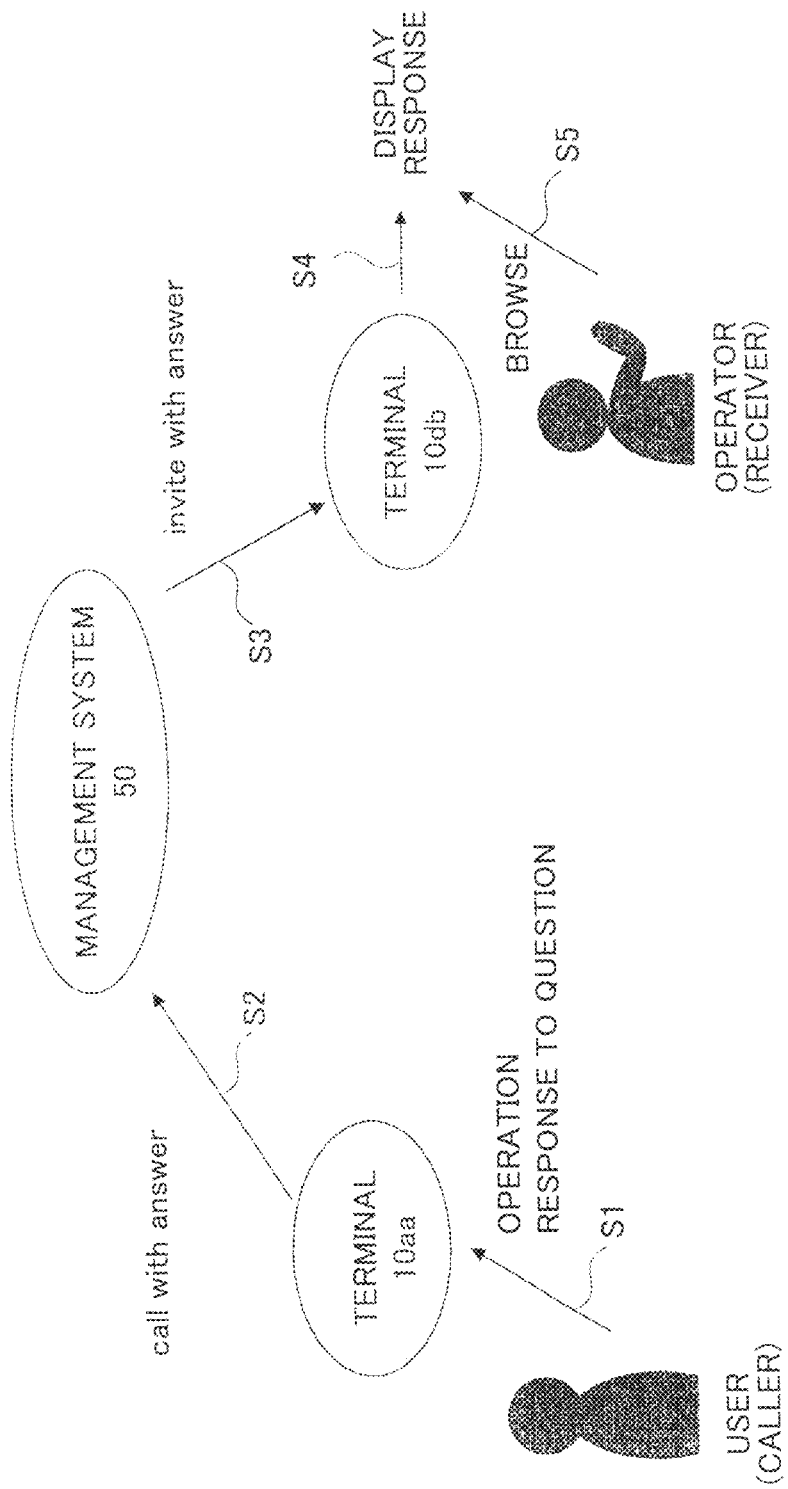
FIG. 22 is a diagram illustrating an example of a process flow of the first embodiment.

FIG. 22 is a diagram illustrating an example of a process flow of the first embodiment.

In FIG. 22, when the user (the caller or customer) performs operations on the terminal 10aa to select a destination and make a response to the question (step S1), the terminal 10aa transmits a session start request together with the response to the question to the management system 20 (step S2).

When the destination terminal 10db is in a standby status (communication capable status), the management system 50 transmits the session start request together with the response to the question to the destination terminal 10db (step S3).

The receiver terminal 10db displays the response to the question at the reception (arrival) of an incoming call (step S4), and hence, the operator of the receiver terminal 10db may be able to browse the display content (step S5) to check the inquiry content and the like before responding to the incoming call.

Figure 23:
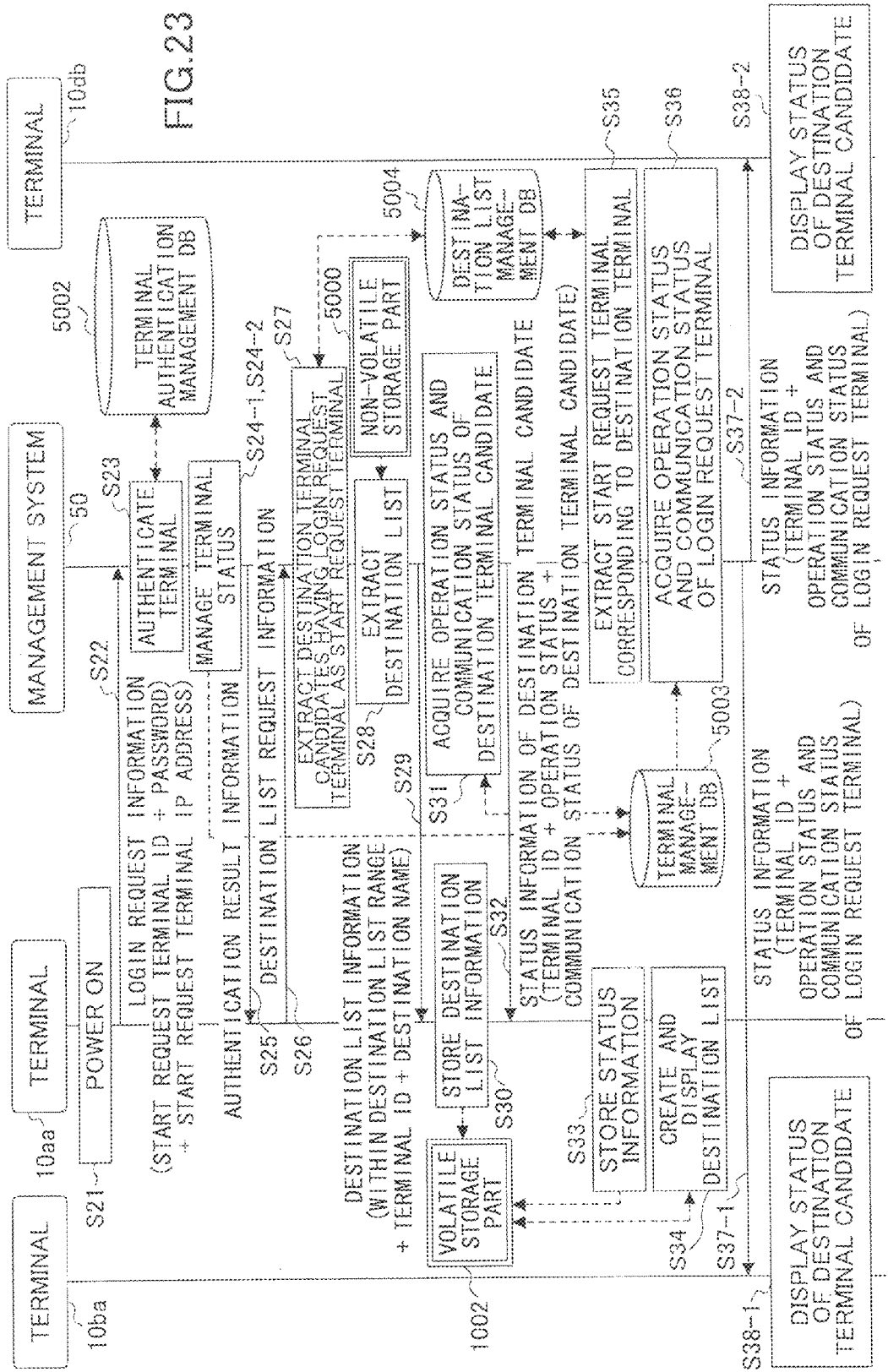
FIG. 23 is a sequence diagram illustrating an example of a process from power supply to display of a destination list in the transmission terminal.

FIG. 23 is a sequence diagram illustrating an example of a process from power supply to display of a destination list in the transmission terminal.

In FIG. 23, when the user of the terminal 10aa switches the power supply switch 109 (see FIG. 2) ON, the operation input receiver 12 (see FIG. 5) switches the power supply ON upon reception of receives the switched ON instruction from the power supply 109 (see FIG. 5). Then, the login request part 13 automatically causes the communications part 11 to transmit login request information indicating a login request to the management system 50 via the communication network 2 based on the reception of the power ON as a trigger (step S22). This login request contains the terminal ID for identifying the terminal 100a serving as a request source, and its password. The terminal ID and the password are data that are read from nonvolatile storage part 1000 via the storing-reading processor 19 and transmitted to the communications part 11. Note that when the login request information is transmitted from the terminal 100aa to the management system 50, the management system 50 serving as the receiver may be able to detect the IP address of the terminal 10aa serving as a transmitter.

Next, the terminal authentication part 52 searches the terminal authentication management table (see FIG. 9) of the nonvolatile storage part 5000 by the terminal ID and its password included in the login request information received via the communications part 51 as a search key, and authenticates the terminal based on the determination of whether the identical terminal ID and its password are managed in the authentication management DB 5002 (step S23).

The terminal authentication part 52 manages the identical terminal ID and its password as described above. Hence, when the terminal authentication part 52 determines the login request being transmitted from the terminal 10aa having a valid access right, the status manager 53 stores in the terminal management table (see FIG. 10) each of the records indicated by the terminal ID and the terminal name of the terminal 10aa in association with the reception date and time at which the above-described login request is received, and the IP address of the terminal 10aa (step S24-1).

Subsequently, the status manager 53 sets the operation status "ONLINE" and the communication status "NONE" of the terminal 10aa, and stores each of the record indicated by the terminal ID and the terminal name of the terminal 10aa in association with the operation status and the communication status (step S24-2).

The communications part 51 of the management system 50 then transmits authentication result information indicating an authentication result obtained by the terminal authentication part 52 via the communications network 2 to the login request terminal (terminal 10aa) that has transmitted the login request (step S25). In the following, an illustration is given of a case when the terminal authentication part 52 determines that the terminal has a valid access right in the transmission system 1.

When the terminal 10aa receives authentication result information indicating a result determined as the terminal having a valid access right, the communications part 11 transmits destination list request information representing an indication to request a destination list via the communications network 2 to the management system 50 (step S26). The communications part 51 of the management system 50 then receives the destination request information.

Subsequently, the terminal extracting part 54 searches the destination list management table (see FIG. 11) by the terminal ID "01aa" of the login request terminal (terminal 10aa) that has transmitted the login request as a search key, and extracts the terminal ID of the destination terminal candidate with which the login request terminal (terminal 10aa) may communicate as the start request terminal, that is, with which the login request terminal (terminal 10aa) may establish a session (step S27). Further, the terminal extracting part 54 searches the terminal management table by the extracted terminal ID as a search key to extract the terminal name corresponding to the extracted terminal ID, that is, to extract the destination terminal candidate by reading the terminal name of the destination terminal candidate.

Subsequently, the communications part 51 of the management system 50 reads data within a destination list range from the nonvolatile storage part 5000 via the storing-reading processor 59 (step S28) as well as transmitting the destination list range and "destination list information (destination list range, the terminal ID, and the terminal name)" extracted by the terminal extracting part 54 to the start request terminal (terminal 10*aa*) (step S29). Hence, in the start request terminal (terminal 10*aa*), the communications part 11 receives the destination list information, and the storing-reading processor 19 stores the destination list information in the volatile storage part 1002 (step S30).

Thus, in the transmission system 1, the destination list information is not managed by each of the terminals 10, and the management system 50 uniformly manages the destination list information of all the terminals. Hence, when a new terminal 10 is added, a new model of a terminal 10 is replaced with the existing terminal 10, or appearance of the address list range is changed, the management system 50 uniformly manages the addition, the change, and the like. Thus, each of the terminals 10 does not have to handle the change of the destination list information.

Further, the terminal status acquisition part 55 of the management system 50 searches the terminal management table by each of the terminal ID of the destination terminal candidates extracted by the terminal extracting part 54, reads the operation status and the communication status corresponding to terminal ID extracted by the terminal extracting part 54, acquires the operation status and the communication status of a corresponding one of the destination terminal candidates (step S31).

Subsequently, the communications part 51 transmits the terminal ID used as the search key in step S31, and the status information including the operation status and the communication status of the corresponding destination terminal candidate to the login request terminal via the communications network (step S32). Specifically, in step S32, the communications part 51 transmits the terminal ID "01*ab*" used as the search key and the status information including the operation status "OFFLINE" of the destination terminal candidate (terminal 10*ab*) to the login request terminal (terminal 10*aa*). Note that when the operation status is "OFFLINE", the status information does not include the communication status. Further, the communications part 51 transmits the terminal ID "01*ba*", the operation status "ONLINE" of the corresponding destination terminal candidate (terminal 10*ba*), and the communication status "Private Calling" to status information for all the destination terminal candidates to the login request terminal (terminal 10*aa*) as part of step S32.

Subsequently, the storing-reading processor 19 of the login request terminal (terminal 10*aa*) sequentially stores the status information received form the management system 50 in the volatile storage part 1002 (step S33). Thus, the login request terminal (terminal 10*aa*) may be able to acquire the current operation status and communication status of the terminal 10*ab* and the like serving as the destination terminal candidates capable of communicating with the login request terminal (terminal 10*aa*) serving as the start request terminal by receiving the status information of a corresponding one of the terminals.

Subsequently, the destination list generator 20 of the login request terminal (terminal 10*aa*) generates a destination list reflecting the operation status and the communication status of the terminals 10 serving as the destination terminal candidates based on the destination list information stored in the volatile storage part 1002 and the status information of the terminal. The display controller 16 then displays the destination list on the display 120*aa* (see FIG. 1) at predetermined timing (step S34).

Subsequently, the terminal extracting part 54 of the management system 50 searches the destination list management table by the terminal ID "01*aa*" of the login request terminal (terminal 10*aa*) as a search key to extract the terminal ID of another terminal (start request terminal) that registers the terminal ID "01*aa*" of the login terminal (terminal 10*aa*) as the destination terminal candidate.

Subsequently, the terminal status acquisition part 55 of the management system 50 searches the terminal management table by the terminal ID "01*aa*" of the login request terminal (terminal 10*aa*) as a search key to acquire the operation status and the communication status of the login request terminal (terminal 10*aa*) (step S36).

The communications part 51 then transmits status information including the terminal ID "01*aa*" of the login request terminal (terminal 10*aa*) acquired in step S36, the operation status "ONLINE", and the communication status "NONE" to the terminal having the operation status indicating "ONLINE" in the terminal management table among the terminals associated with the terminal ID extracted in step S35 (steps S37-1, and S37-2). Subsequently, the terminal 10*ba* and the terminal db display the status information of the respective destination terminal candidates on the displays 120 (steps S38-1, and S38-2). Note that when the communications part 51 transmits the status information to the terminals (10*ba* and 10*db*), the communications part 51 refers to IP addresses of the terminals managed in the terminal management table based on the respective terminal IDs ("01*ba*" and "01*db*"). Hence, the communications part 51 may be able to transmit the terminal ID "01*aa*" of the login request terminal (terminal 10*aa*), the operation status "ONLINE", and the communication status "NONE" to the terminals (terminals 10*ba* and 10*db*) capable of communicating with the login request terminal (terminal 10*aa*) as a destination.

On the other hand, in other terminals 10, when the user switches the power supply switch 109 ON similar to step S21, the operation input receiver 12 receives a power ON instruction to perform processes similar to those in steps S22 to S38-1 and S38-2, and hence, a duplicated illustration of the processes is omitted from the specification.

Figure 24:
FIG. 24 is a diagram illustrating an example of a display screen of the destination list.

FIG. 24 is a diagram illustrating an example of a display screen of the destination list displayed on the terminal 10*aa*. The destination list includes icons of statues of the terminals, which may be acquired from and updated in the terminal management DB constructed in the management system 50 every time the operation statuses have a change. The terminal 10*aa* is not capable of communicating with the communication terminal (10*da*) having the operation status being "OFFLINE" but may be able to select the communication terminals 10 (10*db* and 10*dc*) having the communication status being "ONLINE" (communication capable).

Figure 25:
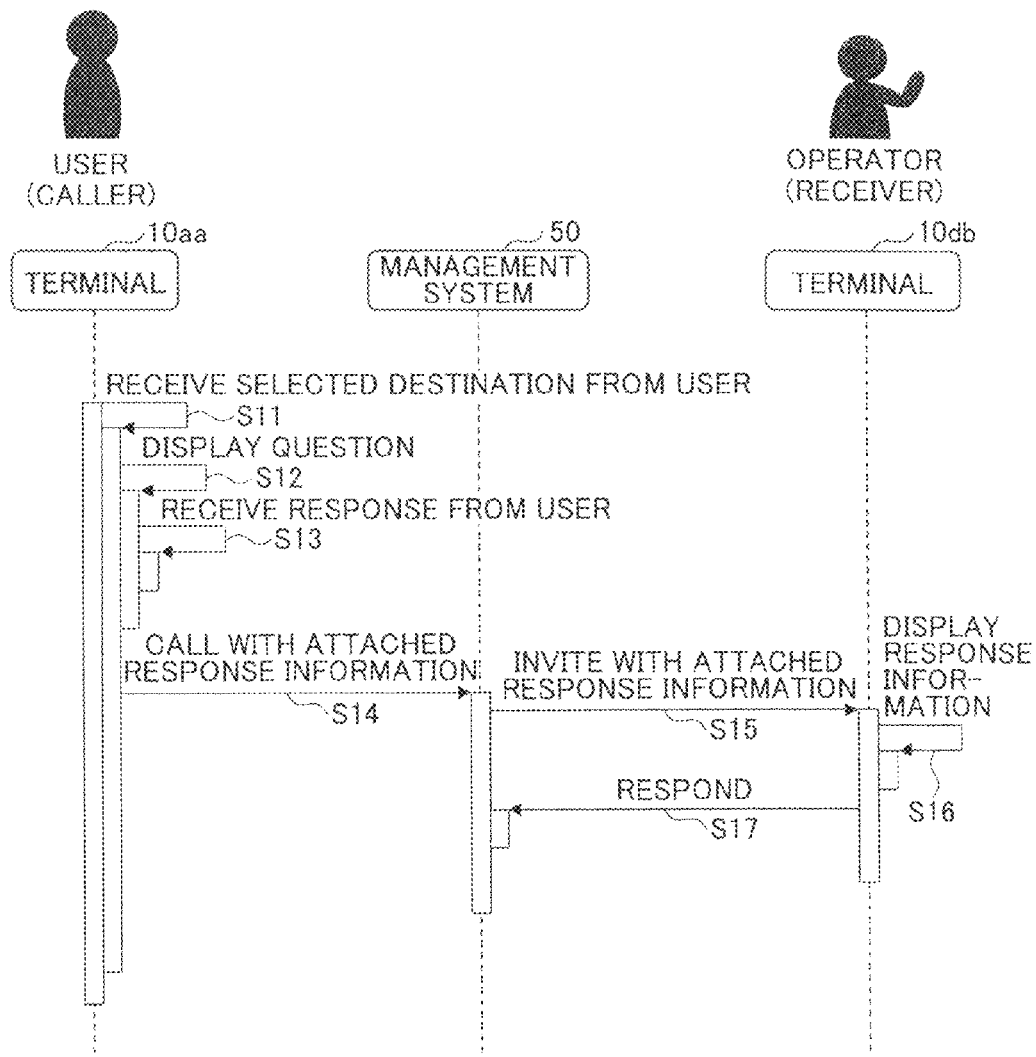
FIG. 25 is a sequence diagram illustrating an example of a process from selection of a destination to a response.

FIG. 25 is a sequence diagram illustrating an example of a process from selection of a destination to a response.

Figure 26:
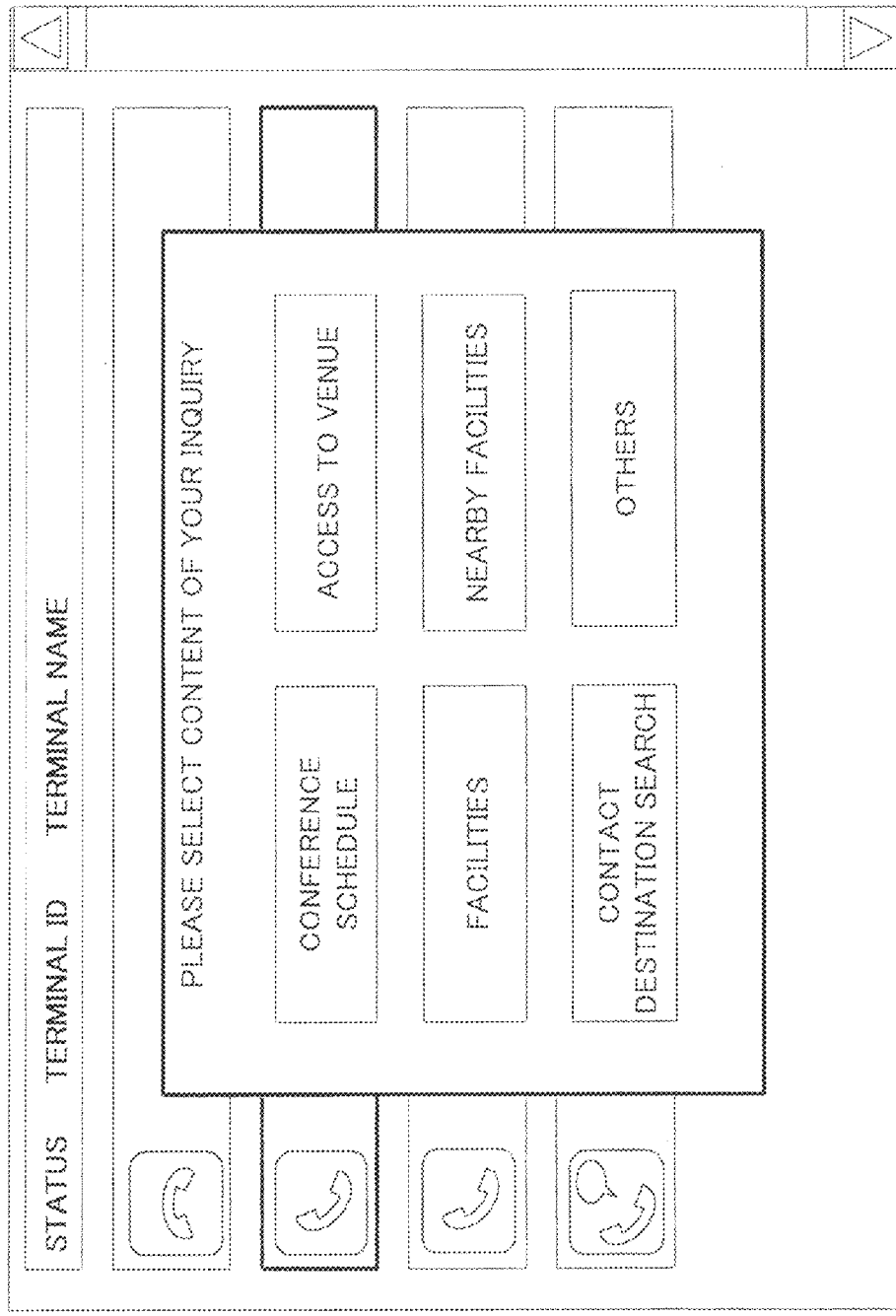
FIG. 26 is a diagram illustrating an example of a screen displaying questions after the destination is selected.

In FIG. 25, when the terminal 10*aa* receives the selection of the destination from the user (step S11), the terminal 10*aa* displays predetermined questions corresponding to the selected destination (step S12). The questions and selectable responses are stored in the terminal associated with the destination. FIG. 26 is a diagram illustrating an example of a screen displaying questions after the destination is selected, displaying listed dialogues any one of which may be selected by a button operation. In this example, the displayed questions are to check inquiry contents of a conference event that are selected from candidates including "conference schedule", "access to venue", "facilities", "nearby facilities", "contact destination search", and "others" by pressing one of desired buttons. Note that the screen may be changed or the screen may set two or more questions to obtain one response. In such a case, similar dialogues are displayed after selection.

Referring back to FIG. 25, when the terminal 10aa receives a response to the question from the user (step S13), the terminal 10aa makes a call (transmits a session start request) together with information having the response content with respect to the management system 50 (step S14). In this example, it is assumed that the call (session start request) is addressed to the terminal 10db.

When the destination terminal 10db is in a standby status (communication capable status), the management system 50 transmits an invitation (a session start request) together with information having a response content to the question to the destination terminal 10db (step S15).

Figure 27:
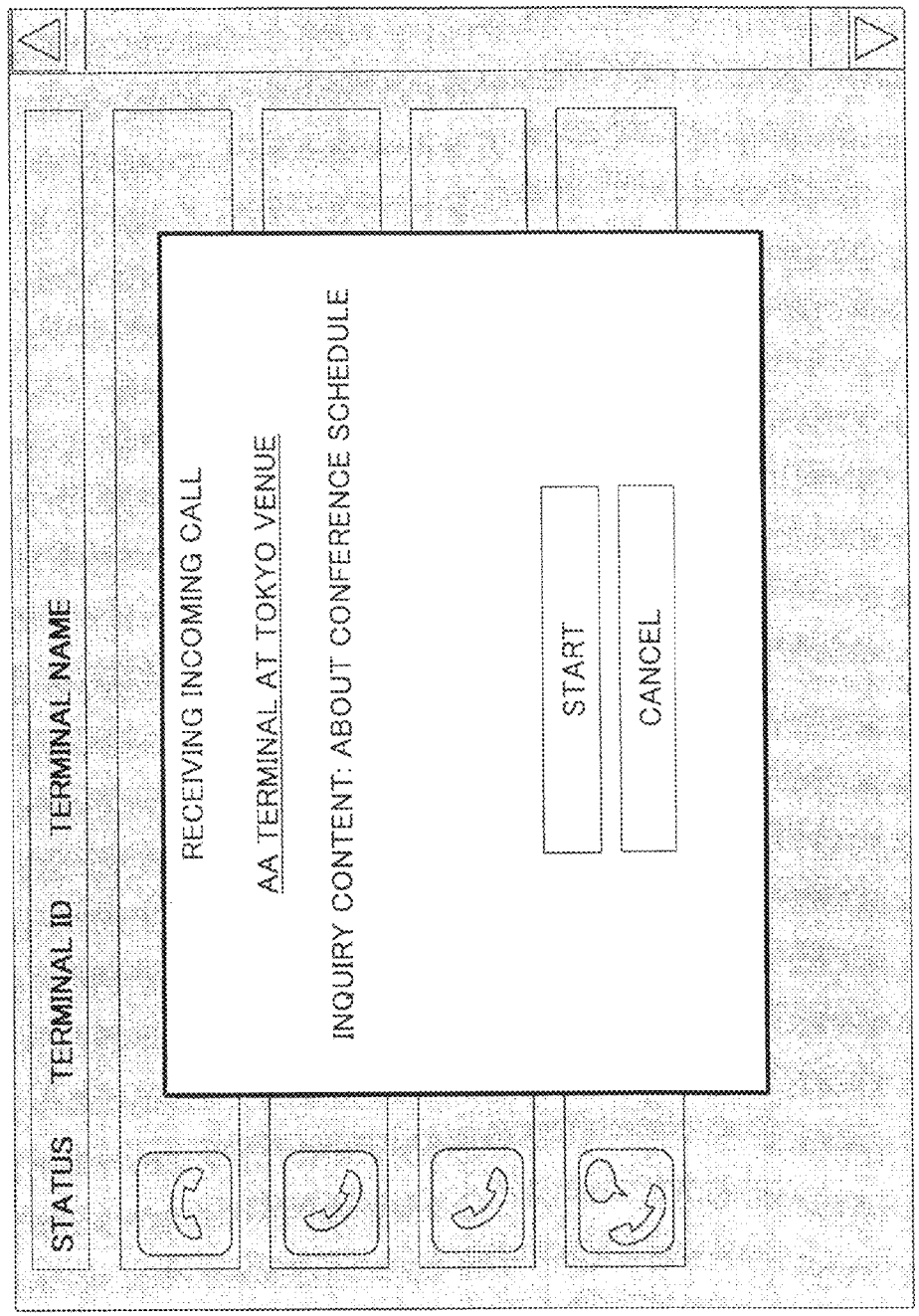
FIG. 27 is a diagram illustrating an example of a screen displaying a response to a question when an incoming call is received.

The terminal 10db displays the response content based on the received information having the response content (step S16). FIG. 27 is a diagram illustrating an example of a screen displaying a response to a question when an incoming call is received, and the screen is configured to display a response content in a response dialog. In this example, the screen displays a "conference schedule" in dialog box as an inquiry content of the response. The operator (receiver of the incoming call) may be able to respond to the incoming call by depressing a start button illustrated in FIG. 27. Note that one response is displayed in this example; however, two or more responses may be displayed in the dialog box when there are two or more responses.

Further, a video conference starting process starts by depressing the start button; however, it may take several to several tens sec. to start the video conference. Hence, the operator (receiver) may be able to prepare materials and the like that are appropriate for the response content. In the example of FIG. 27, the conference schedule will be presented to the user (communication partner). Hence, the operator may prepare to display a schedule list on the screen of his or her PC.

Referring back to FIG. 25, when the operator (receiver of the incoming call) who has checked the response content performs a response operation, an indication of the response operation is transmitted to the management system 50 (step S17).

The operator (receiver of the incoming call) who is on standby on the terminal 10db may be able to browse the response information (inquiry content etc.) of the conference initiator before the start of the video conference to handle conversation and the like with the user thereafter.

In the following, a description is given of the above process more in detail.

Figure 28:
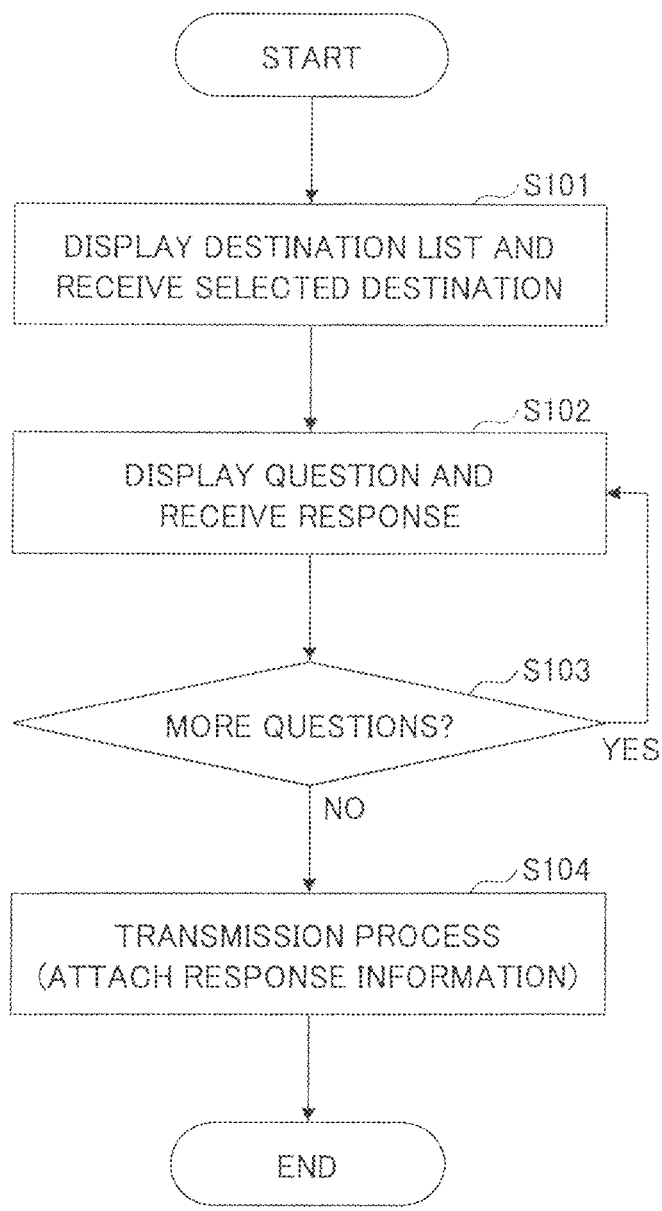
FIG. 28 is a flowchart illustrating an example of a process from display of the destination list to transmission in a caller side terminal.

FIG. 28 is a flowchart illustrating an example of a process from display of the destination list to transmission in a calling side terminal.

In FIG. 28, when the terminal 10 displays the destination list, and receives the selection of the destination (step S101), the terminal 10 displays questions, and receives a response to the selected one of the questions (step S102).

The terminal 10 then checks whether there are remaining questions (step S103). When there are remaining questions (YES in step S103), the terminal 10 repeats the processes from displaying questions and receiving a response (step S102) for the subsequent question(s).

When there is no remaining question (NO in step S103), the terminal 10 performs a transmission process by attaching information having the response content (step S104), and then ends the process.

Note that when there is only one question, the process (step S103) to determine whether there is a remaining question may be omitted.

Figure 29:
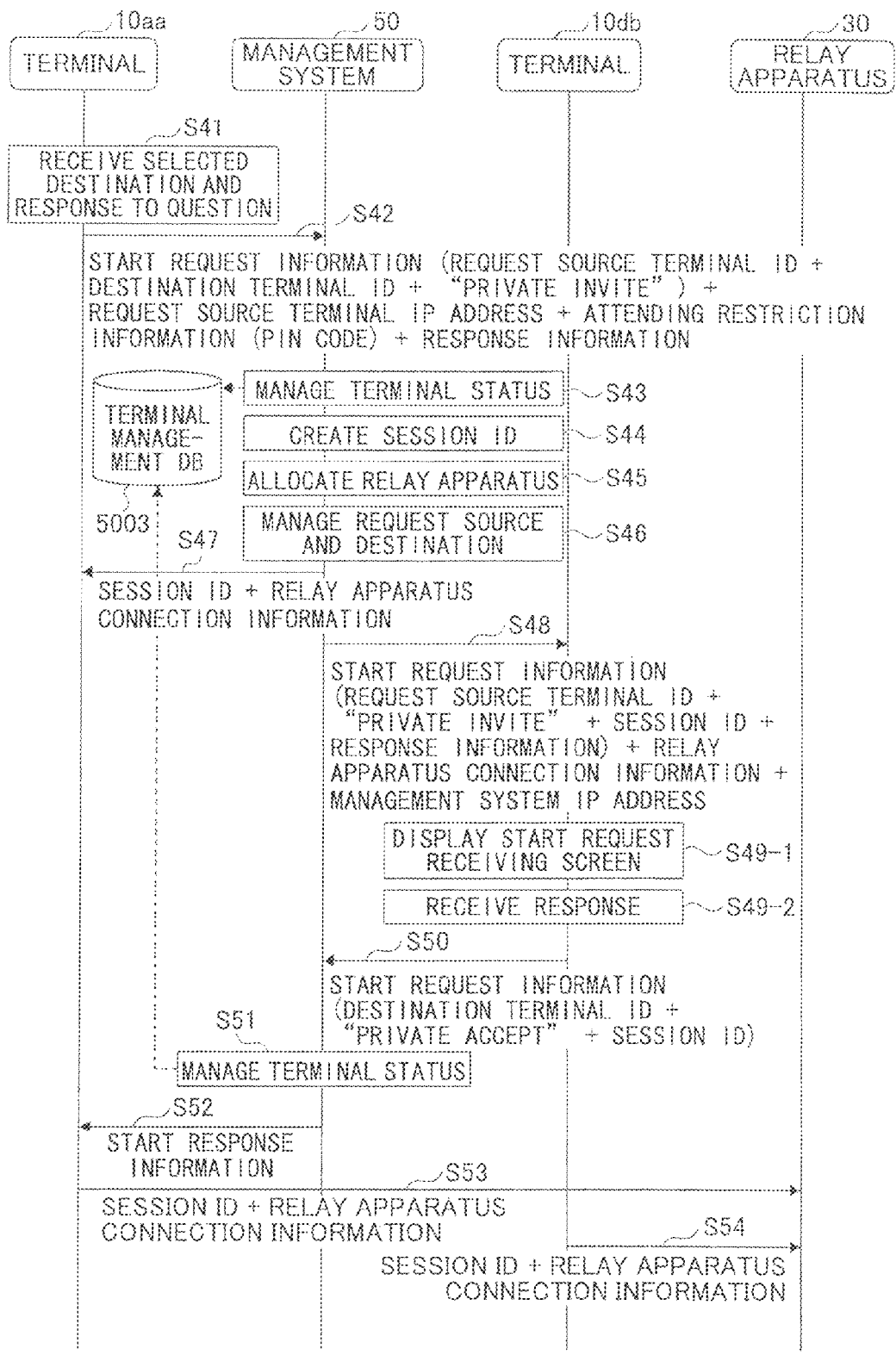
FIG. 29 is a sequence diagram illustrating an example of a process from reception of the destination selection and the response to the question to start of voice communications.

FIG. 29 is a sequence diagram illustrating an example of a process from reception of the destination selection and the response to the question to start of voice communications.

In FIG. 29, when the user of the start request terminal depresses the operation button 108 (see FIG. 2) to select the destination terminal (terminal 10db), the destination selection is received, questions are displayed, and a response to the selected question is received (step S41).

The communications part 11 of the terminal 10aa transmits the start request information (the request source terminal ID, the destination terminal ID, and the start request with attendance restriction " " Private Invite), the IP address of the request source terminal, the attendance restriction information (PIN), and response information (information indicating a response content to the selected question) to the management system 50 (step S42).

Then the status manager 53 of the management system 50 changes a field of the communication status of each of the records including the corresponding terminal IDs in the terminal management table (see FIG. 10) of the terminal management DB 5003, based on the terminal ID of the start request terminal (terminal 10aa) and the terminal ID of the destination terminal (terminal 10db) included in the start request information.

Subsequently, the session ID generator 56a generates a session ID for identifying a session (a content data session sed) for executing the communications between the start request terminal (terminal 10aa) and the destination terminal requested by the start request terminal (step S44). When the session ID is generated, the session manager 57 stores the generated session ID in the volatile storage part 5100.

Subsequently, the relay apparatus selector 56 selects the relay apparatus 30 for relaying the content data in the content data session sed established between the start request terminal (terminal 10aa) and the destination terminal (terminal 10db) (step S45). In this case, the relay apparatus selector 56 searches the relay apparatus selection management table (FIG. 14) to extract the relay apparatus IDs corresponding to the terminals (10aa and 10db) based on the terminal ID of the start request terminal (terminal 10aa) and the terminal ID of the destination terminal (terminal 10db) included in the start request information transmitted from the start request terminal (10aa).

When the extracted relay IDs are identical to those in the relay apparatus selection management table, the selector 56c refers to the operation statuses of the extracted relay apparatus IDs among the operation statues of the relay apparatuses 30 managed in the relay apparatus management table (see FIG. 8). Note that when the operation statuses of the relay apparatus IDs indicate "ONLINE", the selector 56 selects the extracted relay apparatuses as a relay apparatus for relaying the content data. When the extracted relay IDs are not identical to those in the relay apparatus selection management table, or the relay apparatus IDs indicate "OFFLINE" as a result of reefing to the operation statuses of the extracted relay apparatus IDs, the selector 56 selects the relay apparatus 30e having the relay apparatus ID "111e" as a relay apparatus for relaying the content data.

When the selection of the relay apparatus 30 completes, the session management part 57 stores the relay apparatus ID of the selected relay apparatus, the terminal ID of the start request terminal (terminal 10aa), and the terminal ID of the destination terminal (terminal 10db) in the fields of the relay apparatus ID, the terminal ID of the start request terminal, and the terminal ID of the destination terminal of the record containing the session ID in the session management table (FIG. 12) of the nonvolatile storage part 5000 to manage the request source and request destination (step S46).

Subsequently, the communications part 51 transmits to the start request terminal (terminal 10aa) via the communications network 2, the session ID generated by the session ID generator 56a, and the relay apparatus connection information for use in the connecting to the relay apparatus 30e selected by the selector 56c (step S47).

Subsequently, the communications part 51 transmits the start request information (i.e., the request source terminal ID, "Private Invite", the session ID, and the response information) to the destination terminal (terminal 10db) (step S48).

The display 120db of the destination terminal (terminal db) displays a start request receiving screen indicating that the start request information has been received (step S49-1). At this time, the display 120db displays response information to the questions together with start request receiving screen.

Subsequently, the user of the destination terminal (terminal 10db) operates the operation button 108 such that the operation input receiver 12 receives a response to allow the start of the communications (session establishment) with the start request terminal (terminal 10aa) (step S49-2). Subsequently, the communications part 11 of the destination terminal (terminal 10db) transmit the terminal ID of the destination terminal (terminal 10db), the terminal ID of the start request terminal (terminal 10aa), the change request information "Private Accept" representing an indication to allow the session establishment, and the start response information including the session ID to the management system 50 (step S50).

When the communications part 51 of the management system 50 receives the start response information, the status manager 53 changes the fields of the communication status of the records having respective terminal IDs in the terminal management table (see FIG. 10) based on the terminal ID of the start request terminal (terminal 10aa) and the terminal ID of the destination terminal (terminal 10db) (step S51).

Subsequently, the communications part 51 transmits the terminal ID of the destination terminal (terminal 10db), the change request information representing an indication to allow the communication start request with the destination terminal, and the start response information including the session ID to the start request terminal (terminal 10aa) (step S52). When the start request terminal (terminal 10aa) receives the start response information, the communications part 11 of the start request terminal (terminal 10aa) transmits the session ID and the relay apparatus connection information acquired in step S47 to relay apparatus 30 to connect the start request terminal (terminal 10aa) to the relay apparatus 30 (step S53). On the other hand, the communications part 11 of the destination terminal (terminal 10db) transmits the session ID and the relay apparatus connection information acquired in step S48 to relay apparatus 30 to connect the destination terminal (terminal 10db) to the relay apparatus 30 (step S54).

Note that in the above example, the predetermined questions are presented and the responses to the questions are input; however, alternatively, the user's requests such as "wishing to ask about the conference schedule" may simply be received without displaying questions.

Second Embodiment

Figure 30:
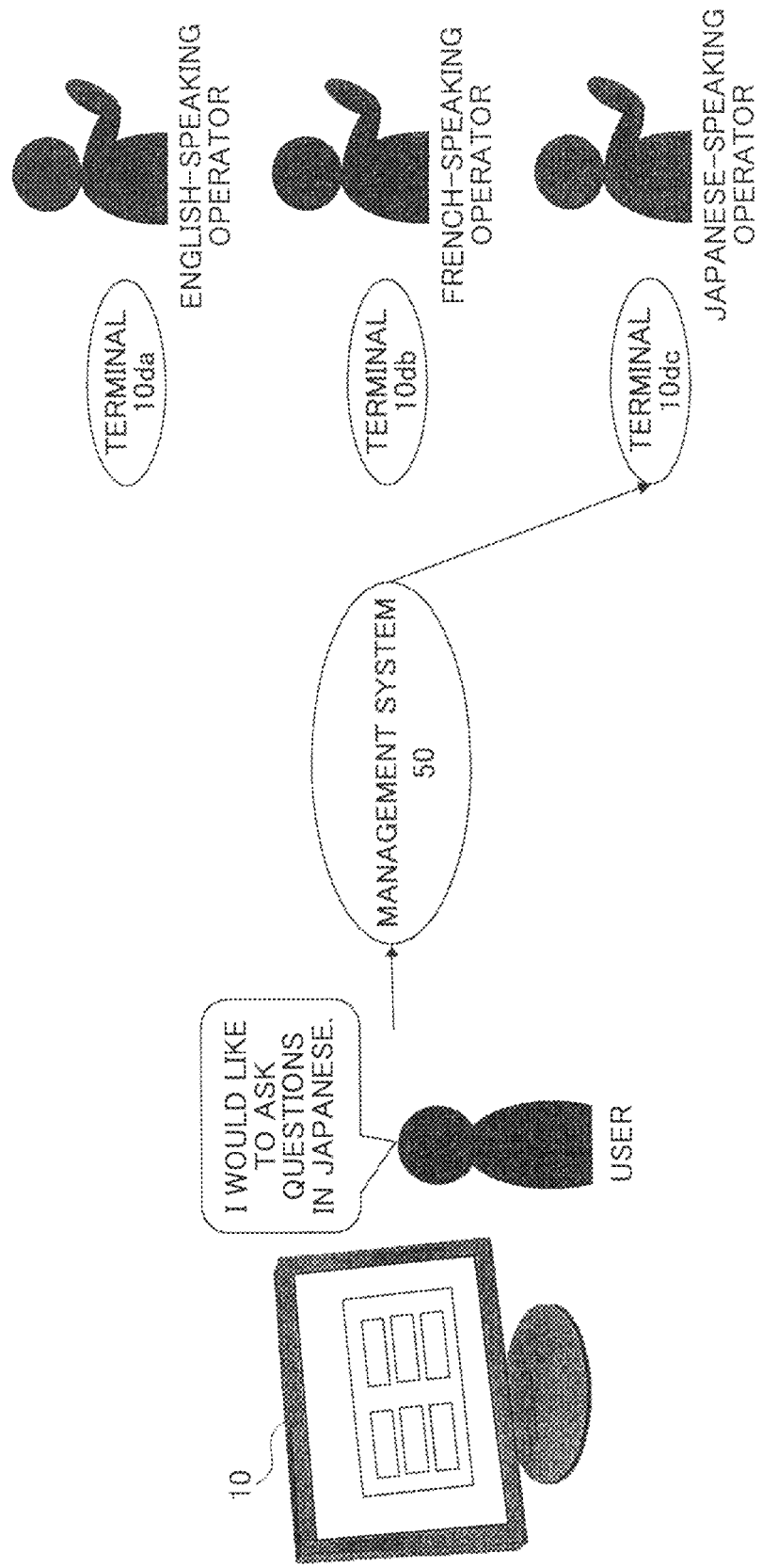
FIG. 30 is a diagram illustrating an example of a service image of a second embodiment.

FIG. 30 is a diagram illustrating an example of a service image of a second embodiment.

In FIG. 30, when the user wishes to make an inquiry in Japanese, the user is automatically presented with a question about what the user's official language is (other questions may also be presented), and is then requested to input a response to the question before the video conference. In response to the input official language response, the predetermined terminal operator capable of handling the input official language is allocated to the terminal of the user while presenting the response and an incoming call to the terminal of the above operator. That is, the management system 50 may automatically sort the connection destinations into response contents to the questions. Accordingly, since the video conference may efficiently be performed without transmission of the response content to other terminals due to the difference in official languages. Note that the management system 50 may sort the terminals (users or customers terminals) into responses other than the official language. For example, the management system 50 may sort the terminals into terminals of the operators capable of handling respective inquiry categories.

Figure 31:
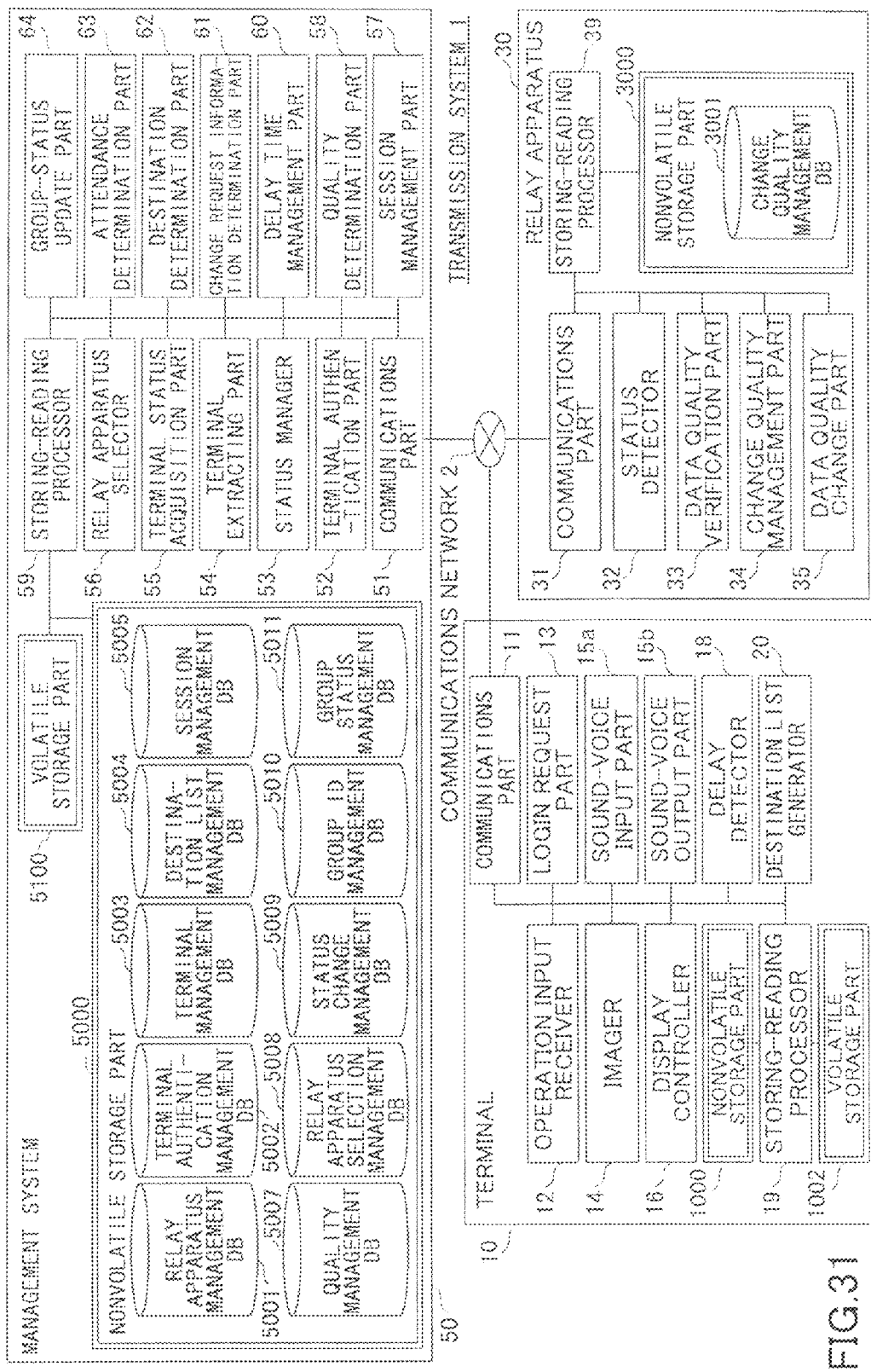
FIG. 31 is a functional block diagram illustrating the terminal, the apparatus, and the system constituting the transmission system.

FIG. 31 is a functional block diagram illustrating the terminal, the apparatus, and the system constituting the transmission system.

The configuration of the transmission system 1 illustrated in FIG. 31 further includes a group-status update part 64 in the transmission management system 50, and a group ID management DB 5010 and a group status management DB 5011 in the nonvolatile storage part 5000 in addition to the configuration illustrated in FIG. 5. The group ID management DB 5010 is configured to maintain a group ID management table, and the group status management DB 5011 is configured to maintain a group status management table.

The group status update part 64 is configured to include a function to manage the group ID management table and the group status management table.

FIG. 32 is a diagram illustrating an example of a group ID management table, which includes items of a "group ID", a "group name", a "terminal ID", "sorting information", and an "operation status". The "group ID" is information for identifying a group. Note that the group ID may be specified as a destination and may be displayed as a selection candidate on the destination list in a manner similar to the terminal ID. The "group name" is a name used for displaying a group. The "terminal ID" is information for identifying terminals associated with a group. The "sorting information" is information for use in sorting terminals within the group. In the example of FIG. 32, the sorting information is based on criteria of official languages. The "operation status" is a status of the terminal.

FIG. 33 is a diagram illustrating an example of a group status management table, which includes items of a group ID, an operation status, and the like. The "group ID" is information for identifying a group. The "operation status" represents a status of a group, including an "ONLINE" (communication capable) status when one or more terminals associated with the group are ONLINE (communication capable), and an "OFFLINE" (communication incapable) status when all the terminals are OFFLINE or ONLINE (Busy).

Figure 34:
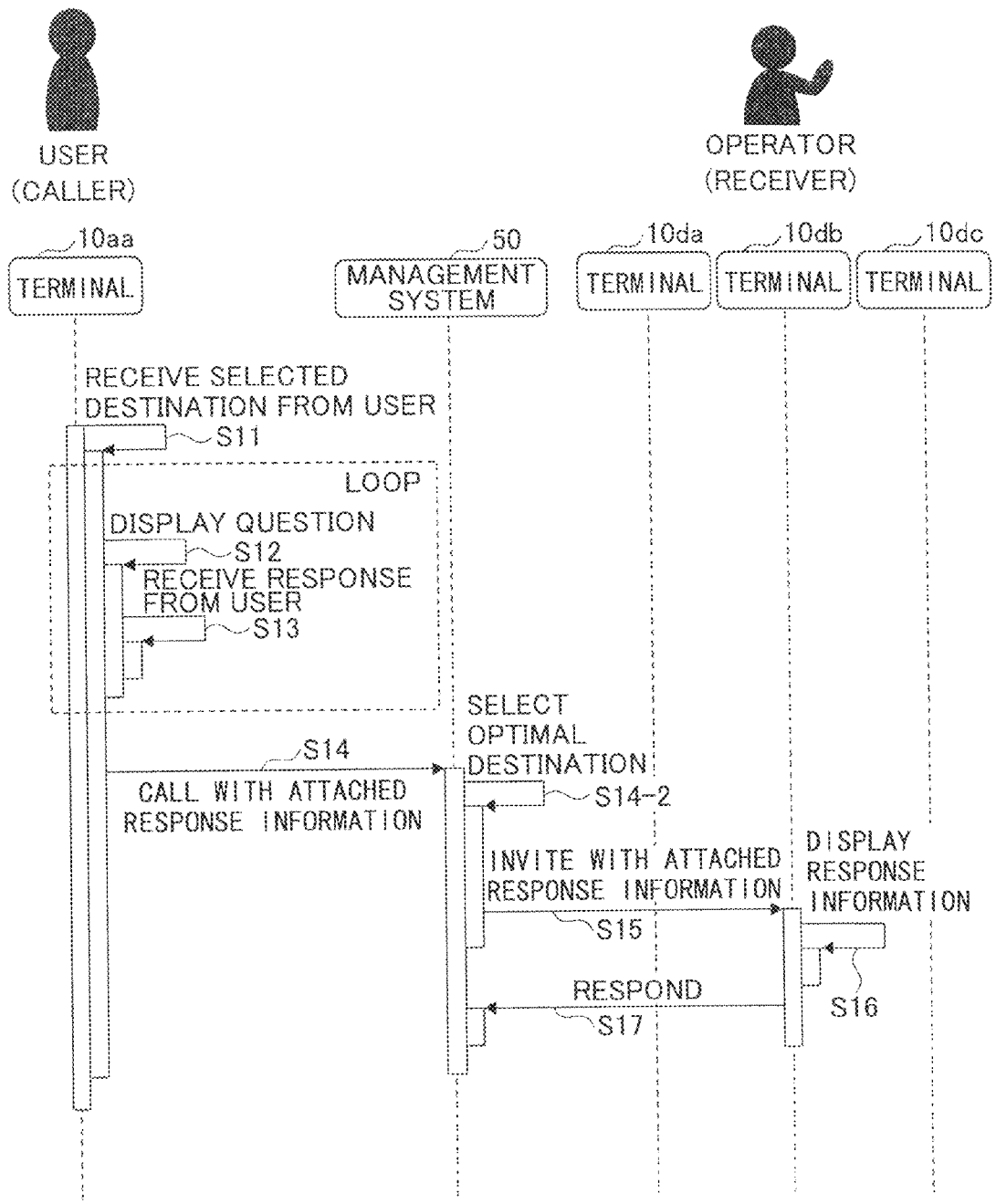
FIG. 34 is a sequence diagram illustrating an example of a process from selection of a destination to a response.

FIG. 34 is a sequence diagram illustrating an example of a process from selection of a destination to a response. Note that in the transmission terminal, the process from the start to the display of destination list is the same as that illustrated in FIG. 23. However, in this example, destination terminal candidates are not displayed with individual terminal names but are displayed with group names such as "XX call center". Hence, the conference initiator may select a specific connection destination terminal without being conscious of the terminal.

Figure 35:
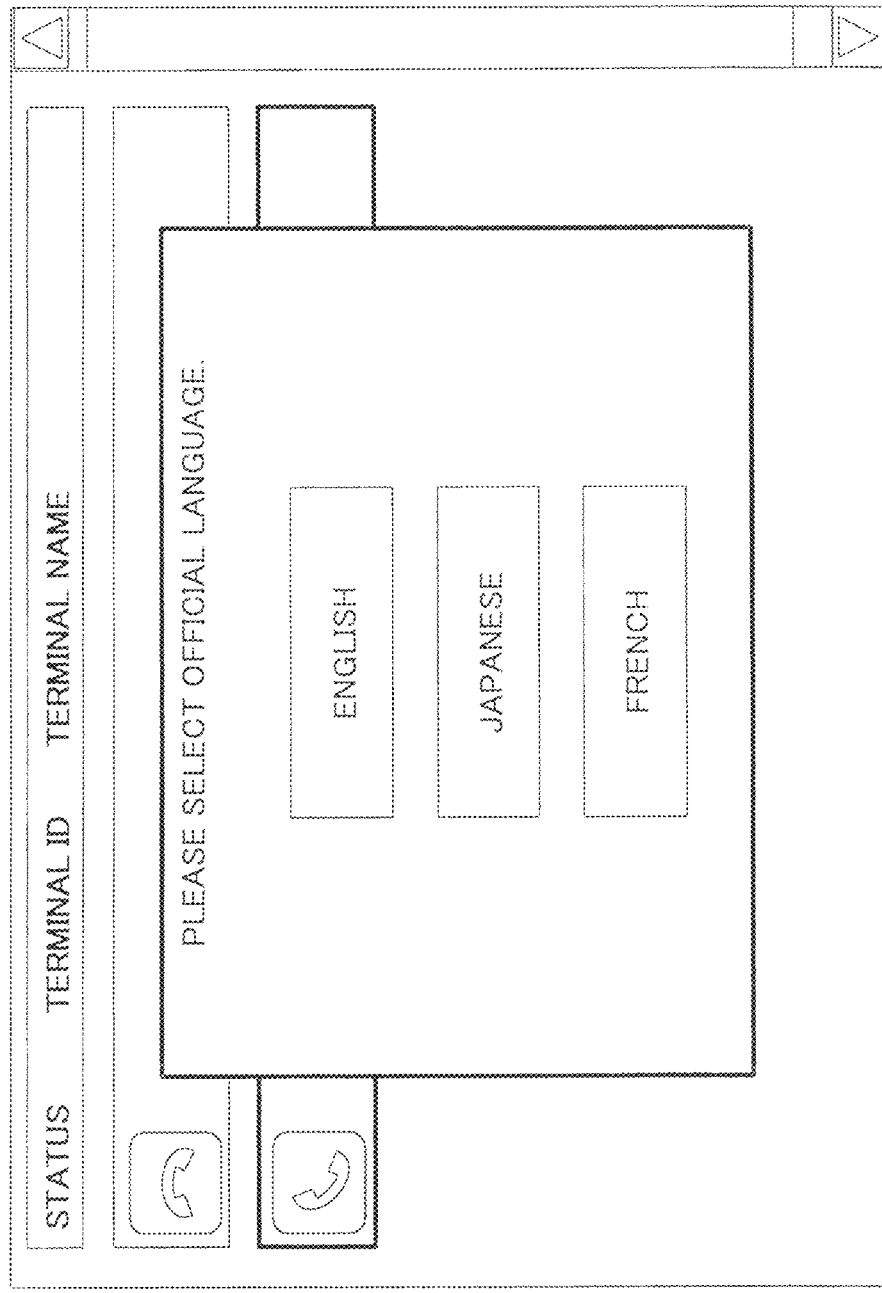
FIG. 35 is a diagram illustrating an example of a screen displaying questions after the destination is selected.

In FIG. 34, when the terminal 10aa receives the selection of the destination from the user (step S11), the terminal 10aa displays predetermined questions corresponding to the selected destination (step S12). FIG. 35 is a diagram illustrating an example of a screen displaying questions after the destination is selected, displaying listed dialogues any one of which may be selected by a button operation. In this example, a question includes verification of an official language, to which the user may select one of "English", "Japanese", and "French" candidate buttons as a response. Displaying such a screen may facilitate the user's understanding of selecting a "Japanese" button when the user desires to speak to the operator in Japanese, for example.

Referring back to FIG. 34, the terminal 10aa receives from the user a response to the question (step S13). Note that when other questions are presented to the user with the above question, the display of the question (step S12) and the reception of a response to the question (step S13) are repeatedly performed. In this case, the user's requests such as "wishing to ask about the conference schedule" may also be received simply without displaying the questions.

When the terminal 10aa receives responses to all the questions, the terminal 10aa makes a call (transmits a session start request) together with response content information to the management system 50 (step S14).

Subsequently, the management system 50 selects an optimal destination terminal based on the received response (step S14-2). Details of a process of selecting a destination terminal are described later.

When the management system 50 selects the optimal destination terminal, the management system 50 transmits an invitation (a session start request) together with information having the response content to the question to the transmission (destination) terminal 10db (step S15). Note that when the question is simply for automatically sorting official languages and the like, and the response content does not need to be displayed on the receiver's display, the management system 50 simply transmits an invitation (a session start request) without information having the response content to the question to the transmission (destination) terminal 10db.

Figure 37:
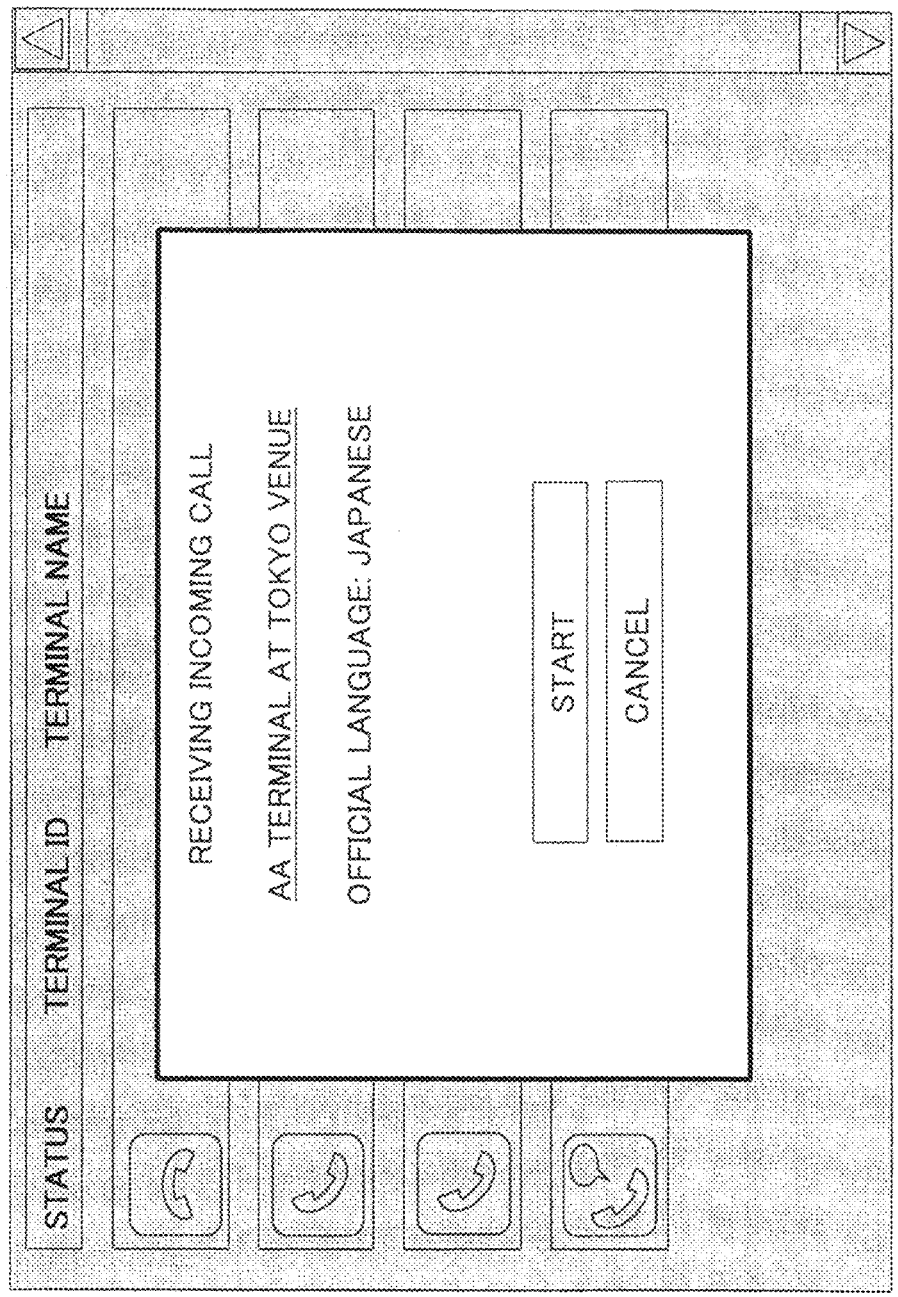
FIG. 37 is a diagram illustrating an example of a screen displaying a response to a question when an incoming call is received.

The receiver terminal 10db displays the response content based on the received information having the response content (step S16). FIG. 37 is a diagram illustrating an example of a screen displaying a response to a question when an incoming call is received, and the screen is configured to display a response content in a response dialogue. FIG. 37 illustrates an example of the response additionally displaying the official language being "Japanese". Note that one response is displayed in this example; however, two or more responses may be displayed in the dialog box when there are two or more responses.

Referring back to FIG. 34, when the user (receiver) who has checked the response content performs a response operation, an indication of the response operation is transmitted to the management system 50 (step S17).

Hence, the operator (receiver) may be able to check the display of the dialog when receiving an incoming call, so that the operator may be able to identify that the conference initiator speaks Japanese in advance. For example, when there are two or more operators having difference official languages in one location, it may be possible to identify who an appropriate operator may be in advance. Further, when one operator handles two or more official languages, the operator may be able to identify in advance, which language the operator needs to speak in. Hence, it may be possible to facilitate the process of conversation.

In the following, a description is given of the above process more in detail.

Figure 38:
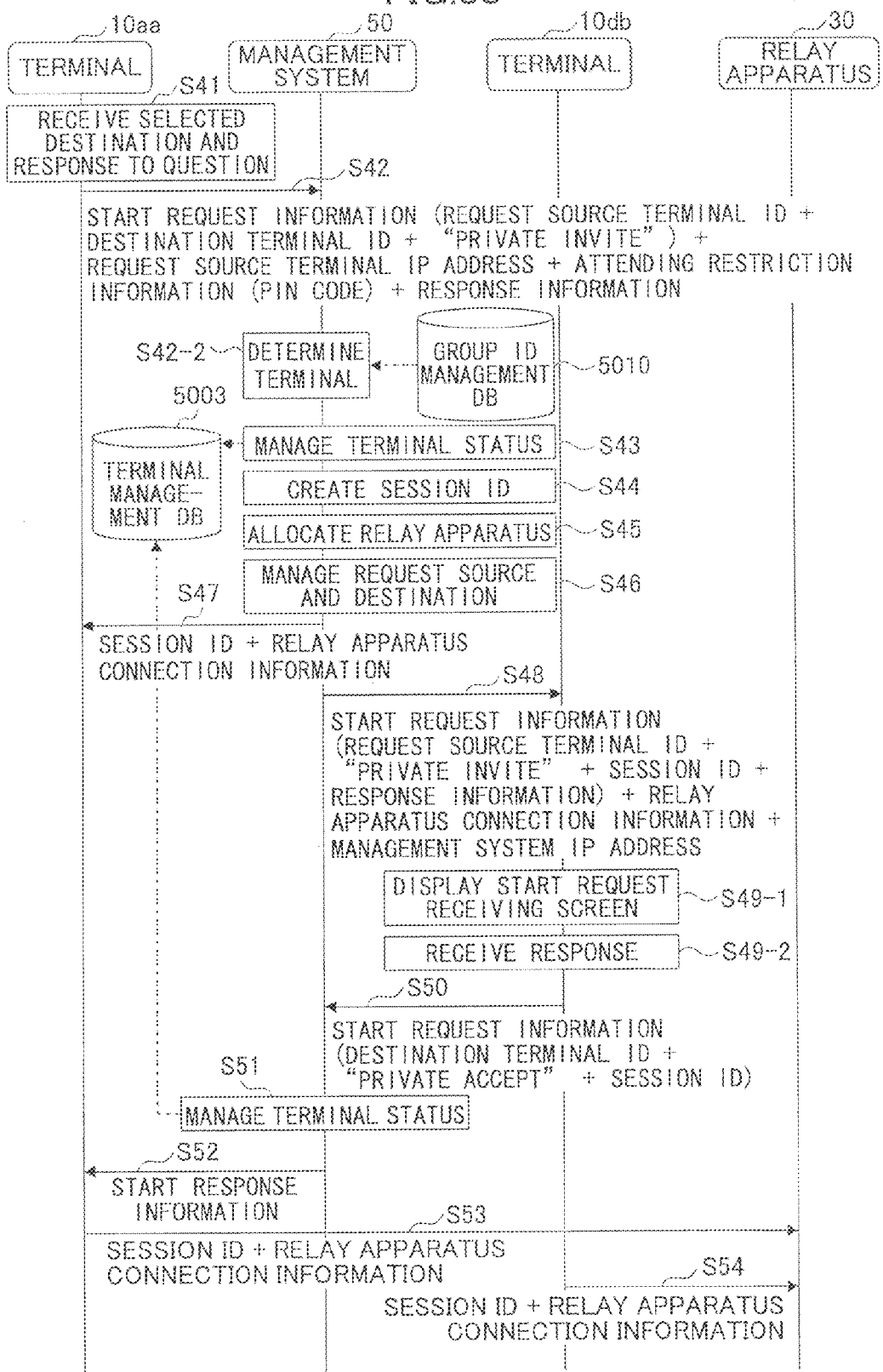
FIG. 38 is a sequence diagram illustrating an example of a process from reception of the destination selection and the response to the question to start of voice communications.

FIG. 38 is a sequence diagram illustrating an example of a process from reception of the destination selection and the response to the question to start of voice communications.

The process in FIG. 38 differs from the process illustrated in FIG. 29 in that the destination terminal ID is changed to the group ID in the destination selection process (step S41), a "terminal determination process" (step S42-2) is added to the process of the management system 50, and a subsequent destination terminal is determined in the "terminal determination process" (step S42-2).

Figure 39:
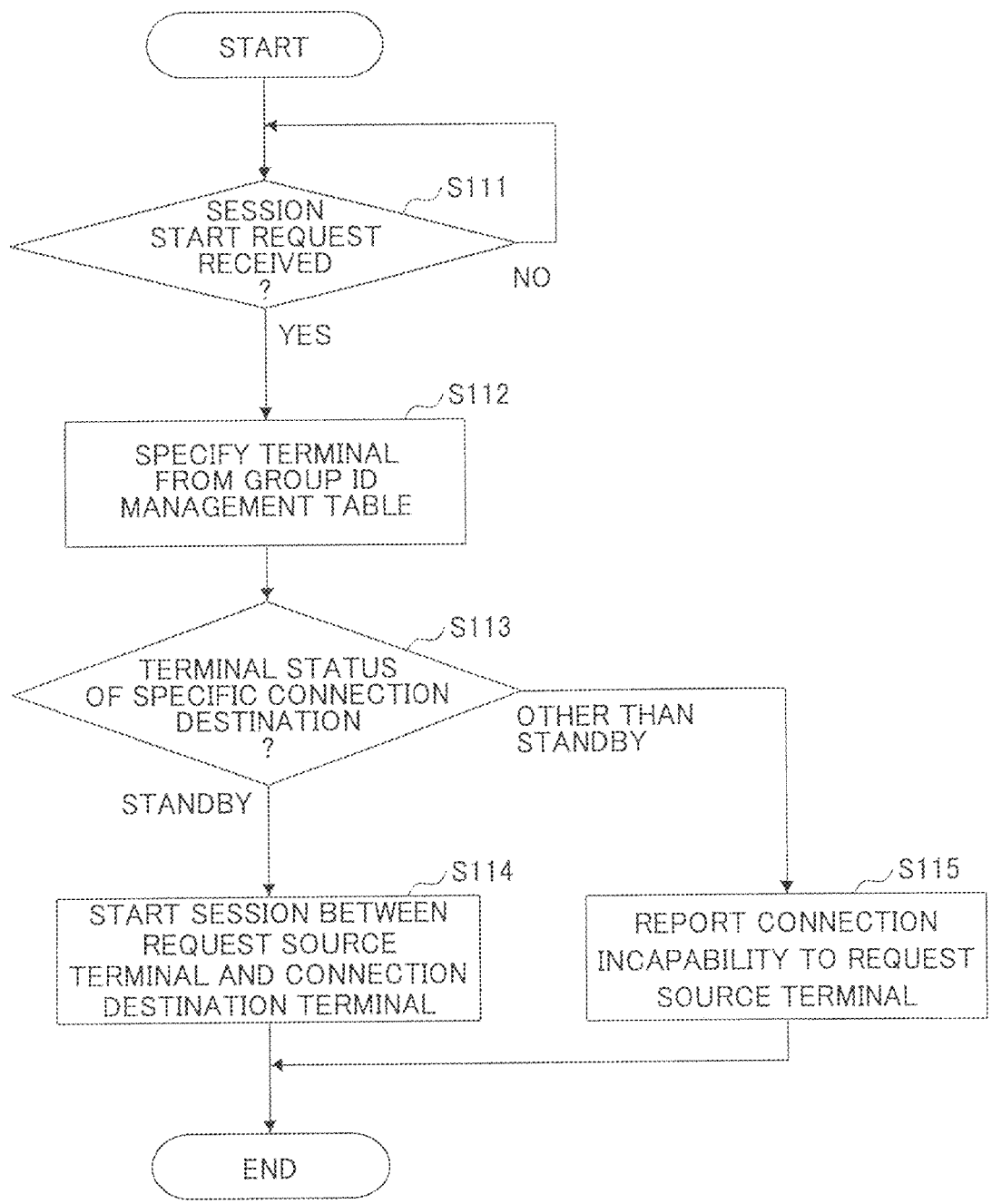
FIG. 39 is a flowchart illustrating an example of a terminal determination process.

FIG. 39 is a flowchart illustrating an example of the terminal determination process.

In FIG. 39, when the session start request is received (YES in step S111), a terminal of a connection partner is specified based on the response information included in the session start request and the group ID management table (see FIG. 32) (step S112). In the example of FIG. 32, when the response to the question about the official language is "Japanese", the terminal ID having "10db" that matches "Japanese" in the sorting information is specified.

Then, when the communication status of the connection partner terminal is in a standby status ("standby" in step S113), a session between the request source terminal and the connection destination terminal (step S114).

Figure 36:
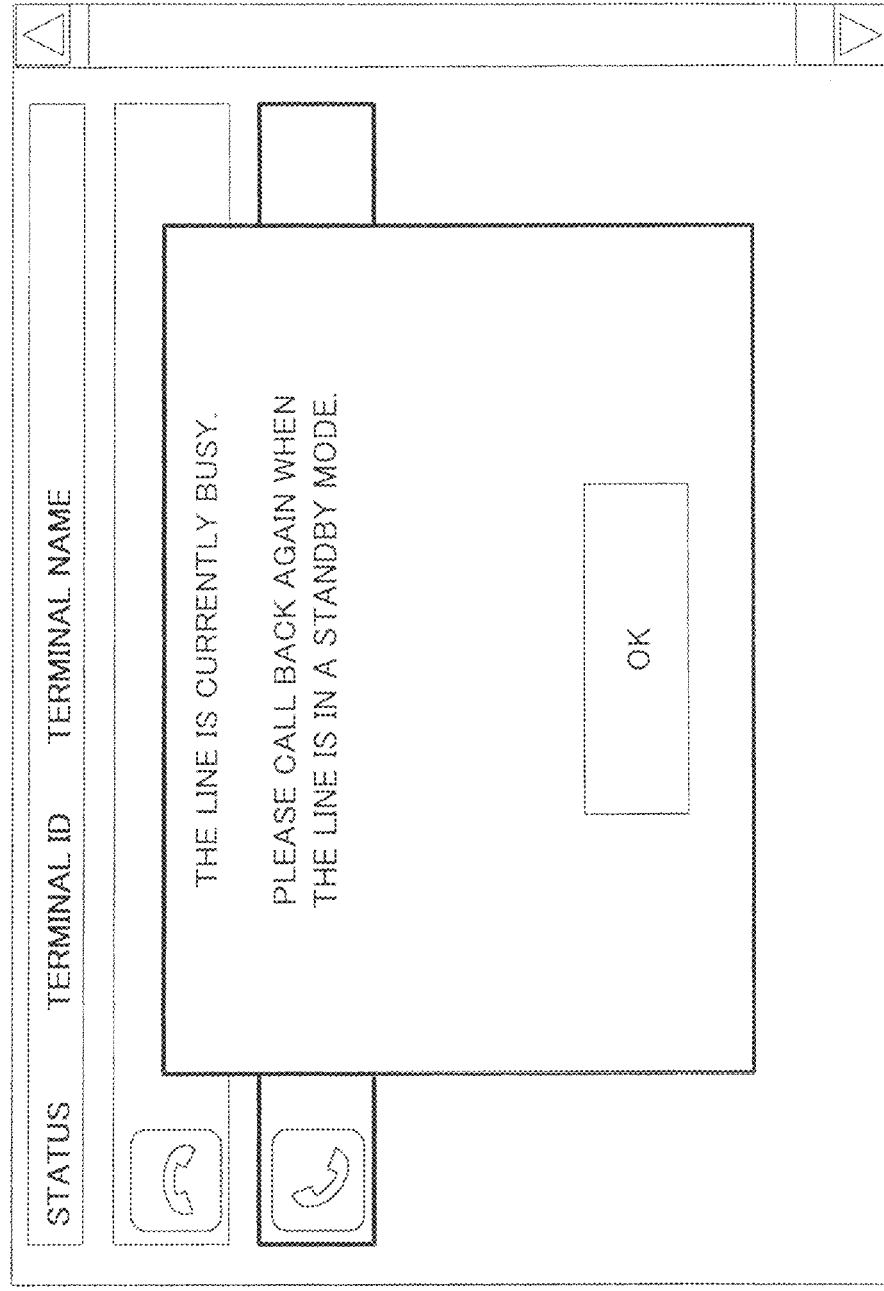
FIG. 36 is a diagram illustrating an example of a screen when a destination that matches a condition is not connectable.

When the communication status is in a status other than the standby status ("other than standby" in step S113), a report indicating connection incapability to the request source terminal (step S115). For example, when the conference initiator selects "French" in the group ID management table illustrated in FIG. 32, the terminal ID having "10dc" that matches "French" in the sorting information is in a busy status. Hence, the management system 50 determines that the session is unable to be established, and transmits a report indicating connection incapability to the caller terminal. FIG. 36 is a diagram illustrating an example of a screen displayed on the caller terminal in response to the report indicating the connection incapability.

Third Embodiment

Figure 40:
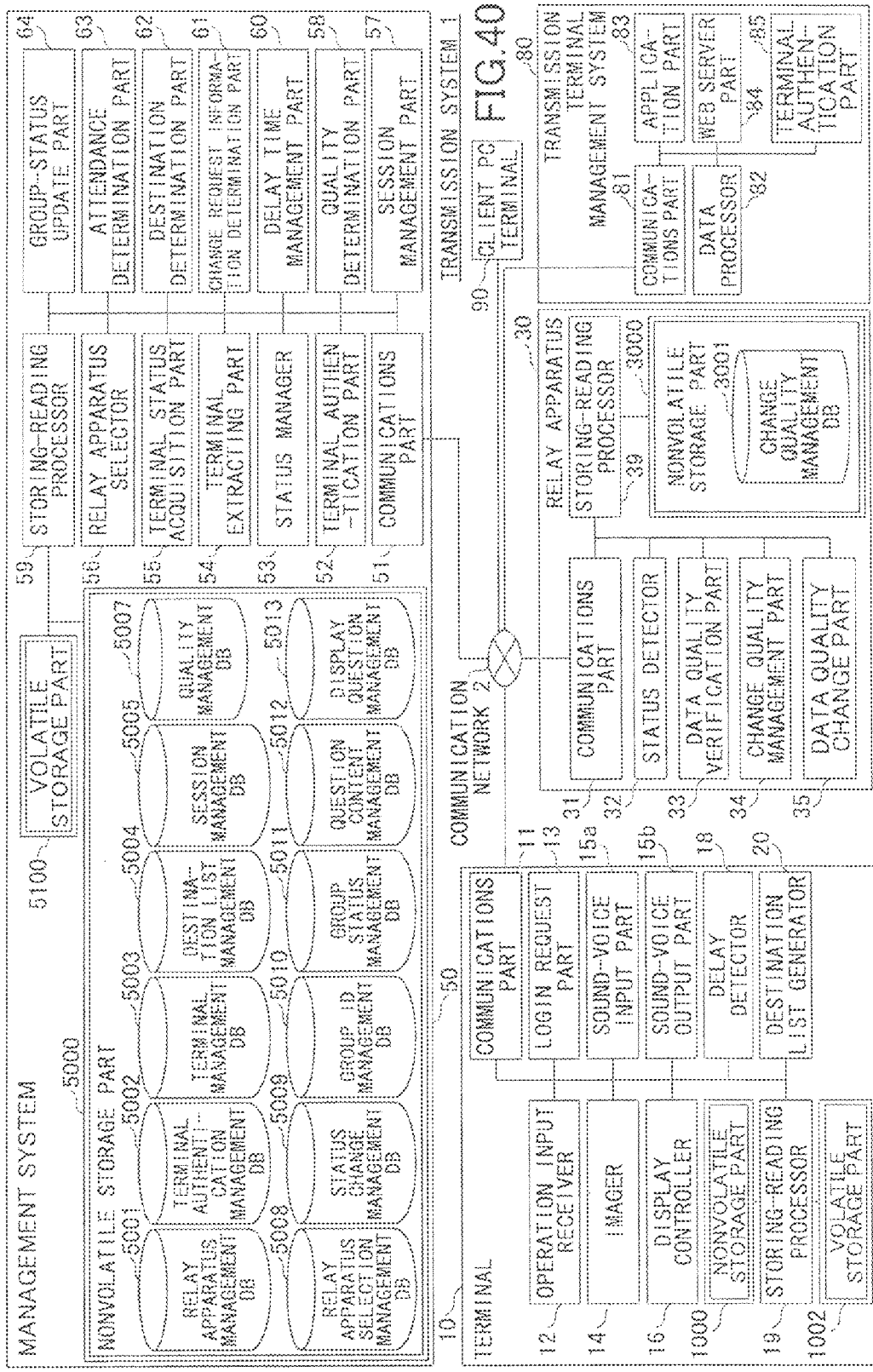
FIG. 40 is a functional block diagram illustrating the terminal, the apparatus, and the system constituting the transmission system.

FIG. 40 is a functional block diagram illustrating the terminal, the apparatus, and the system constituting a transmission system of a third embodiment.

The configuration of the transmission 1 of the third embodiment illustrated in FIG. 40 differs from the configuration illustrated in FIG. 31 in that the configuration of FIG. 40 additionally includes a question content management DB 5012 and a display question management DB 5013 in the nonvolatile storage part 5000, and also includes a transmission terminal management system 80 and a client PC terminal 90 that are connected to the communications network 2.

The question content management DB 5012 and the display question management DB 5013 are each configured to maintain management information of the questions that are selectable by the user. The question content management DB 5012 is configured to manage all the questions defined for each of the groups. The display question management DB 5013 is configured to manage the questions to be displayed on each of the terminals in association with a corresponding one of the terminals. Note that the data structure of the group ID management DB 5010 is changed in accordance with the data structures of the content management DB 5012 and the display question management DB 5013.

The transmission terminal management system 80 is configured to provide a service to edit the management information of the questions in the question content management DB 5012 and the display question management DB 5013 in response to a request from any one of the client PCs 90.

FIG. 41 is a diagram illustrating an example of the group ID management table maintained in the group ID management DB 5010. The group ID management table includes items of a "group ID", a "group name", a "password", a "terminal ID", and the like. The "group ID" is information for identifying a group. Note that the group ID may be specified as a destination and may be displayed as a selection candidate on the destination list in a manner similar to the terminal ID. The "group name" is a name used for displaying a group. The "password" is authentication information used when the client PC terminal 90 logs into the transmission terminal management system 80 to edit the management information of the question. The "terminal ID" is information for identifying terminals associated with a group. In the example of FIG. 41, the group ID "10xx" is associated with a group name "XX call center", a password "ggg", terminal IDs "10aa, 10ab, 10ac, . . . ".

The group status management table maintained in the group status management DB 5011 is similar to that illustrated in FIG. 33.

FIG. 42 is a diagram illustrating an example of a question content management table maintained in the question content management DB 5012. The question content management table includes items of a "group ID", a "question ID", a "question content", and the like. The "group ID" is information for identifying a group. The "question ID" is information for identifying a question. The "question content" is a content of each question. In the example of FIG. 42, the group ID "10xx" is associated with the question content "a question about product A" of the question ID "1", the question content "a question about product B" of the question ID "2", the question content "a question about product C" of the question ID "3", and the question content "no alternative" of the question ID "4" Note that a combination of two or more question contents that are not simultaneously presented as alternatives may be set with respect to one group ID.

FIG. 43 is a diagram illustrating an example of a display question management table maintained in the display question management DB 5013. The display question management table includes items of a "group ID", a "question ID", and the like. The "terminal ID" is information for identifying a terminal. The "question ID" is information for identifying a question. In the example of FIG. 43, the terminal ID "10aa" is associated with the question IDs "1, 2, 3, and 4". Hence, the group ID "10xx" is acquired by referring to the group ID management table illustrated in FIG. 41 corresponding to the terminal ID "10aa", and the respective question contents "a question about product A", "a question about product B", "a question about product C", and "no alternative" of the question IDs "1, 2, 3, and 4" may be acquired by referring to the question content management table illustrated in DIF. 42 corresponding to the group ID "10xx".

Referring back to FIG. 40, the transmission terminal management system 80 includes a communications part 81, a data processor 82, an application part 83, a web server part 84, and a terminal authentication part 85. The communications part 81 includes a data communication function to perform data communications with another system or another apparatus, specifically with the transmission management system 50 and the client PC terminal 90. The data processor includes a data processing function to perform various types of data processes within the transmission terminal management system 80. The application part 83 includes an editing function to editing the management information of the questions. The web server part 84 is configured to operate as a web server to which the client PC terminal 90 has access, transmit inputs from the client PC terminal 90 to the application part 83, and output outputs of the application part 83 to the client PC terminal 90. The terminal authentication part 85 includes a authentication function to authenticate the input group ID and password when the client PC terminal 90 logs in. The standard group ID and password are acquired from the group ID management DB 5010 of the transmission management system 50.

Figure 44:
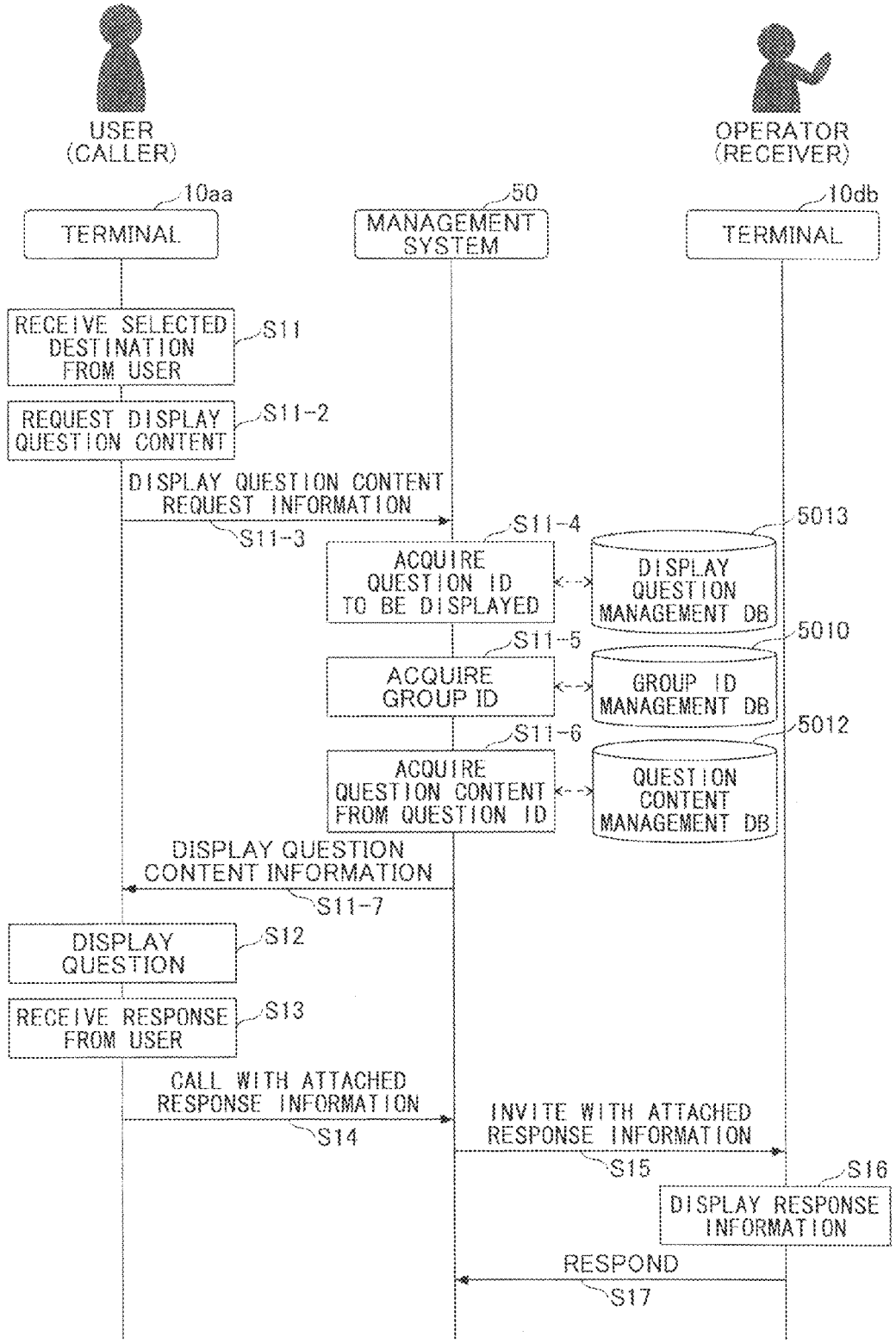
FIG. 44 is a sequence diagram illustrating an example of a process from selection of a destination to a response.

FIG. 44 is a sequence diagram illustrating an example of a process from selection of a destination to a response. In the example of FIG. 44, a (user) terminal used by the user who makes an inquiry to the call center is determined as the terminal 10aa (the terminal ID "10aa"), and a receiver terminal used by the operator in the call center is determined as the terminal 10db.

In FIG. 44, the terminal 10aa receives the selection of the destination from the user (step S11). Note that the destination is selected from the destination list (see FIG. 24) displayed on the terminal 10aa as a result of the process illustrated in FIG. 23.

Subsequently, in FIG. 44, the terminal 10aa transmits a display question content request to the transmission management system 50 (step S11-2, and S11-3).

The transmission management system 50 accesses the display question management DB 5013 (the display question management table of FIG. 43) in response to the received display question content request to acquire the question IDs "1, 2, 3, and 4" to be displayed in association with the terminal ID "10aa" (stepS11-4).

Subsequently, the transmission management system 50 accesses the group ID management DB 5010 (the group ID management table of FIG. 41) to acquire the group ID "10xx" to which the terminal 10aa belongs (step S11-5).

Subsequently, the transmission management system 50 accesses the question content management DB 5012 (the question content management table in FIG. 42) based on the question IDs "1, 2, 3, and 4" acquired in step S11-4, and the group ID "10xx" acquired in step S11-5 to acquire the question contents "a question about product A", "a question about product B", "a question about product C", and "no alternative" associated with the group ID "10xx" and the question IDs "1, 2, 3, and 4" (step S11-6).

The transmission management system 50 then transmits the display question content information to the terminal 10aa (step S11-7).

On receiving the display question content information, the terminal 10aa displays the questions based on the received display question content information (step S12). FIG. 45 illustrates an example of screen displaying questions having respective buttons of "a question about product A", "a question about product B", "a question about product C", and "no alternative" that are selectably displayed.

Referring back to FIG. 44, when the terminal 10aa receives a response (or responses) to the question (or questions) from the user (step S13), the terminal 10aa makes a call (transmits a session start request) together with information having the response content with respect to the management system 50 (step S14). In this example, it is assumed that the call (session start request) is addressed to the (destination) terminal 10db.

When the destination terminal 10db is in a standby status (communication capable status), the management system 50 transmits an invitation (a session start request) together with information having the response content(s) to the question(s) to the destination terminal 10db (step S15).

Figure 46:
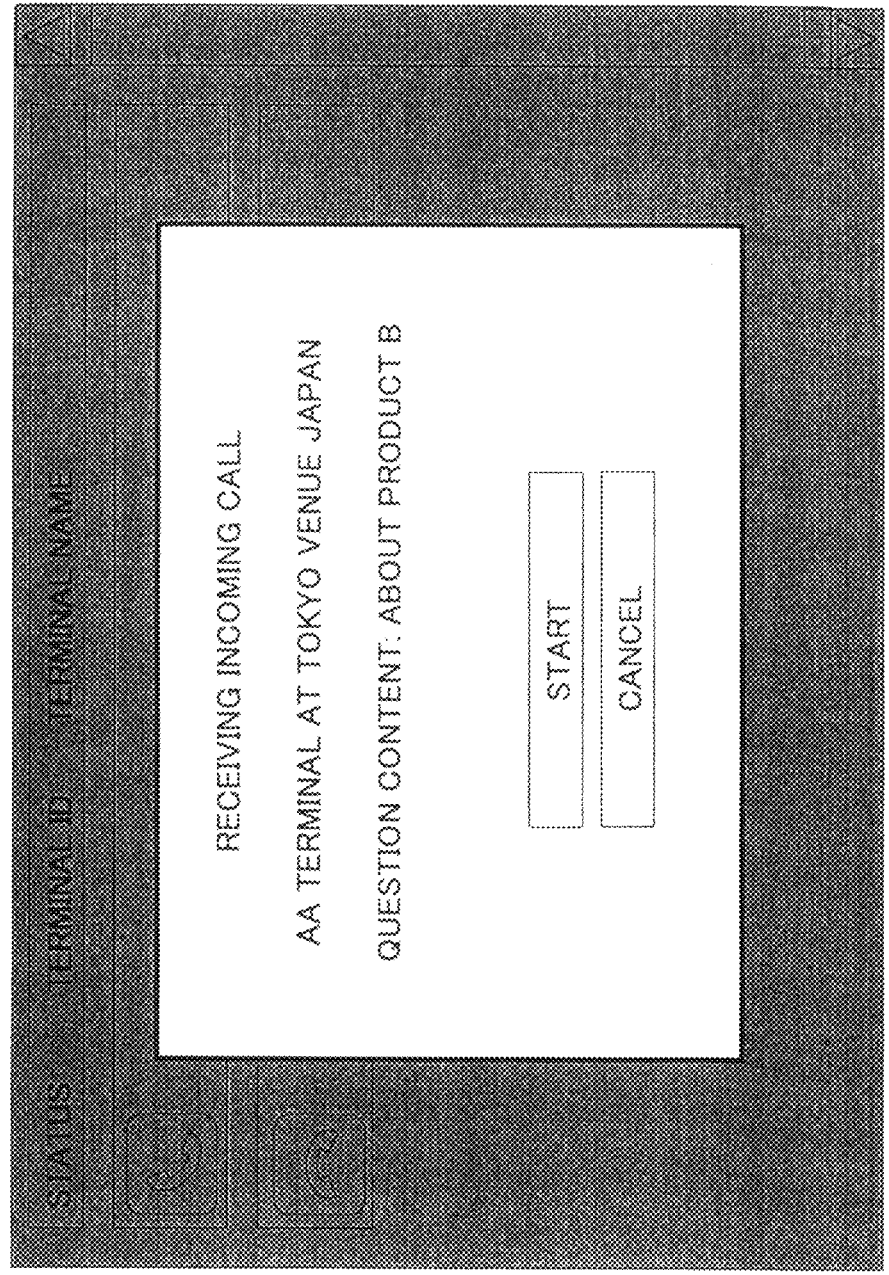
FIG. 46 is a diagram illustrating an example of a screen displaying a response to the question when an incoming call is received.

The terminal 10db displays the response content based on the received information having the response content (step S16). FIG. 46 is a diagram illustrating an example of a screen displaying a response to the question at arrival of incoming call in a response dialog box, including the transmission terminal information "AA terminal Tokyo venue Japan", and a response content (a question content selected by the user). In this example, the screen displays a "question about a product B" in a dialog box as the question content. The operator (receiver of the incoming call) may be able to respond to the incoming call by depressing a start button illustrated in FIG. 46. Note that one response is displayed in this example; however, two or more responses may be displayed in the dialog box when there are two or more responses.

Subsequently, an illustration is given of editing of the management information of the questions. It may be possible to flexibly change the question contents by editing the management information of the questions. Further, the management information of the questions may be remotely edited via the network.

Figure 47:
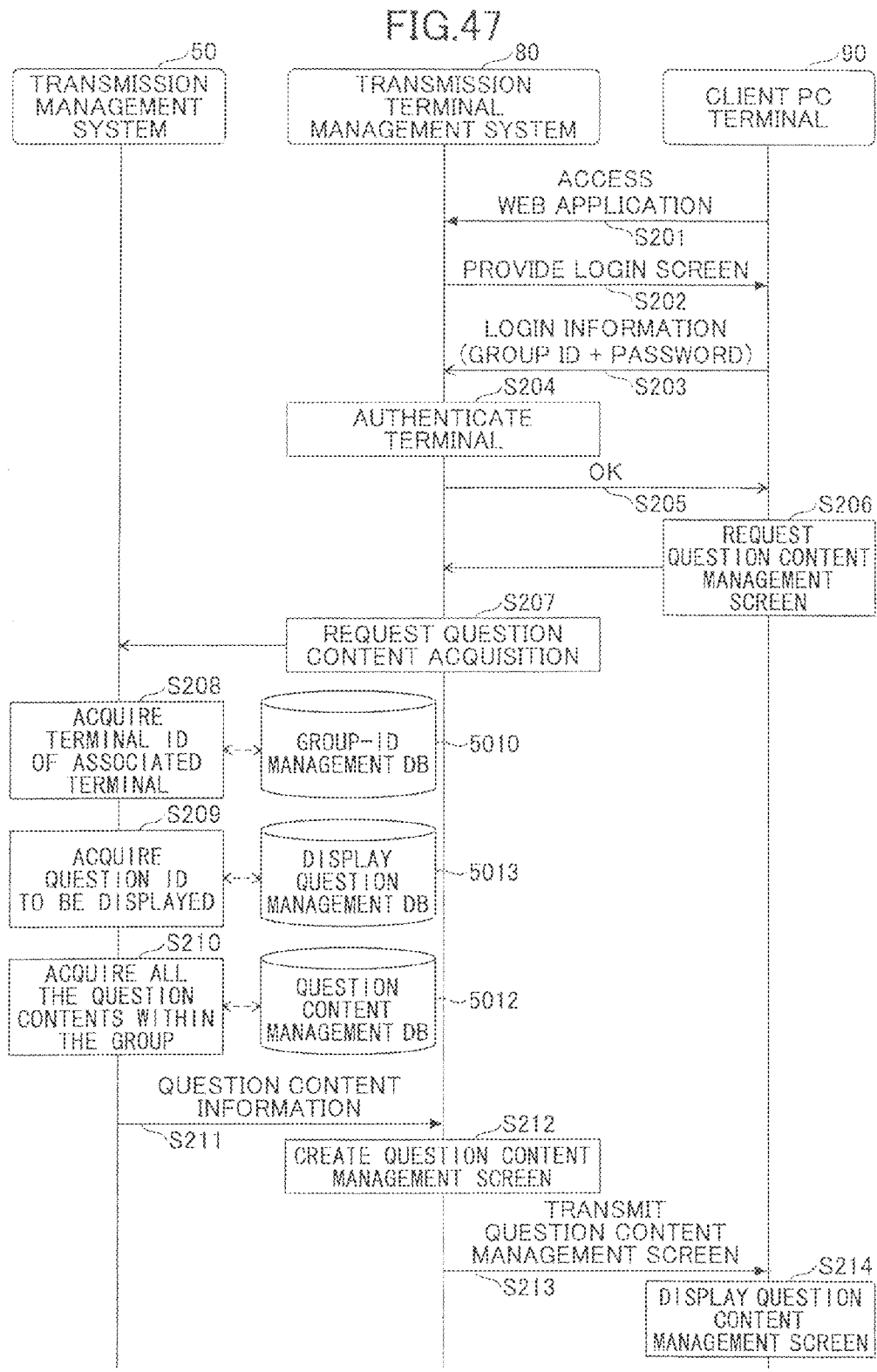
FIG. 47 is a first sequence diagram illustrating an example of a process to edit the question content.
Figure 48:
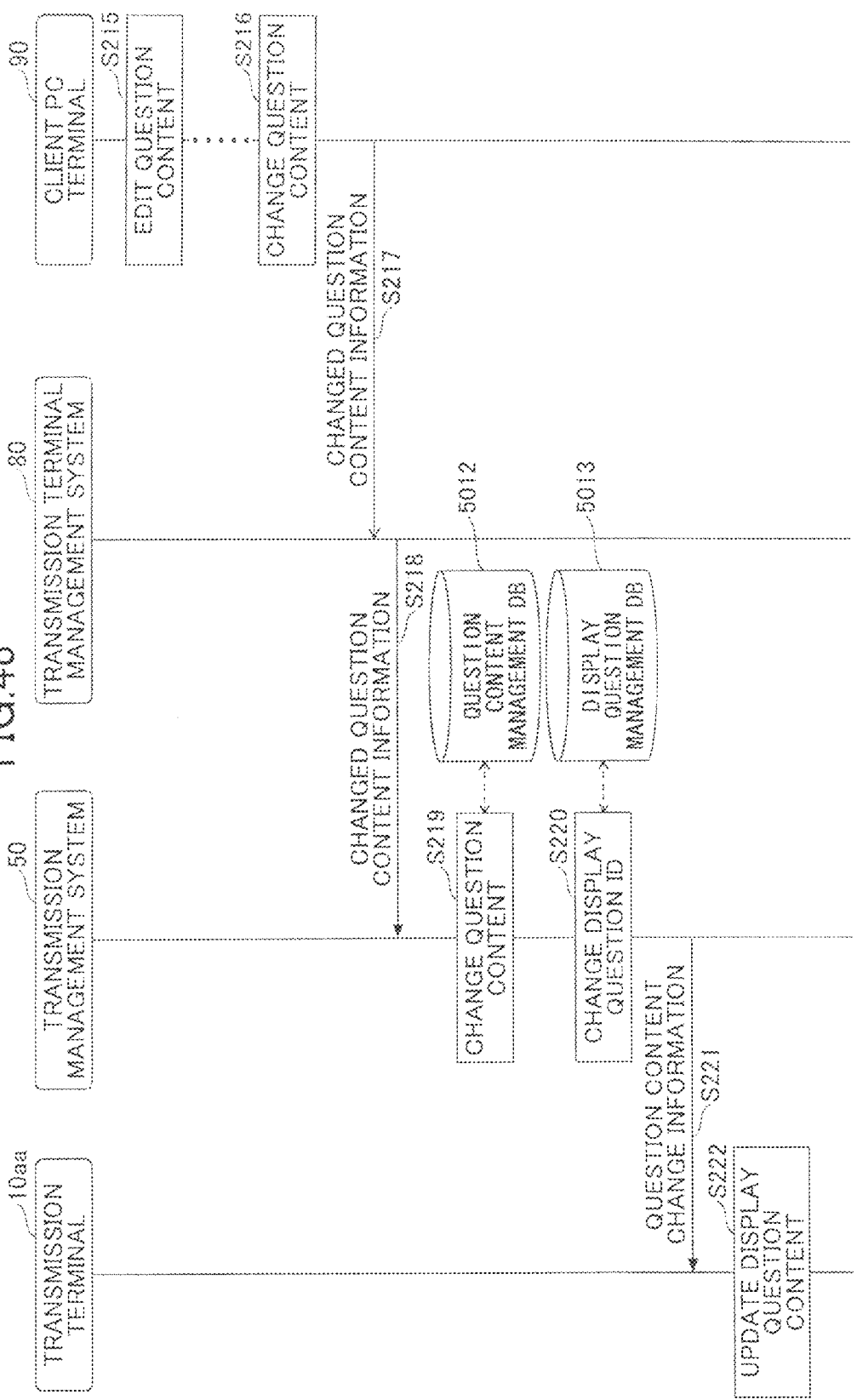
FIG. 48 is a second sequence diagram illustrating the example of the process to edit the question content.

FIGS. 47 and 48 are sequence diagrams illustrating example of processes to edit the question contents by operations of the client PC terminal 90. Note that the process illustrated in FIG. 47 is followed by the process illustrated in FIG. 48.

In FIG. 47, the client PC terminal 90 accesses the web application (the web server part 84 and the application part 83 in FIG. 40) of the transmission terminal management system 80 (step S201), the transmission terminal management system provides a login screen (S202).

Then, when the client PC terminal 90 inputs the group ID and password to transmit the input group ID and a corresponding password to the transmission terminal management system 80 (step S203), the transmission terminal management system 80 performs terminal authentication (step S204), and transmits, when the terminal authentication is successful, a response representing such an indication (OK) (step S205). The terminal authentication is performed based on whether a group ID and password combination transmitted from the client PC terminal 90 matches any one of the group ID and password combinations acquired from the group ID management DB 5010 (the group ID management table in FIG. 41) of the transmission management system 50. Note that the group ID and password combinations may be acquired from the transmission management system 50 when the terminal authentication is required.

In this case, it is assumed that the user logs into the transmission terminal management system 80 using the group ID "10xx" to which the terminal 100aa belong and the corresponding password "ggg" based on the example of FIG. 41. Note that alternatively, the user may log in the transmission terminal management system 80 using the terminal name belonging to the group ID "10xx" as a login ID instead of the group ID and the password "ggg".

When the terminal is authenticated, the client PC terminal 90 specifies the group ID and transmits an acquisition request to acquire the question content management screen to the transmission terminal management system 80 (step S206).

On receiving the acquisition request, the transmission terminal management system 80 transmits the question content acquisition request together with the specified group ID to the transmission management system 50 (step S207).

The transmission management system 50 accesses the group ID management DB 5010 (the group ID management table of FIG. 41) to acquire all the terminal IDs belonging to the specified group ID (step S208). In this case, based on the example of FIG. 41, the terminal IDs " ", " ", " ", . . . belonging to the group ID "10xx" are acquired.

Subsequently, the transmission management system 50 accesses the display question management DB 5013 (display question management table of FIG. 43) to acquire the question IDs to be displayed associated with each of the terminal IDs (step S209). In this case, based on the example of FIG. 43, the question IDs "1, 2, 3, and 4", "1, 2, 3, and 4", "2, 3, and 4", . . . associated with the terminal the respective terminal IDs "10aa", "10ab", "10ac", . . . are acquired.

Subsequently, the transmission management system 50 accesses the question content management DB 5012 (the question content management table of FIG. 42) to acquire all the question contents and the question IDs associated with the group ID "10xx" that has logged in the web application (step S210). In this case, based on the example of FIG. 42, all the question contents "a question about product A", "a question about product B", "a question about product C", and "no alternative", and the question IDs "1, 2, 3, and 4" associated with the group ID "10xx" are acquired.

Subsequently, the transmission management system 50 transmits the question content information (the terminal ID, question ID, and question content) acquired in steps S208 to S210 to the transmission terminal management system 80 (step S211).

On receiving the question content information, the transmission terminal management system 80 generates a question content management screen based on the received question content information (step s212) to transmit the generated question content management screen to the client PC terminal 90 (step S213). On receiving the question content management screen, the client PC terminal 90 displays the received question content management screen on a screen such as a web browser (step S214).

Figure 50:
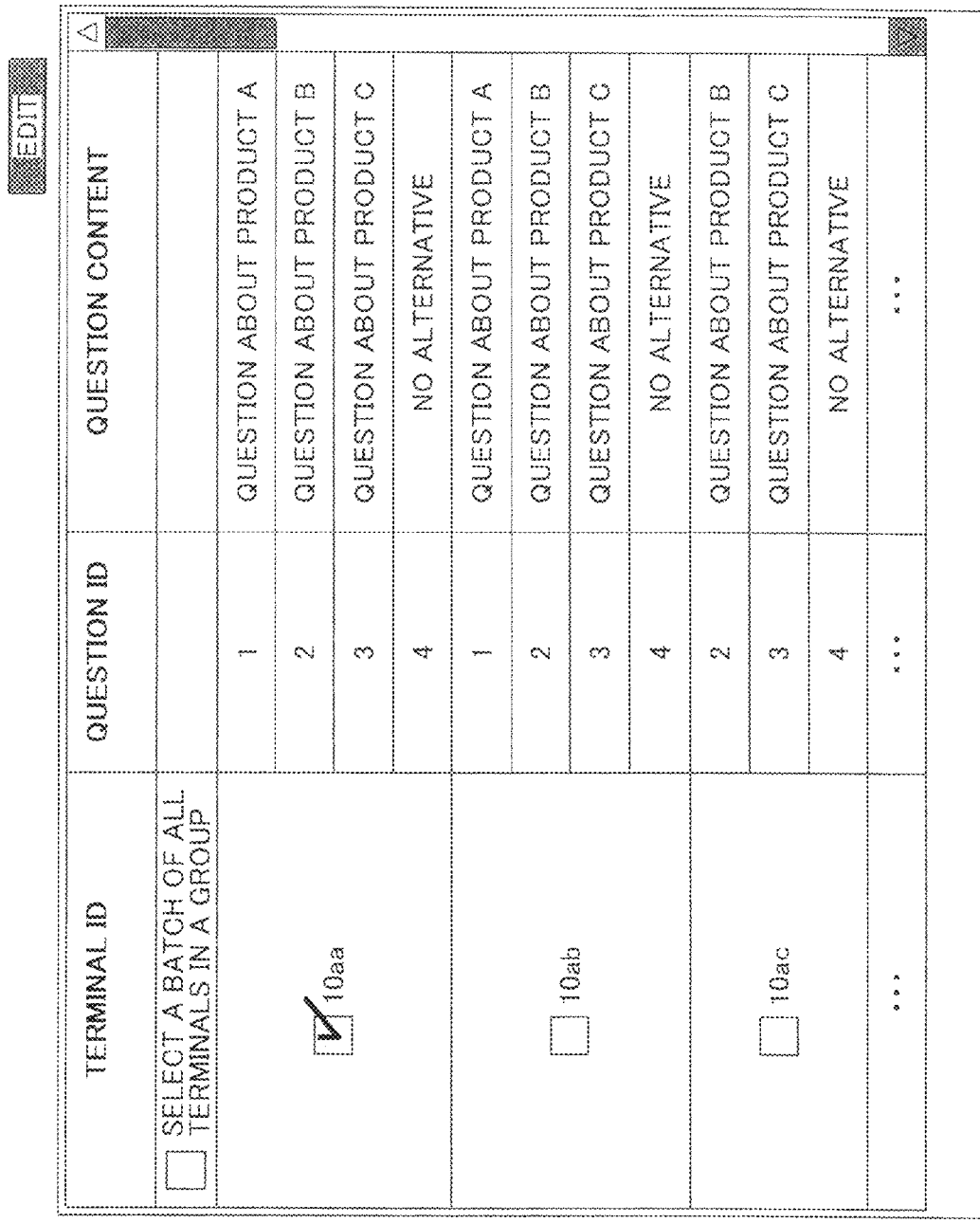
FIG. 50 is a second diagram illustrating the example of the question content management table.

FIG. 49 is a diagram illustrating an example of the question content management screen, displaying the question IDs and the corresponding question contents associated with the terminal IDs "10aa", "10ab", "10ac", . . . belonging to the group ID "10xx" used for the login, from which the user may be able to check one of the check boxes of the terminal IDs to select an editing target. Note that the check box "all terminal in a group" is prepared for the user to select all the terminals in a group. Further, the user may also select a desired number of terminals belonging to the group. FIG. 50 illustrates the question content management screen in which the terminal ID "10aa" is checked. Note that two or more of the terminal IDs may be checked.

Next, in FIG. 48, the client PC terminal 90 receives the editing operation of the question content from the user to edit the question content (step S215). The editing may include "add a new question", "delete an existing question", "edit an existing question", and "rearrange the questions", and the like.

For example, as illustrated in FIG. 50, the user checks terminal ID "10aa", selects the upper right "edit" button so that the question content management screen transitions to an editing screen illustrated in FIG. 51. In the editing screen of FIG. 51 displays editing operation buttons and display setting buttons for respective question contents corresponding to the terminal ID "10aa" in the upper rows of the screen, and edited results are reflected in the lower part of the screen. Further, a new question may be added to the screen by selecting the upper right "add new question" button. The changed question content may be transmitted to the transmission terminal management system 80 by selecting the "reflect change" button displayed in the right middle" part of the screen so that the changed question content may be reflected in the databases of the transmission management system 50 and the corresponding terminals.

Display settings are changed as follows. For example, when the user selects the "unchange" button from the display settings associated with the question ID "1" in the upper part of the screen of FIG. 51, the display question content "1" associated with the question ID "1" in the lower part of the screen is deleted.

Wording of the existing question content may be edited as follows. For example, the user selects an "edit" button of the "edit" columns of the upper part of the screen associated with the question ID "1" of the screen to edit wording of the question content.

The existing question content may be deleted as follows. For example, the user selects a "delete" button of the "delete" columns of the upper part of the screen associated with the question ID "1" of the screen to delete the wording of the question content.

Figure 52:
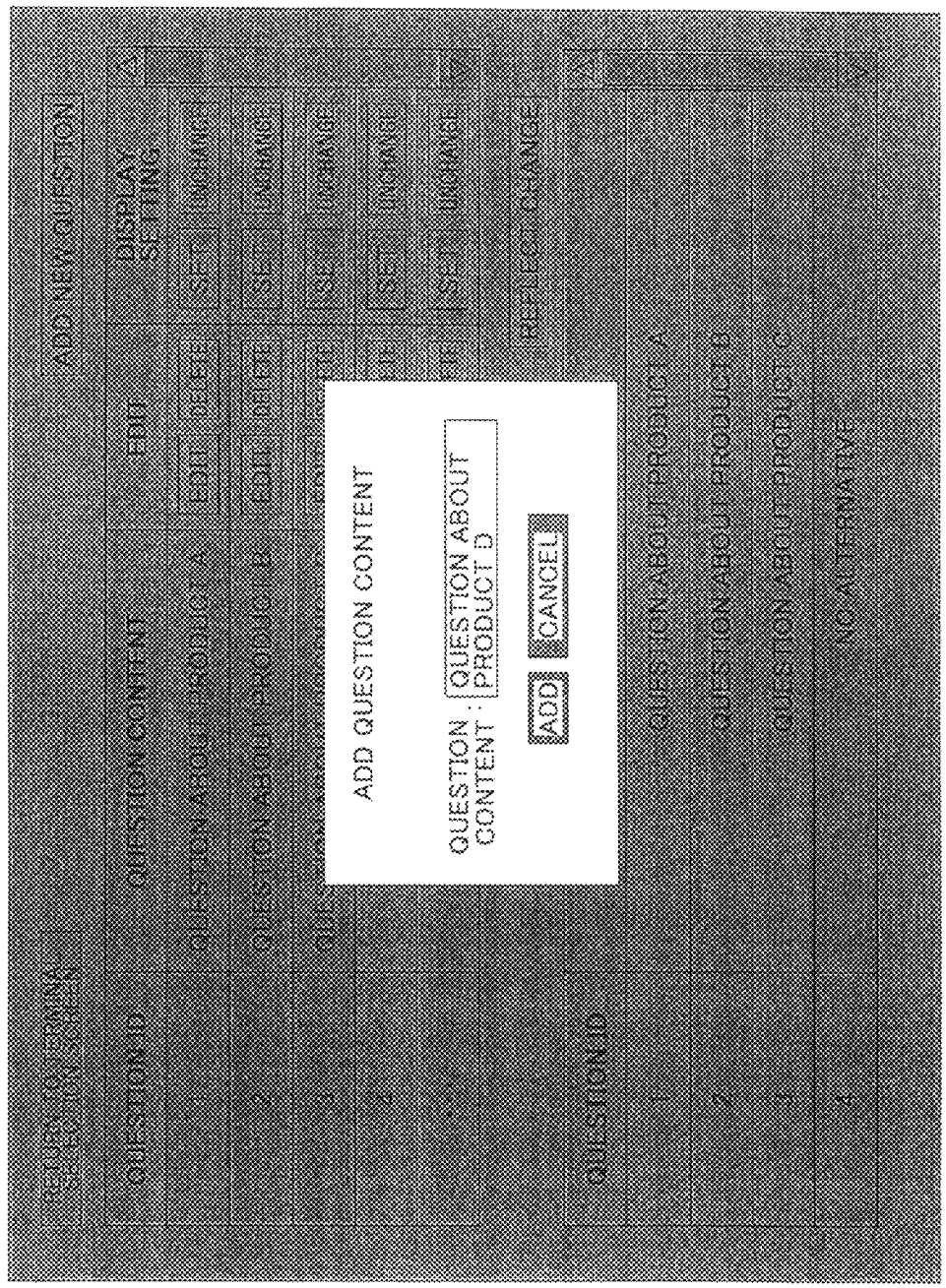
FIG. 52 is a fourth diagram illustrating the example of the question content management table.

A new question may be added as follows. For example, when the user selects the "add new question" button on the upper right of the screen, a screen for adding a new question illustrated in FIG. 52 is displayed. The user may input wording of the new question and add an "add" button on this screen so as to add the new question. In this example of FIG. 52, the new question having the question content "question about a product D" is added. FIG. 53 illustrates a status in which the question content "a question about a product D" having the question ID "5" is added to the question content management table.

Referring back to FIG. 48, when the user of the client PC terminal 90 ends editing the question content to perform reflection operations (e.g., depressing the "reflect change" button in the right middle part of the screen of FIG. 53) (step S216), the client PC terminal 90 transmits the change question content information to the transmission terminal management system 80 (step S217).

On receiving the change question content information, the transmission terminal management system 80 transmits the change question content information to the transmission management system 50 (step S218).

On receiving the change question content information, the transmission management system 50 accesses the question content management DB 5012 (the question content management table of FIG. 42) to change the question content (step S219). FIGS. 54A and 54B illustrate an example of a change made in the question content management table of the question content management DB 5012. FIG. 54A illustrates the question content management table before the change is made, and FIG. 54B illustrates the question content management table after the change is made in which the question content "a question about a product D" is added with respect to the group ID "10xx" and the question ID "5".

Subsequently, referring back to FIG. 48, the transmission management system 50 accesses the display question management DB 5013 (the display question management table of FIG. 43) to change the question ID (step S220). FIGS. 55A and 55B illustrate an example of a change made in the display question management table of the display question management DB 5013. FIG. 55A illustrates the display question management table before the change is made, and FIG. 55B illustrates the display question management table after the change is made in which the question ID "5" is added to the question ID column of the terminal ID "10aa" row.

Subsequently, referring back to FIG. 48, the transmission management system 50 transmits the question content change information to the corresponding terminal 10aa (step S221), and the terminal 10aa updates the question content (step S222).

Note that there may be several types of timing at which the question content change information is transmitted to the terminal, and at which the terminal updates the question content. In a case where the terminal updates the question content immediately after receiving the question content change information, the transmission management system 50 transmits the question content change information at the following types of timing:

transmits the question content change information real time when the question content is changed.

transmits the question content change information at a timing at which the terminal session ends.

transmits the question content change information while operations are not performed in the terminal for a predetermined time.

transmits the question content change information at the startup of the terminal.

Further, when the terminal receives the question content change information, the terminal updates the question content at the following types of timing:

updates the question content in real time.

updates the question content at a timing at which the terminal session ends.

updates the question content while operations are not performed for a predetermined time.

updates the question content at the startup.

Next, FIG. 56 is a sequence diagram illustrating another example of a process of editing the question content, indicating a case where the question contents corresponding to the plural terminals 10aa and 10ab are edited. The example illustrated in FIG. 56 is alternative to the example illustrated in FIG. 48. In FIG. 56, steps S215 to S220 are similar to steps S215 to S220 in FIG. 48.

In FIG. 56, after the question content management DB 5012 and the display question management DB 5013 are updated, the question content change information is transmitted to the terminal 10aa as well as the terminal 10ab (steps S221, and S221-2), and the terminals 10aa and the 10ab update the display question contents, respectively (steps S222, and S222-2).

Outline

As described above, in the above-described embodiments, the transmitter's (the caller's/the client's) information may be acquired before an incoming call to the video conference is received, such that the conversation after the incoming call is received may be facilitated.

In the above-described embodiments, it is possible to acquire the caller's (customer's) information before receiving the incoming call to the video conference.

The preferred embodiments are described above. In the above embodiments, the present invention is illustrated with specific examples; however, the present invention is not limited to these examples, and various alterations or changes may be made without departing from the gist and the scope of the claims of the present invention. Specifically, the present invention shall not be construed as being limited to details of the specific examples and accompanying drawings thereof.

The embodiments of the present invention are described above. However, the present invention is not limited to the specifically disclosed embodiments, and variations and modifications may be made without departing from the scope of the present invention.

The present application is based on Japanese Priority Application No. 2014-019372 filed on Feb. 4, 2014, and Japanese Priority Application No. 2014-229637 filed on Nov. 12, 2014, the entire contents of which are hereby incorporated herein by reference.

What is claimed is:

1. A transmission system to manage sessions for performing data communications, the sessions being established between a plurality of terminals, the transmission system comprising:
    a communication interface configured to perform communication with at least a first terminal and a second terminal via a network; and
    processing circuitry configured to
        receive a user's request from a user of the first terminal when a session start request is transmitted from the first terminal to the second terminal;
        send the received user's request together with the session start request;
        send to the second terminal the session start request from the first terminal by attaching the user's request to the session start request when the second terminal is in a communication capable status; and
        present the user's request to the second terminal at an arrival of an incoming call from the first terminal to the second terminal.

2. The transmission system as claimed in claim 1, wherein the processing circuitry is further configured to
    present a predetermined question associated with the second terminal to the first terminal, and receive a response that is the user's request of the first terminal when the session start request is transmitted from the first terminal to the second terminal,
    send the response together with the session start request,
    send to the second terminal the session start request from the first terminal by attaching the response to the session start request when the second terminal is in the communication capable status, and
    present the response to the second terminal at the arrival of the incoming call from the first terminal to the second terminal.

3. The transmission system as claimed in claim 1, wherein the processing circuitry is further configured to determine a terminal, wherein
    the second terminal forms a group including a plurality of terminals, and each of the terminals belonging to the group is provided with sorting information, wherein
    the processing circuitry determines a desired terminal that matches the sorting information within the group based on the user's request, and wherein
    the processing circuitry sends the session start request from the first terminal to the determined desired terminal.

4. The transmission system as claimed in claim 1, wherein the processing circuitry is further configured to
    manage request contents that serve as candidates for the user's request in the first terminal; and
    send an appropriate one of the managed request contents in response to a request content acquisition request from the first terminal.

5. The transmission system as claimed in claim 4, wherein the processing circuitry is further configured to
    receive a request content change request with respect to a desired one of the managed request; and
    a request content update part configured to update the desired request content in response to the received request content change request.

6. The transmission system as claimed in claim 5, wherein the processing circuitry is further configured to receive a request content change request from any one of general-purpose terminals.

7. The transmission system as claimed in claim 5, wherein the processing circuitry is further configured to
    divide the plurality of terminals into two or more groups to separately manage the two or more groups of terminals, and
    receive the request content change request for each of the groups as a unit.

8. The transmission system as claimed in claim 5, wherein the processing circuitry is further configured to
    send change information of a request content to the terminal corresponding to the updated request content.

9. A transmission management apparatus to manage sessions for performing data communications, the sessions being established between a plurality of terminals, the transmission management system comprising:
    a communication interface configured to perform communication with at least a first terminal and a second terminal via a network; and
    processing circuitry configured to
        receive a session start request together with a user's request received from a user of the first terminal when a session start request is transmitted from the first terminal to the second terminal; and
        send to the second terminal the session start request from the first terminal by attaching the user's request to the session start request when the second terminal is in a communication capable status, wherein
        wherein the processing circuitry is configured to cause the user's request to be presented to the second terminal at an arrival of an incoming call from the first terminal to the second terminal.

10. The transmission management apparatus as claimed in claim 9, wherein
    the processing circuitry is configured to
        present a predetermined question associated with the second terminal to the first terminal, and receive a response that is the user's request of the first terminal together with the session start request when the session start request is transmitted from the first terminal to the second terminal,
        send to the second terminal the session start request from the first terminal by attaching the response to the session start request when the second terminal is in the communication capable status, and wherein the response is presented to the second terminal at the arrival of the incoming call from the first terminal to the second terminal.

11. A non-transitory computer-readable recording medium storing a program, which when processed by a processor, cause a computer to serve as components of a transmission system to manage sessions for performing data communications, the sessions being established between a plurality of terminals, the transmission system comprising:

processing circuitry configured to receive a user's request from a user of a first terminal when a session start request is transmitted from a first terminal to a second terminal;

send the received user's request together with the session start request;

send to the second terminal the session start request from the first terminal by attaching the user's request to the session start request when the second terminal is in a communication capable status; and present the user's request to the second terminal at an arrival of an incoming call from the first terminal to the second terminal.

12. The non-transitory computer-readable storage medium as claimed in claim 11, wherein the processing circuitry is further configured to present a predetermined question associated with the second terminal to the first terminal, and receive a response that is the user's request of the first terminal when the session start request is transmitted from the first terminal to the second terminal, send the response together with the session start request, send to the second terminal the session start request from the first terminal by attaching the response to the session start request when the second terminal is in the communication capable status, and present the response to the second terminal at the arrival of the incoming call from the first terminal to the second terminal.

* * * * *